United States Patent [19]

Okanoue et al.

[11] Patent Number: 5,841,769
[45] Date of Patent: Nov. 24, 1998

[54] DATA MESSAGE ROUTING SYSTEM FOR MOBILE OR FIXED TERMINALS WITHIN A NETWORK

[75] Inventors: Kazuhiro Okanoue; Tomoki Ohsawa, both of Tokyo, Japan

[73] Assignee: NEC Corporation, Tokyo, Japan

[21] Appl. No.: 572,749

[22] Filed: Dec. 14, 1995

[30] Foreign Application Priority Data

| Dec. 16, 1994 | [JP] | Japan | 6-313385 |
| Jan. 17, 1995 | [JP] | Japan | 7-004862 |
| Feb. 24, 1995 | [JP] | Japan | 7-036663 |
| Jul. 6, 1995 | [JP] | Japan | 7-170574 |

[51] Int. Cl.$^6$ ................................ H04L 12/46
[52] U.S. Cl. ........................ 370/338; 370/401
[58] Field of Search .................. 370/338, 349, 370/401, 402, 409, 400, 328, 475; 395/200.15, 200.16; 455/433, 435, 456

[56] References Cited

U.S. PATENT DOCUMENTS

| 5,159,592 | 10/1992 | Perkins | 370/401 |
| 5,423,002 | 6/1995 | Hart | 370/401 |
| 5,517,618 | 5/1996 | Wada et al. | 370/349 |
| 5,533,026 | 7/1996 | Ahmadi et al. | 370/338 |
| 5,572,528 | 11/1996 | Shuen | 370/402 |

OTHER PUBLICATIONS

Fumio Teraoka, "VIP: Protocol which provides host movement transparency", Computer Software, vol. 10, 4 (Nov. 1993), pp. 22–38.

Fumio Teraoka, "Protocol Migration from IP to VIP", Japan Software Science Society, Collected articles of 9th Conference, pp. 505–508, 1992.

Network Working Group Request for Comment: 1035 Obsoletes: RFCs 882, 883, 973 "Domain Names—Implementation and Spcification" P. Mockapetris ISI, Nov. 1987, pp. 1–55.

Radia Perlman, "Interconnections: Bridges and Routers", Addison–Wesley Publishing Company, Inc., pp. 184–191, 1992.

*Primary Examiner*—Chau Nguyen
*Attorney, Agent, or Firm*—Sughrue, Mion, Zinn, Macpeak & Seas, PLLC

[57] ABSTRACT

A mobile packet communication system has a plurality of mobile terminals movable between a plurality of auxiliary networks. Each of the mobile terminals has an inherent address processing layer for adding a packet header based on the inherent address thereof to transmission data from a higher layer, and a positional address processing layer for adding a packet header based on the positional address thereof to the transmission data to which the packet header based on the inherent address has been added by the inherent address processing layer. The packet headers contain no header information representing an association between the inherent address and the positional address. The mobile packet communication system facilitates a control process for maintaining data relative to an association between addresses and reduces an amount of communications required by such a control process.

52 Claims, 37 Drawing Sheets

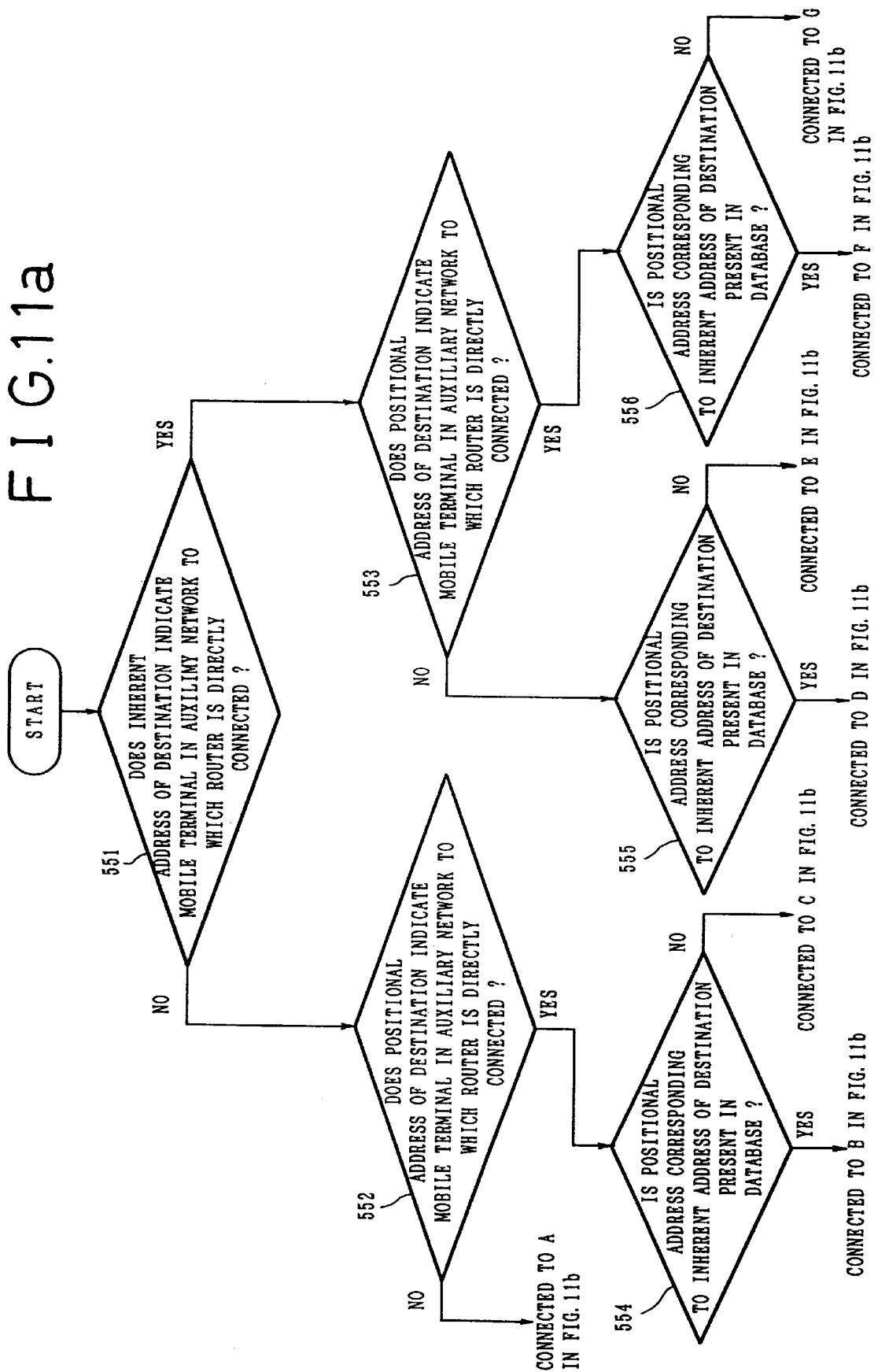

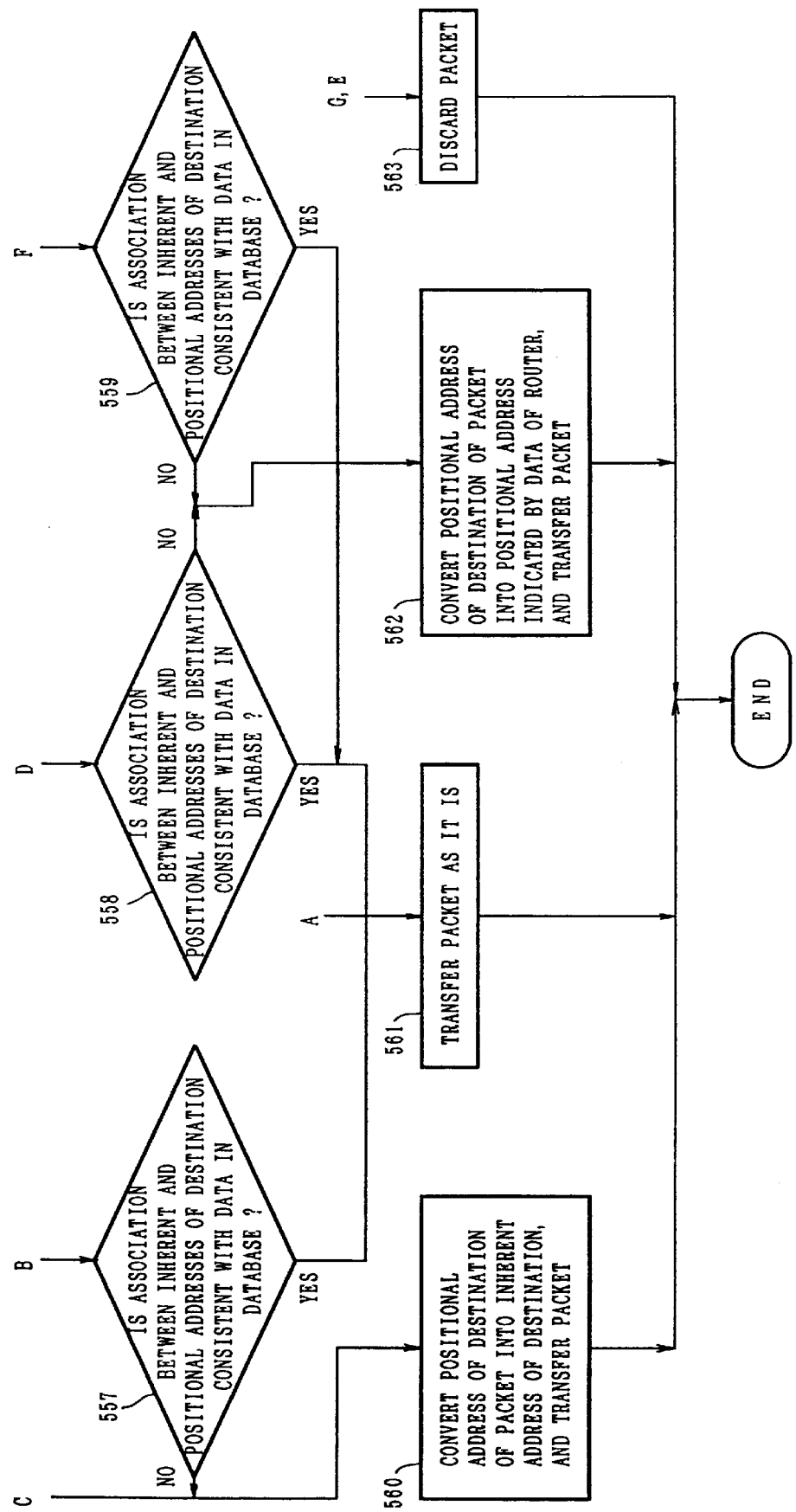

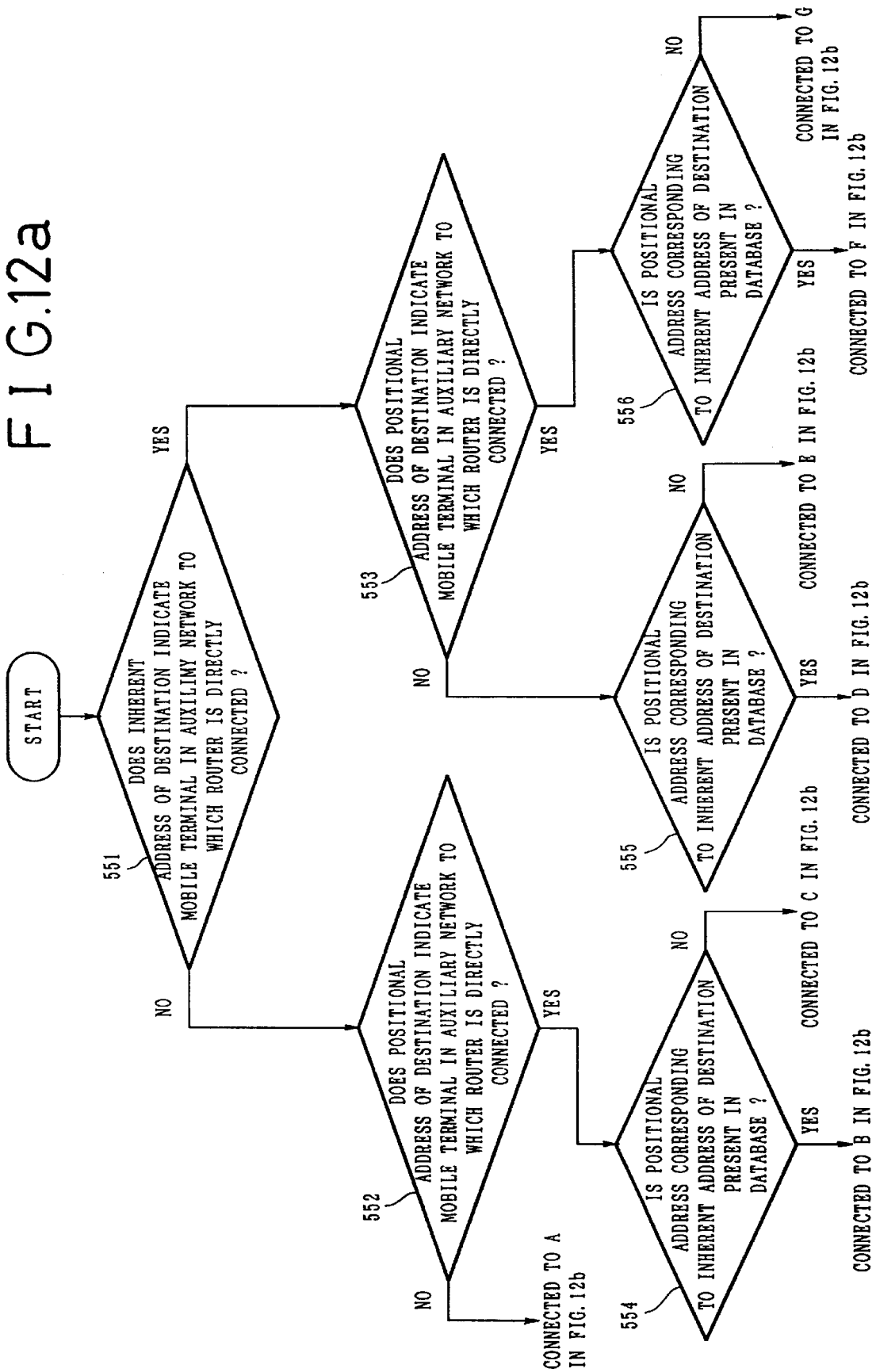

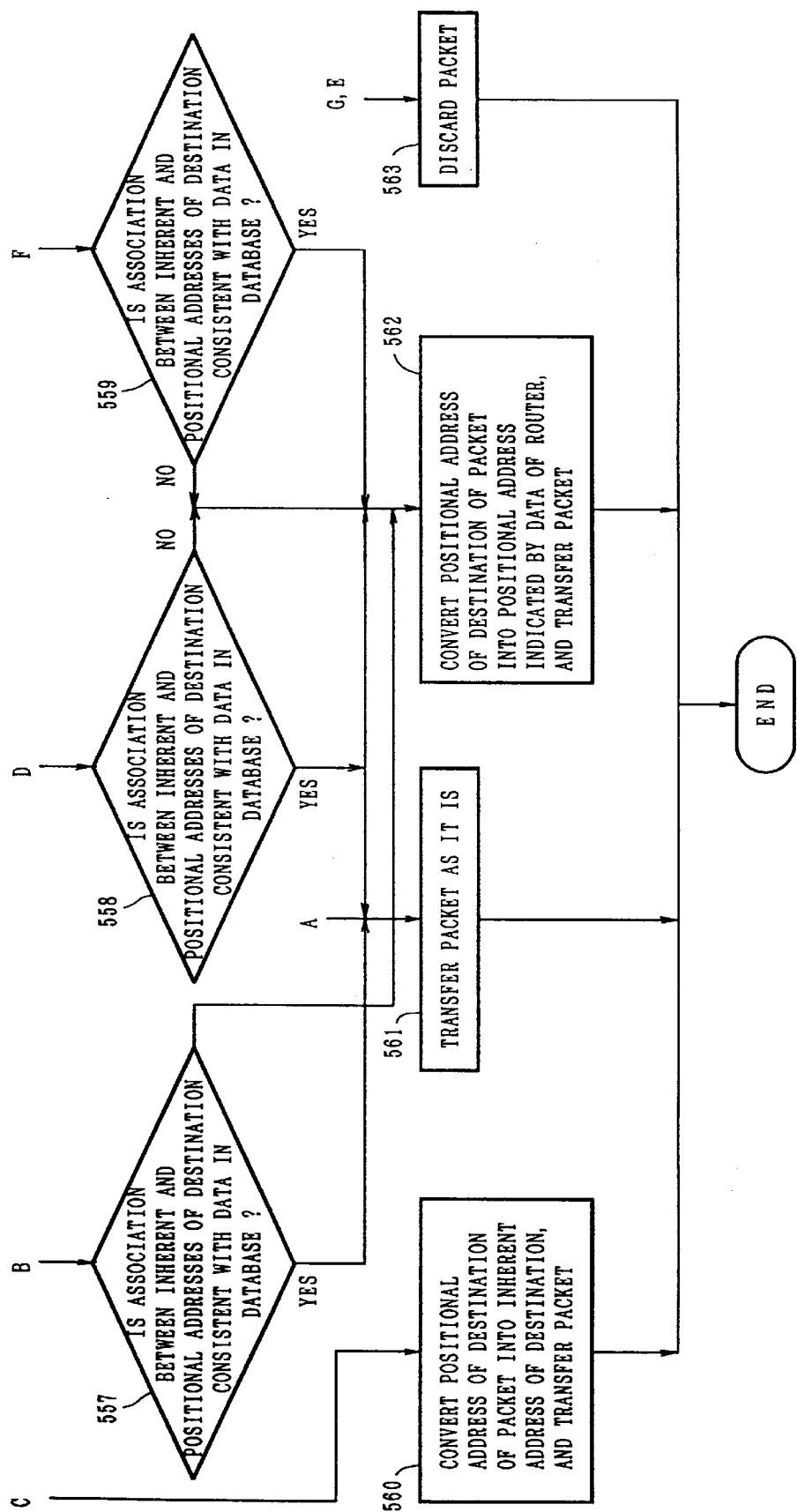

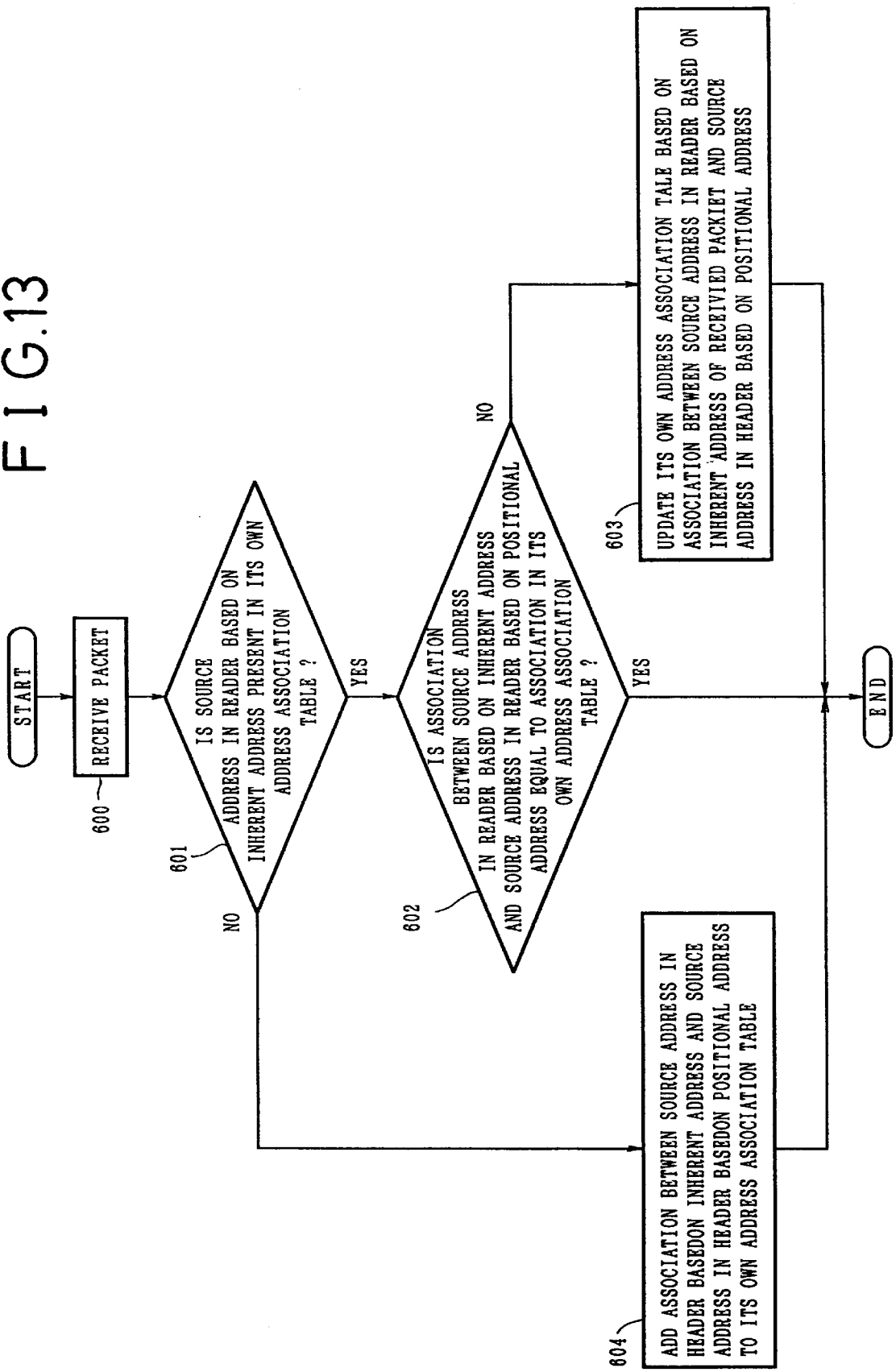

FIG.22

| AUXILIARY NETWORK IDENTIFIER | MOBILE-COMPATIBLE /MOBILE-INCOMPATIBLE |
|---|---|
| Net-1 | MOBILE-INCOMPATIBLE |
| Net-2 | MOBILE-COMPATIBLE |
| ⋮ | ⋮ |

F I G.23

| INHERENT ADDRESS | POSITIONAL ADDRESS |
|---|---|
| MOBILE TERMINAL-1 | POSITION-1 |
| MOBILE TERMINAL-2 | POSITION-2 |
| ⋮ | ⋮ |

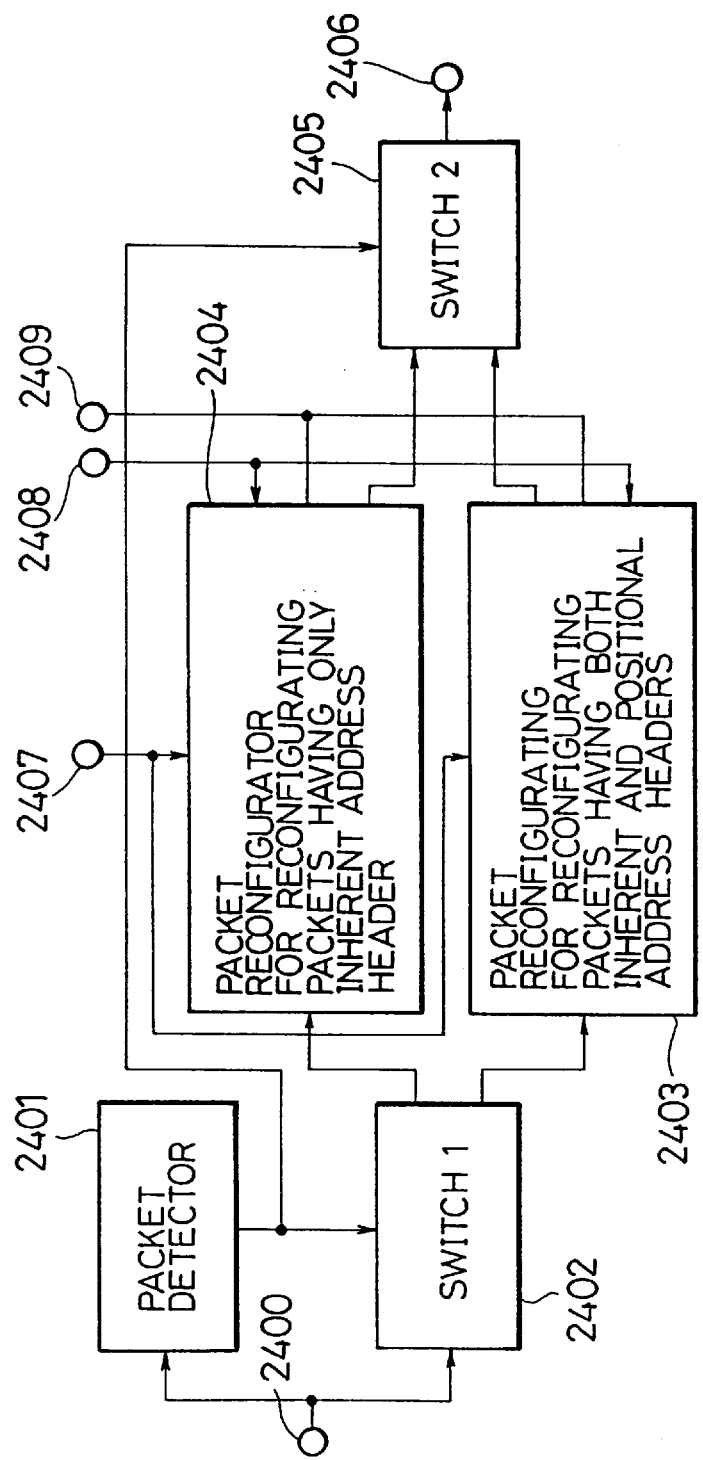
F I G. 26

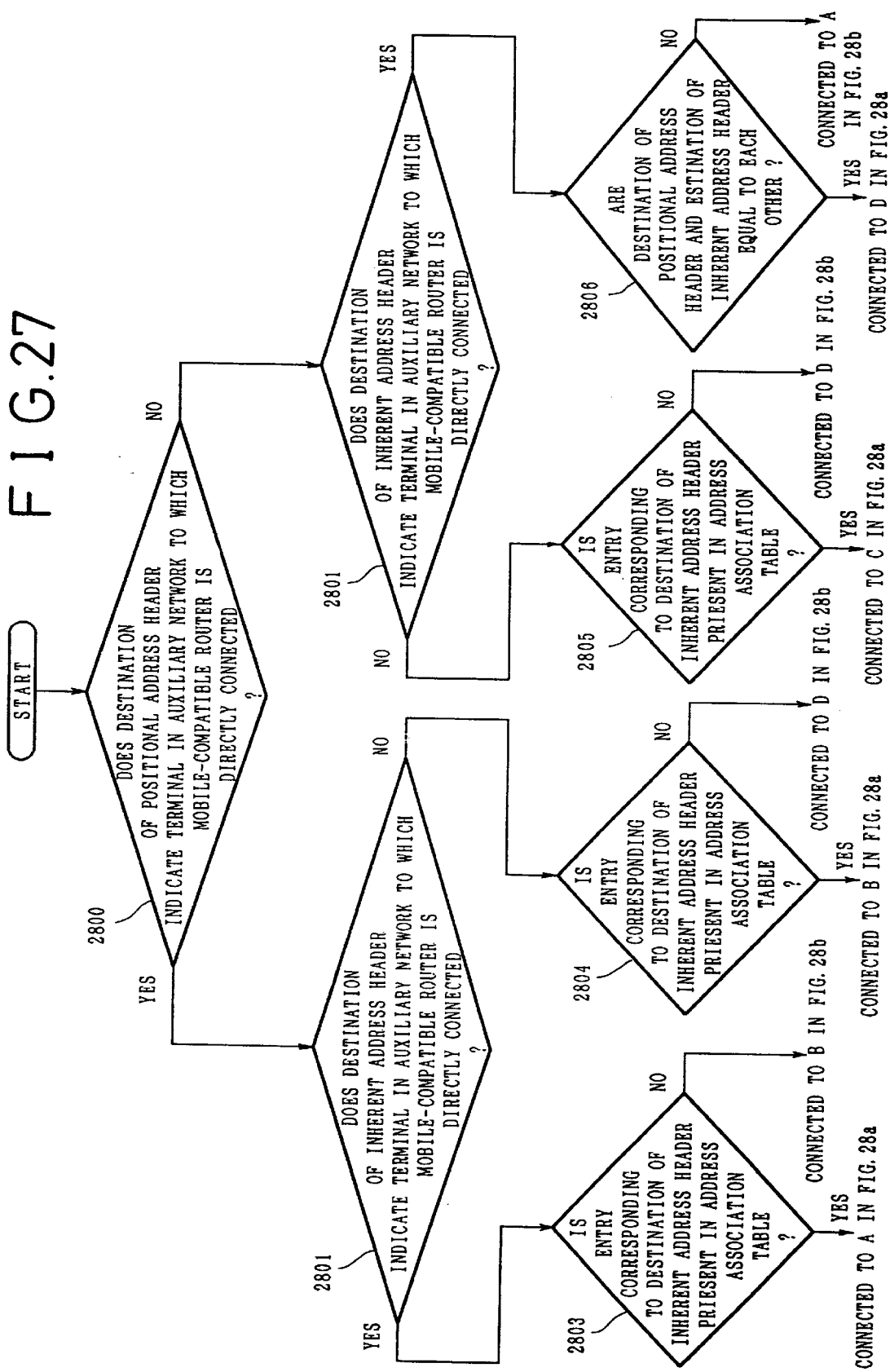

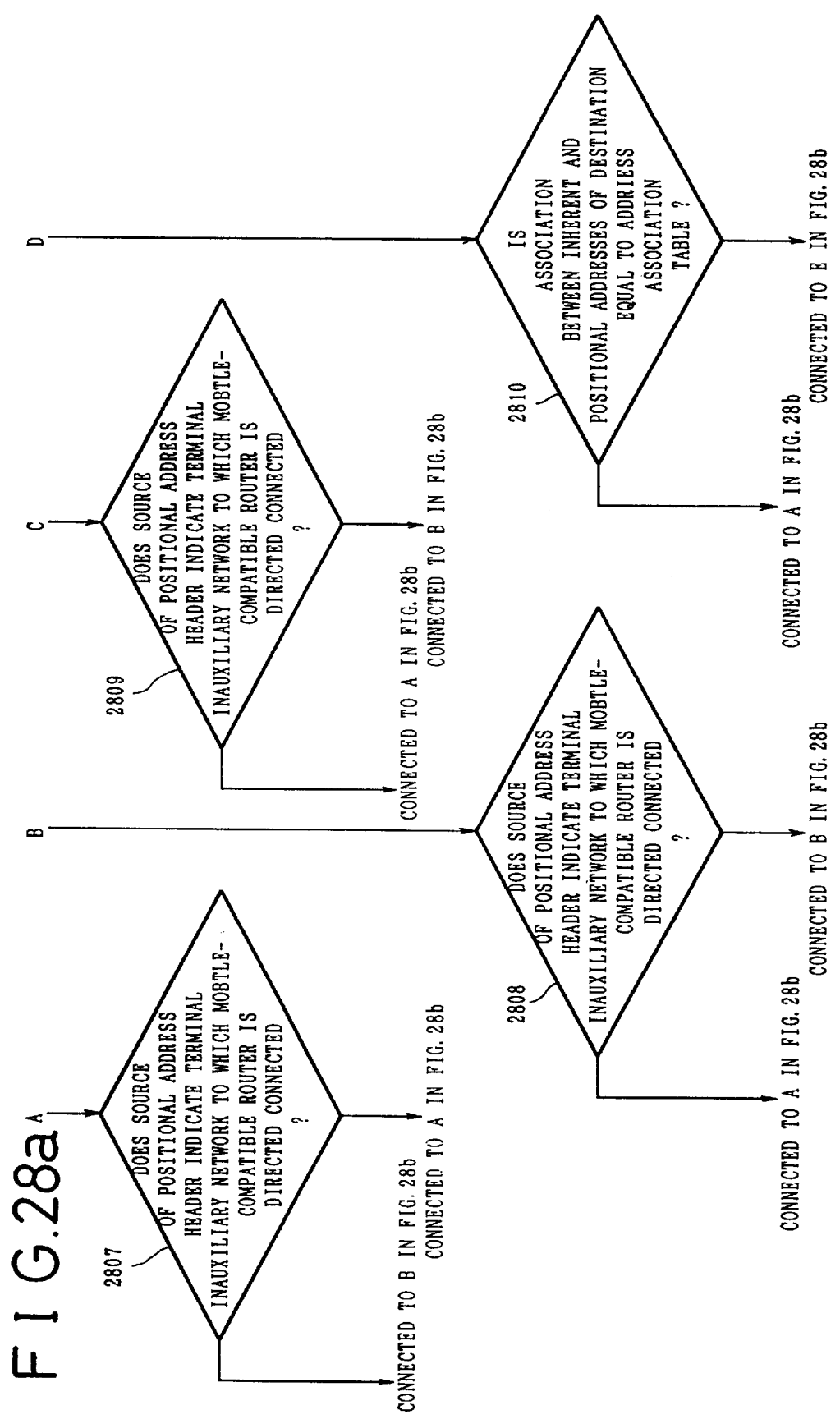

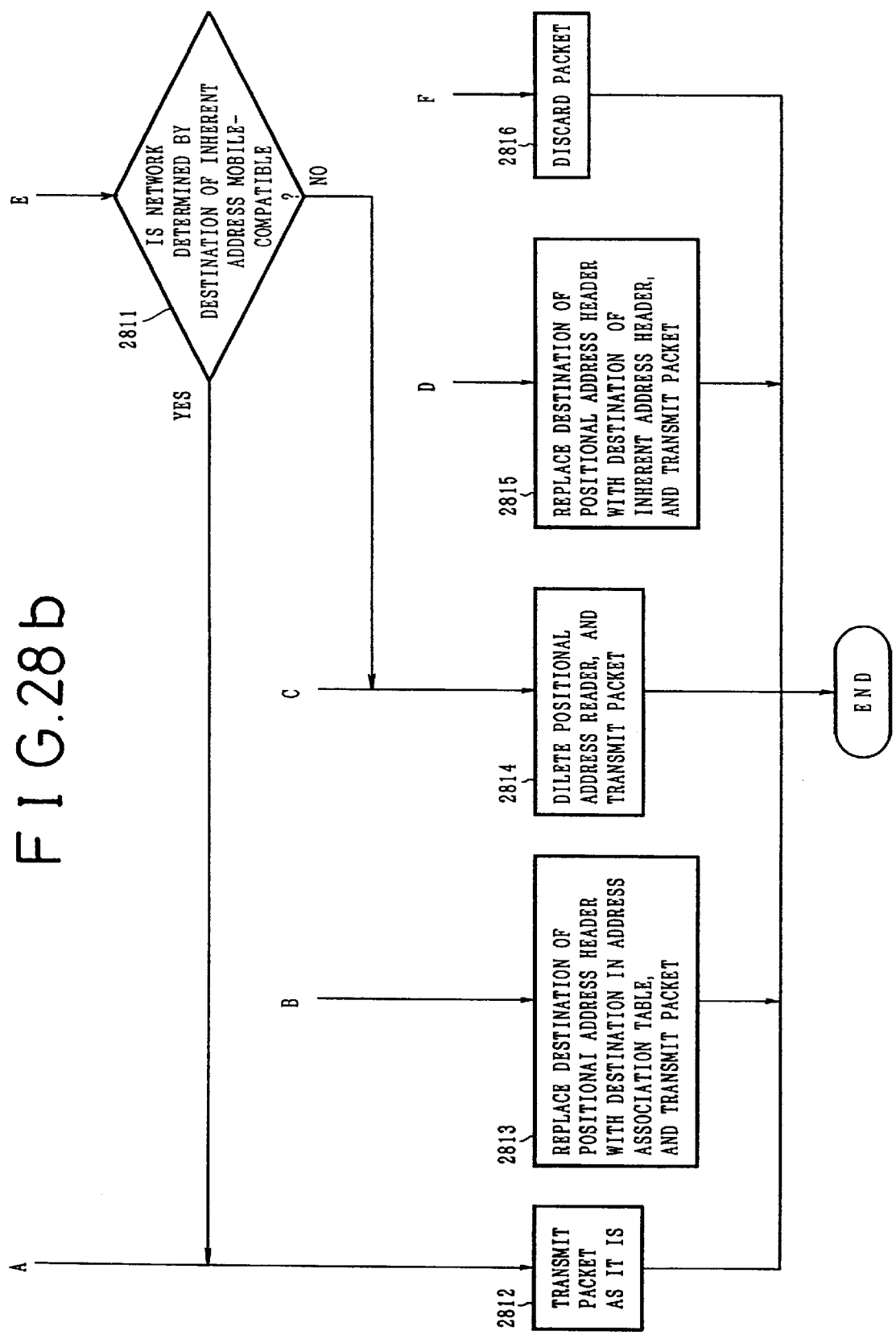

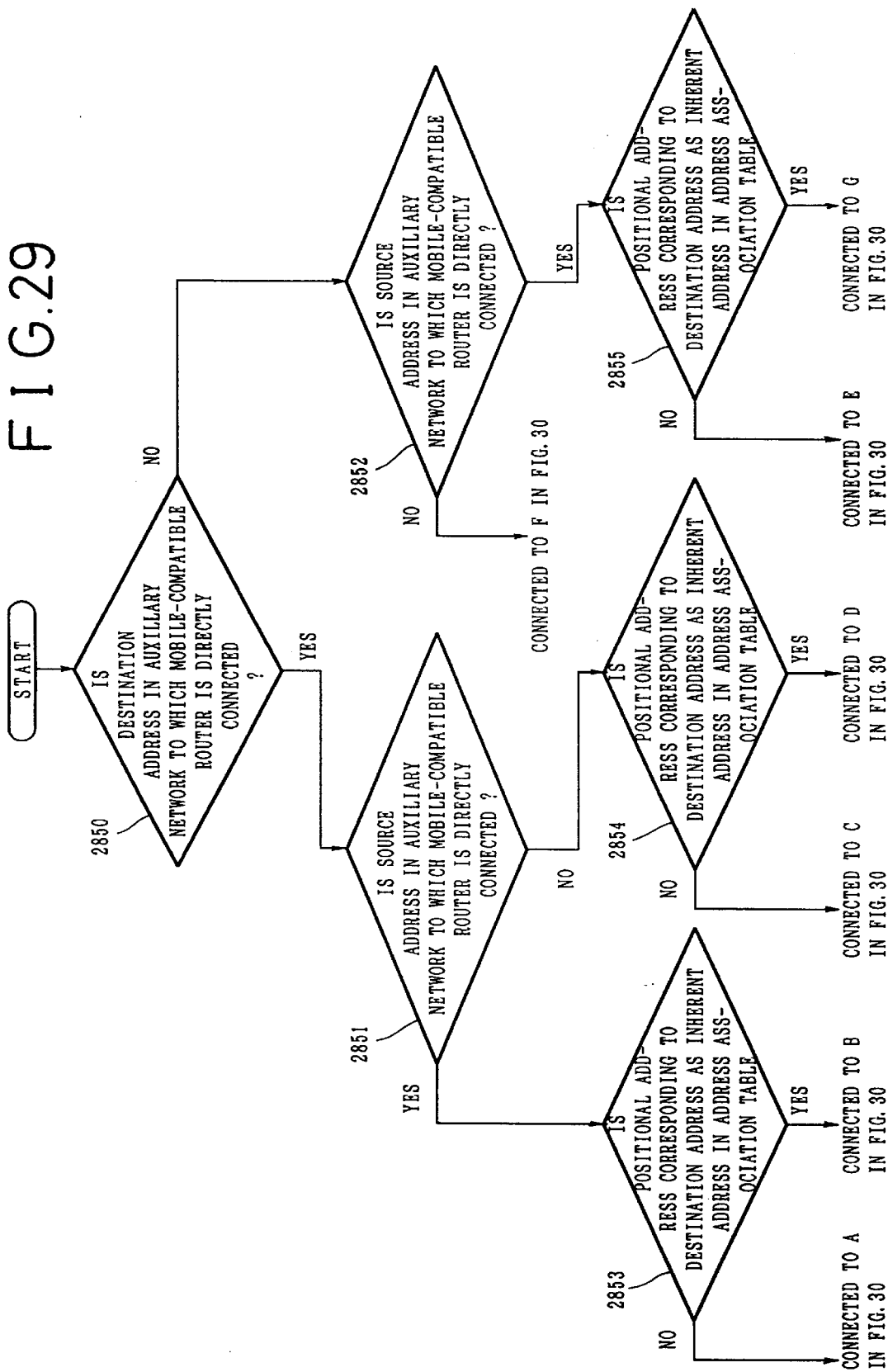

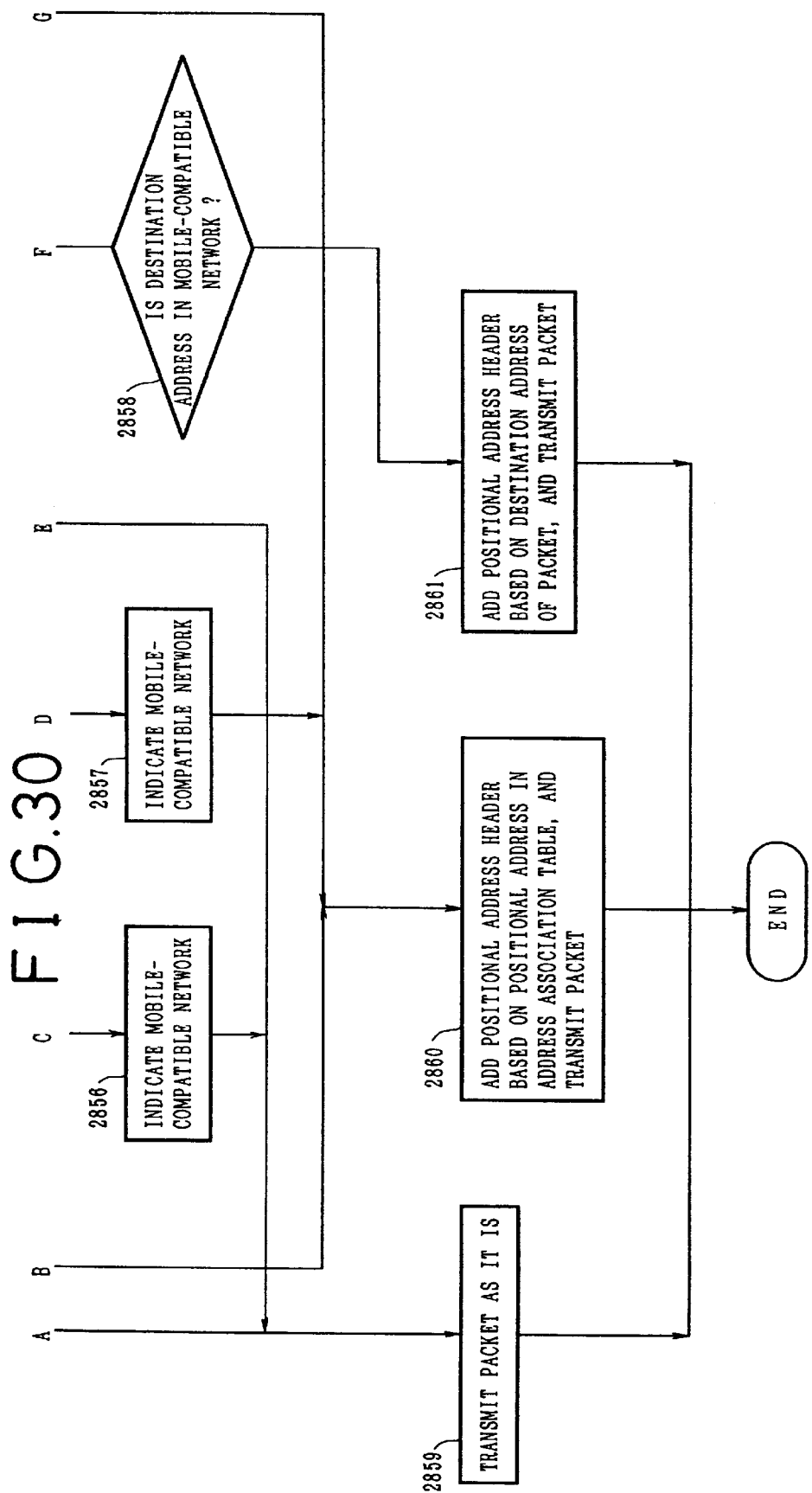

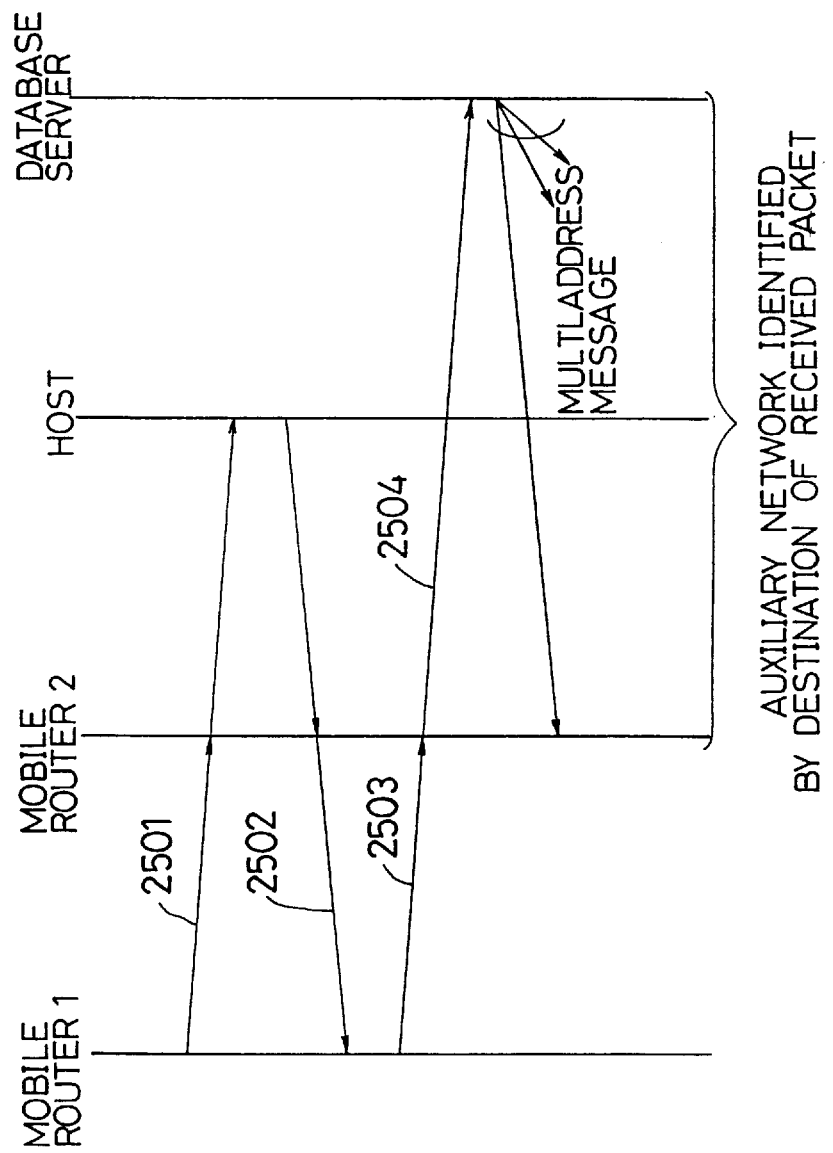

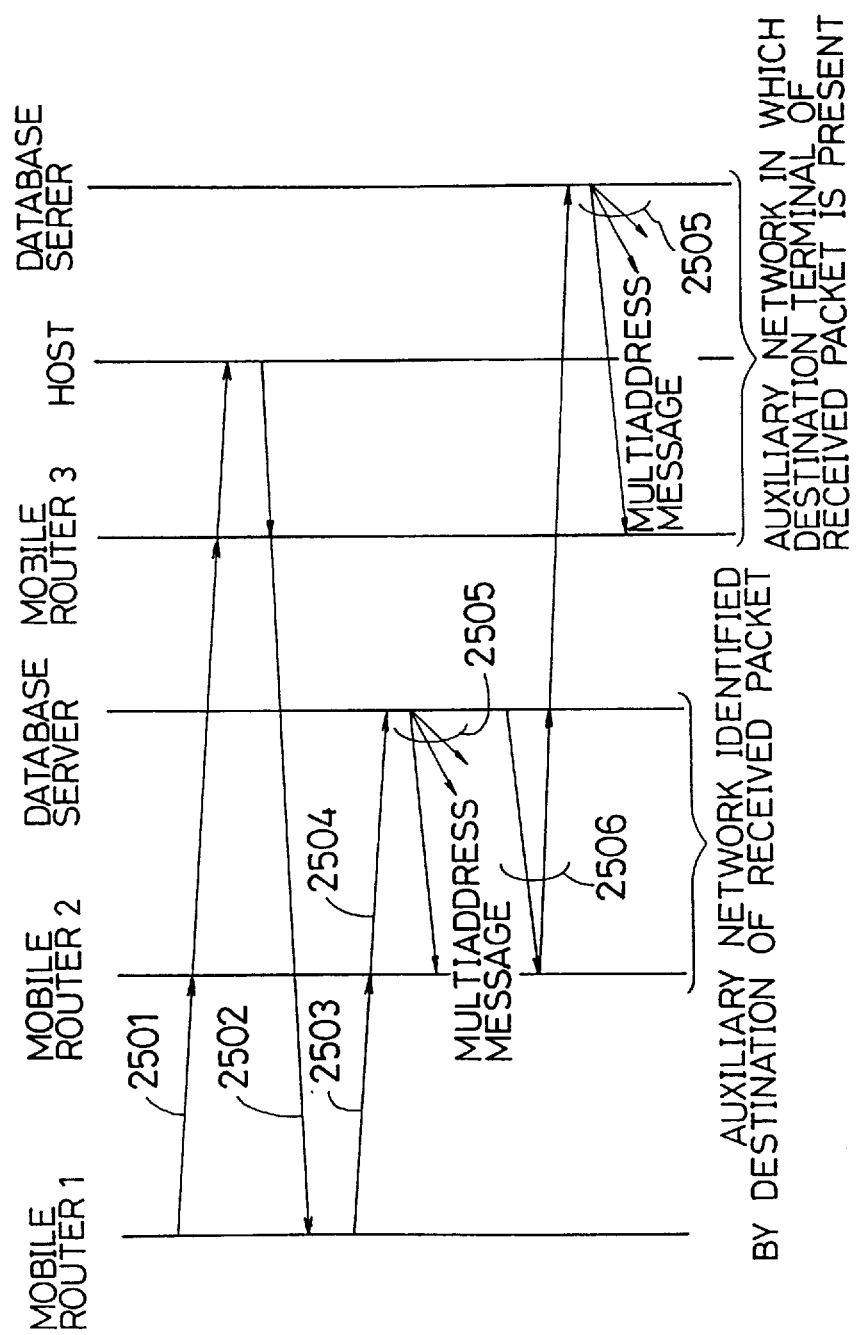

DATA MESSAGE ROUTING SYSTEM FOR MOBILE OR FIXED TERMINALS WITHIN A NETWORK

BACKGROUND OF THE INVENTION

1. Field of the Invention

The present invention relates to a mobile packet communication system for supporting mobile terminals in a network which is composed of a plurality of auxiliary networks interconnected by routers, and more particularly to a mobile packet communication system for transmitting packets of data that are encapsulated by a maximum of N headers of the same format.

2. Description of the Related Art

In computer networks which support mobile terminals, it has been known to effect routing to a mobile terminal by defining an inherent address which represents the mobile terminal itself, rather than depending on the position thereof, and a positional address which varies depending on the position of the mobile terminal, and then determining an association between the inherent and positional addresses.

When mobile terminals are supported using the above process, no communications can be carried out unless a database giving an association between the inherent and positional addresses of the mobile terminals is properly maintained. One example of a packet format which is described in Document 1: Fumio Teraoka, "VIP: Protocol which provides host movement transparency", Computer Software, Vol. 10, No. 4 (1993), pp. 22–38, is shown in FIG. 1 of the accompanying drawings.

In FIG. 1, IP (Internet Protocol) addresses that are widely used in computer networks are employed as inherent and positional addresses.

In FIG. 1, the reference numeral 1000 pointing to a solid-line frame represents a packet header based on positional addresses, and the reference numerals 1001, 1002 represent positional addresses of a source and a destination in the packet header 1000 based on positional addresses. The reference numeral 1010 pointing to a broken-line frame represents a packet header based on inherent addresses, the reference numerals 1011, 1012 represent version information of inherent and positional addresses of a source and version information of inherent and positional addresses of a destination, the version information being indicated by time, and the reference numerals 1013, 1014 represent inherent addresses of a source and a destination.

The association between the inherent and positional addresses of respective mobile terminals is managed in all routers on paths of communications effected by the mobile terminals, as shown in FIG. 2 of the accompanying drawings.

In FIG. 2, the reference numerals 1100–1104 represent auxiliary networks Net-0–Net-5, the reference numerals 1105–1108 represent routers Router1–Router4, and the reference numerals 1110–1112 represent mobile terminals Host-1–Host-3.

In the example shown in FIG. 2, the mobile terminal Host-1 (1110) is communicating with the mobile terminals Host-2 (1111), Host-3 (1112), and a home network for the mobile terminals Host-1 (1110), Host-2 (1111), Host-3 (1112) is the auxiliary network Net-0 (1100). Therefore, the mobile terminals Host-1 (1110), Host-2 (1111), Host-3 (1112) have respective inherent addresses depending on the auxiliary network Net-0 (1100). Since the mobile terminals Host-1 (1110), Host-2 (1111), Host-3 (1112) are connected respectively to the auxiliary networks Net-0 (1100), Net-1 (1101), Net-4 (1104), the mobile terminals Host-1 (1110), Host-2 (1111), Host-3 (1112) have respective positional addresses depending on the respective auxiliary networks Net-0 (1100), Net-1 (1101), Net-4 (1104).

For communications between the mobile terminals Host-1 (1110), Host-2 (1111) existing on communication paths, address association information relative to the mobile terminals is maintained in the routers Router1 (1105), Router2 (1106). For communications between the mobile terminals Host-1 (1110), Host-3 (1112) existing on communication paths, address association information relative to the mobile terminals is maintained in the routers Router1 (1105), Router3 (1107), Router4 (1108). While the router Router3 (1107) is not directly involved in communications between the mobile terminals Host-1 (1110), Host-2 (1111), the router Router3 (1107) maintains address association information relative to the mobile terminal Host-2 (1111) because it can peek at packets transmitted between the mobile terminals Host-1 (1110), Host-2 (1111). The router Router1 (1105) which is connected to the home network Net-0 (1100) for the mobile terminals Host-1 (1110), Host-2 (1111), Host-3 (1112) necessarily maintains address association information of these mobile terminals Host-1 (1110), Host-2 (1111), Host-3 (1112). Each of the mobile terminals Host-1 (1110), Host-2 (1111), Host-3 (1112) maintains address association information of the mobile terminal which it is presently communicating with.

To keep consistent a database of address association information of the mobile terminals in the routers Router1 (1105)–Router4 (1108), each data packet which is transmitted contains the version information of inherent and positional addresses of a source and a destination as indicated by the packet format shown in FIG. 1. Each of the routers Router1 (1105)–Router4 (1108) compares the version information of inherent and positional addresses of a source and a destination contained in all packets which are received with corresponding version information of inherent and positional addresses entered in its own database. If the compared items of version information differ from each other, then each of the routers Router1 (1105)–Router4 (1108) recognizes that the inherent and positional addresses are inconsistent, and effects a control process to eliminate the inconsistency.

FIG. 3 of the accompanying drawings shows headers and transmission data separately. In FIG. 3, the reference numeral 3000 represents a header containing information of a present position, the reference numeral 3001 represents a header containing information that indicates a mobile terminal itself, and the reference numeral 3002 represents transmission data.

According to Document 1, referred to above, a new value VIPprot is defined to indicate that the transmission data is encapsulated by the two headers, i.e., as shown in FIG. 3, the header 300 containing information of a present position and the header 3001 containing information that indicates a mobile terminal itself. The new value VIPprot thus defined is inserted in a field (Protocol field) indicating a higher protocol of the header 3000.

A transmission system described in Document 1 will be described below.

According to the process disclosed in Document 1, routing to a mobile terminal in a computer network which support mobile terminals is effected by defining an inherent address which represents the mobile terminal itself, rather than depending on the position thereof, and a positional address which varies depending on the position of the mobile terminal, and then determining an association between the inherent and positional addresses. The process is based on the assumption that all the mobile terminals are capable of processing a packet having two addresses, i.e., an inherent address and a positional address. Under transient conditions, however, there may be situations in which mobile terminals are capable of processing packets having two such addresses and fixed terminals are capable of processing packets having only inherent addresses.

To cope with the above situation, Document 1 discloses a system for determining whether a terminal which a mobile terminal is to communicate with a mobile terminal or a fixed terminal, transmitting packets having two addresses, i.e., an inherent address and a positional address, to the terminal if it is a mobile terminal, and transmitting packets having only inherent addresses to the terminal if it is a fixed terminal.

Such a packet transmitting system of a mobile terminal is shown in FIG. 4 of the accompanying drawings. As shown FIG. 4, the packet transmitting system has an input terminal 2100', an output terminal 2105', an inherent address header generator 2101', a mobile terminal/fixed terminal decision unit 2102', a positional address header generator 2103', and a switch 2104'.

For transmitting a packet, the inherent address header generator 2101' generates an inherent address header. At the same time, the inherent address header generator 2101' supplies a destination address to the mobile terminal/fixed terminal decision unit 2102'. The mobile terminal/fixed terminal decision unit 2102' determines whether the destination indicated by the destination address from the inherent address header generator 2101' indicates a mobile terminal or not.

If the destination is a mobile terminal, then the mobile terminal/fixed terminal decision unit 2102' indicates a positional address of the destination to the positional address header generator 2103', and controls the switch 2104' to output a positional address header generated by the positional address header generator 2103' to the output terminal 2105'.

If the destination is a mobile terminal, then the mobile terminal/fixed terminal decision unit 2102' controls the switch 2104' to output the inherent address header generated by the inherent address header generator 2101' to the output terminal 2105'.

Consequently, if the destination is a mobile terminal, then the packet transmission system transmits a packet based on two addresses, i.e., a positional address and an inherent address, and if the destination is a fixed terminal, then the packet transmission system transmits a packet based on only an inherent address.

In the conventional arrangement shown in FIGS. 1 and 2, each router compares the version information of inherent and positional addresses of a source and a destination contained in all packets which are being passed with corresponding version information of inherent and positional addresses entered in its own database in order to effect a control process to eliminate any inconsistency. Therefore, the system is subjected to an undue burden. Furthermore, since there is a possibility that corresponding data of inherent and positional addresses of a certain terminal exist in many routers, the control process to eliminate any inconsistency requires an unduly large amount of communications. In addition, the data of a header is large because each packet contains version information for mapping inherent and positional addresses of a source and a destination.

In the conventional format shown in FIG. 3, when a new value VIPprot is defined which indicates that transmission data is encapsulated by the two headers, i.e., the header 3000 containing information of a present position and the header 3001 containing information that indicates a mobile terminal itself, any existing network device which does not incorporate the new value VIPprot that is defined cannot process encapsulated transmission data, and hence compatibility with existing systems is greatly impaired. Specifically, when an existing network device which does not incorporate the new value VIPprot that is defined receives a packet of transmission data encapsulated with the field value of VIPprot, the network device cannot interpret the value of VIPprot, and will discard the packet.

In the packet transmission system shown in FIG. 4, each mobile terminal determines whether the destination of a packet is a mobile terminal or a fixed terminal, changes the format of the packet depending on the determined result, and then transmits the packet. It is desirable that any processing in mobile terminals be minimized in view of needs for smaller and lighter mobile terminals and the period of time for which batteries are connected to mobile terminals. The conventional packet transmission system cannot meet such demands because packet processing in mobile terminals places an increased burden on the mobile terminals.

Packets transmitted from mobile terminals to fixed terminals are required to use a format which is inconsistent with a protocol hierarchy which supports packet movement, for the reception of the packets at the fixed terminals. The use of such a format is disclosed in Document 2 given below:

Document 2: Fumio Teraoka, "Protocol Transition from IP to VIP", Japan Software Science Society, Collected articles of 9th Conference, pp. 505–508.

SUMMARY OF THE INVENTION

It is therefore an object of the present invention to provide a mobile packet communication system which facilitates a control process for maintaining data relative to an association between addresses and reduces the amount of communications required by such a control process.

According to the present invention, there is provided a mobile packet communication system comprising a plurality of auxiliary networks, a plurality of mobile terminals connected to said auxiliary networks, each of said mobile terminals having an inherent address independent of the auxiliary network to which the mobile terminal is connected and a positional address depending on the auxiliary network to which the mobile terminal is connected, a plurality of routers interconnecting said auxiliary networks, each of said auxiliary networks having a database of an association between the inherent and positional addresses of the mobile terminals connected thereto, and a server for managing said database, each of said mobile terminals having one of said auxiliary networks as a home network which is determined by the inherent address of the mobile terminal, each of said mobile terminals being movable between said auxiliary networks, each of said mobile terminals having:

a) an inherent address processing layer for adding a packet header based on said inherent address thereof to transmission data from a higher layer; and b) a positional address processing layer for adding a packet header based on said positional address thereof to the transmission data to which the packet header based on said inherent address has been added by said inherent address processing layer;

c) the packet headers containing no header information representing an association between said inherent address and said positional address.

Each of said mobile terminals may include means for periodically indicating address association information indicative of the association between the inherent address and the positional address of the mobile terminal, to the server which manages said database of the auxiliary network to which the mobile terminal is currently connected.

The address association information may include an identifier of the server which manages said database of the auxiliary network which is determined as the home network by the inherent address of the mobile terminal.

The server may comprise:
a) means for receiving said address association information from said mobile terminal connected to the auxiliary network managed by said server and address association information in other auxiliary networks from servers which manage the other auxiliary networks;
b) means for storing, as address association data in the servers, said address association information from said mobile terminal and the address association information in the other auxiliary networks from the servers which manage the other auxiliary networks;
c) means for classifying said address association information from said mobile terminal, among the address association data in the servers, according to the servers which manage the databases with respect to the home networks, thereby generating address association information in the other auxiliary networks for the respective servers;
d) means for periodically transmitting the address association information in the other auxiliary networks for the respective servers to said servers; and
e) means for periodically transmitting an association between all said inherent and positional addresses contained in the address association information in the servers as multiaddress database updating information to the auxiliary networks managed by said servers.

The router may comprise:
a) means for receiving the database updating information and holding the same data as said databases as router address association data; and
b) analyzing and reconfigurating means for analyzing a packet header based on the inherent address of a received packet and a packet header based on the positional address of the received packet, and reconfigurating the packet headers based on said router address association data.

The analyzing and reconfigurating means may comprise:
a) inherent address determining means for determining whether a destination address of the packet header based on said inherent address is an address indicating a mobile terminal connected to the auxiliary network to which said router is directly connected, outputting a true value if the destination address of the packet header based on said inherent address is the address indicating the mobile terminal connected to the auxiliary network to which said router is directly connected, and outputting a false value if the destination address of the packet header based on said inherent address is not the address indicating the mobile terminal connected to the auxiliary network to which said router is directly connected;
b) positional address determining means for determining whether a destination address of the packet header based on said positional address is an address indicating a mobile terminal connected to the auxiliary network to which said router is directly connected, outputting a true value if the destination address of the packet header based on said positional address is the address indicating the mobile terminal connected to the auxiliary network to which said router is directly connected, and outputting a false value if the destination address of the packet header based on said positional address is not the address indicating the mobile terminal connected to the auxiliary network to which said router is directly connected;
c) inherent address and router address association data comparing means for determining whether the destination address of the packet header based on said inherent address is present in the router address association data of said router, outputting a true value if the destination address of the packet header based on said inherent address is present in the router address association data of said router, and outputting a false value if the destination address of the packet header based on said inherent address is not present in the router address association data of said router;
d) address association comparing means for determining whether an association between the destination address of the packet header based on said inherent address and the destination address of the packet header based on said positional address is consistent with data in said router address association data, outputting a true value if the association between the destination address of the packet header based on said inherent address and the destination address of the packet header based on said positional address is consistent with data in said router address association data, and outputting a false value if the association between the destination address of the packet header based on said inherent address and the destination address of the packet header based on said positional address is not consistent with data in said router address association data;
e) means for transferring the received packet as it is if said inherent address determining means outputs a true value, said positional address determining means outputs a true value, said inherent address and router address association data comparing means outputs a true value, and said address association comparing means outputs a true value;
f) means for replacing the destination address of the packet header based on said positional address of said received packet with a positional address indicated by said router address association data, thereby reconfigurating the header based on said positional address of said received packet, and transferring the packet, if said inherent address determining means outputs a true value, said positional address determining means outputs a true value, said inherent address and router address association data comparing means outputs a true value, and said address association comparing means outputs a false value;
g) means for discarding said received packet if said inherent address determining means outputs a true value, said positional address determining means outputs a true value, and said inherent address and router address association data comparing means outputs a false value;
h) means for transferring the received packet as it is if said inherent address determining means outputs a true value, said positional address determining means outputs a false value, said inherent address and router address association data comparing means outputs a true value, and said address association comparing means outputs a true value;

i) means for replacing the destination address of the packet header based on said positional address of said received packet with a positional address indicated by said router address association data, thereby reconfigurating the header based on said positional address of said received packet, and transferring the packet, if said inherent address determining means outputs a true value, said positional address determining means outputs a false value, said inherent address and router address association data comparing means outputs a true value, and said address association comparing means outputs a false value;

j) means for discarding said received packet if said inherent address determining means outputs a true value, said positional address determining means outputs a false value, and said inherent address and router address association data comparing means outputs a false value;

k) means for transferring the received packet as it is if said inherent address determining means outputs a false value, said positional address determining means outputs a true value, said inherent address and router address association data comparing means outputs a true value, and said address association comparing means outputs a true value;

l) means for replacing the destination address of the packet header based on said positional address of said received packet with the destination address of the packet header based on said inherent address of said received packet, thereby reconfigurating the header based on said positional address of said received packet, and transferring the packet, if said inherent address determining means outputs a false value, said positional address determining means outputs a true value, said inherent address and router address association data comparing means outputs a true value, and said address association comparing means outputs a false value;

m) means for replacing the destination address of the packet header based on said positional address of said received packet with the destination address of the packet header based on said inherent address of said received packet, thereby reconfigurating the header based on said positional address of said received packet, and transferring the packet, if said inherent address determining means outputs a false value, said positional address determining means outputs a true value, and said inherent address and router address association data comparing means outputs a false value; and n) means for transferring the received packet as it is if said inherent address determining means outputs a false value, and said positional address determining means outputs a false value.

The analyzing and reconfigurating means may comprise:

a) inherent address determining means for determining whether a destination address of the packet header based on said inherent address is an address indicating a mobile terminal connected to the auxiliary network to which said router is directly connected, outputting a true value if the destination address of the packet header based on said inherent address is the address indicating the mobile terminal connected to the auxiliary network to which said router is directly connected, and outputting a false value if the destination address of the packet header based on said inherent address is not the address indicating the mobile terminal connected to the auxiliary network to which said router is directly connected;

b) positional address determining means for determining whether a destination address of the packet header based on said positional address is an address indicating a mobile terminal connected to the auxiliary network to which said router is directly connected, outputting a true value if the destination address of the packet header based on said positional address is the address indicating the mobile terminal connected to the auxiliary network to which said router is directly connected, and outputting a false value if the destination address of the packet header based on said positional address is not the address indicating the mobile terminal connected to the auxiliary network to which said router is directly connected;

c) inherent address and router address association data comparing means for determining whether the destination address of the packet header based on said inherent address is present in the router address association data of said router, outputting a true value if the destination address of the packet header based on said inherent address is present in the router address association data of said router, and outputting a false value if the destination address of the packet header based on said inherent address is not present in the router address association data of said router;

d) address association comparing means for determining whether an association between the destination address of the packet header based on said inherent address and the destination address of the packet header based on said positional address is consistent with data in said router address association data, outputting a true value if the association between the destination address of the packet header based on said inherent address and the destination address of the packet header based on said positional address is consistent with data in said router address association data, and outputting a false value if the association between the destination address of the packet header based on said inherent address and the destination address of the packet header based on said positional address is not consistent with data in said router address association data;

e) means for transferring the received packet as it is if said inherent address determining means outputs a true value, said positional address determining means outputs a true value, said inherent address and router address association data comparing means outputs a true value, and said address association comparing means outputs a true value;

f) means for replacing the destination address of the packet header based on said positional address of said received packet with a positional address indicated by said router address association data, thereby reconfigurating the header based on said positional address of said received packet, and transferring the packet, if said inherent address determining means outputs a true value, said positional address determining means outputs a true value, said inherent address and router address association data comparing means outputs a true value, and said address association comparing means outputs a false value;

g) means for discarding said received packet if said inherent address determining means outputs a true value, said positional address determining means outputs a true value, and said inherent address and router address association data comparing means outputs a false value;

h) means for transferring the received packet as it is if said inherent address determining means outputs a true value, said positional address determining means outputs a false value, said inherent address and router address association data comparing means outputs a true value, and said address association comparing means outputs a true value;

i) means for replacing the destination address of the packet header based on said positional address of said received packet with a positional address indicated by said router address association data, thereby reconfigurating the header based on said positional address of said received packet, and transferring the packet, if said inherent address determining means outputs a true value, said positional address determining means outputs a false value, said inherent address and router address association data comparing means outputs a true value, and said address association comparing means outputs a false value;

j) means for discarding said received packet if said inherent address determining means outputs a true value, said positional address determining means outputs a false value, and said inherent address and router address association data comparing means outputs a false value;

k) means for transferring the received packet as it is if said inherent address determining means outputs a false value, said positional address determining means outputs a true value, said inherent address and router address association data comparing means outputs a true value, and said address association comparing means outputs a true value;

l) means for replacing the destination address of the packet header based on said positional address of said received packet with a positional address indicated by the router address association data, thereby reconfigurating the header based on said positional address of said received packet, and transferring the packet, if said inherent address determining means outputs a false value, said positional address determining means outputs a true value, said inherent address and router address association data comparing means outputs a true value, and said address association comparing means outputs a false value;

m) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, and said inherent address and router address association data comparing means outputs a false value; and n) means for transferring the received packet as it is if said inherent address determining means outputs a false value, and said positional address determining means outputs a false value.

Each of mobile terminals may comprise:

a) means for receiving said database updating information and holding the same data as said database and said address association information relative to a terminal with which the mobile terminal is to communicate, as mobile terminal address association information;

b) means for detecting whether the inherent address of a source in a header based on the inherent address of a received packet is contained in said mobile terminal address association information;

c) means for adding an association between the inherent address of the source in the header based on the inherent address of the received packet and the positional address of the source in the header based on the positional address of the received packet, to said mobile terminal address association information, if the inherent address of the source is not contained in said mobile terminal address association information; and d) means for updating said mobile terminal address association information using an association between the inherent address of the source in the header based on the inherent address of the received packet and the positional address of the source in the header based on the positional address of the received packet, if the inherent address of the source is contained in said mobile terminal address association information and also if the association between the inherent address of the source in the header based on the inherent address of the received packet and the positional address of the source in the header based on the positional address of the received packet is different from an association contained in said mobile terminal address association information.

Each of said mobile terminals may comprise:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configurating a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configurating a header based on the positional address of the destination and the positional address of the mobile terminal.

With the above arrangement, data representing an association between the inherent and positional addresses of a mobile terminal is properly managed by only the home network of the mobile terminal, the router of the auxiliary network in which the mobile terminal is currently present, and the database thereof. A router which is not connected to the home network of the mobile terminal and the auxiliary network in which the mobile terminal is currently present can relay packets without concern over associations between addresses of the packets. Since the address association data maintained in the databases are limited to latest data, packets are not required to contain version information with respect to address associations.

In the mobile packet communication system, the mobile terminals transmit and receive transmission data encapsulated by a plurality of headers each equally composed of a plurality of fields, and each of said mobile terminals comprises means for assuming a portion of received transmission data to be a header, detecting whether said portion assumed to be a header is a normal header or not, assuming a portion of the received transmission data contiguous to said portion assumed to be a header, to be an encapsulating header if said portion assumed to be a header is detected as being a normal header, and detecting a portion of the received transmission data up to said portion assumed to be a header, as an encapsulating header if said portion assumed to be a header is detected as not being a normal header.

The mobile terminals may transmit and receive transmission data encapsulated by a maximum of N headers each equally composed of a plurality of fields, and each of said mobile terminals may comprise:

a) means for setting an indicator i indicating the number of encapsulating headers of encapsulated transmission data which is received to 1, extracting a first header from the start of the encapsulated transmission data, and detecting a header length L of the first header;

b) means for detecting whether the extracted first header is properly received or not, discarding the encapsulated transmission data if the extracted first header is not properly received and is detected as not being a header, and adding 1 to said indicator i if the extracted first header is detected as a properly received header;

c) means for inputting the indicator i, regarding the maximum number of encapsulating headers as N, and comparing the indicator i with (N+1); and d) means for repeatedly outputting a value N produced by subtracting 1 from the indicator i as the number of encapsulating headers if the indicator i is equal to (N+1), assuming a portion of the encapsulated transmission data from an ((i−1) (L+1)th header to an (i (L)th header as counted from the start of the encapsulated transmission data, to be an ith header if the indicator i is not equal to (N+1), extracting the ith assumed header, detecting whether said ith assumed header is a normal header or not, outputting a value produced by subtracting 1 from the indicator i as the number of encapsulating headers if said ith assumed header is not a normal header, adding 1 to the indicator i if said ith assumed header is a normal header, and comparing the indicator i with (N+1), for thereby detecting a packet header.

The mobile terminals may transmit and receive transmission data encapsulated by a maximum of N headers each equally composed of a plurality of fields, and each of said mobile terminals may comprise:

a) means for setting an indicator i indicating the number of encapsulating headers of encapsulated transmission data which is received to 1, extracting a first header from the start of the encapsulated transmission data, and detecting a header length L of the first header;

b) means for detecting whether the extracted first header is properly received or not, discarding the encapsulated transmission data if the extracted first header is not properly received and is detected as not being a header, and adding 1 to said indicator i if the extracted first header is detected as a properly received header;

c) means for inputting the indicator i, regarding the maximum number of encapsulating headers as N, and comparing the indicator i with (N+1);

d) means for repeatedly outputting a value N produced by subtracting 1 from the indicator i as the number of encapsulating headers if the indicator i is equal to (N+1), detecting whether a portion of the encapsulated transmission data from an ((i−1) (L+1)th header as counted from the start of the encapsulated transmission data is a higher header contained in headers up to an ((i−1) (L)th header as counted from the start of the encapsulated transmission data or not, outputting a value produced by subtracting 1 from the indicator i as the number N of encapsulating headers if said portion is detected as a higher header, and detecting an ith header indicated by said indicator i if said portion is not detected as a higher header; and e) means for repeatedly assuming a portion of the encapsulated transmission data from an ((i−1) (L+1)th header to an (i (L)th header as counted from the start of the encapsulated transmission data, to be an ith header, extracting the ith assumed header, detecting whether said ith assumed header is a normal header or not, outputting a value produced by subtracting 1 from the indicator i as the number of encapsulating headers if said ith assumed header is not a normal header, adding 1 to the indicator i if said ith assumed header is a normal header, and comparing the indicator i with (N+1), for thereby detecting a packet header.

The fields of each of the headers may include an error detecting information field containing error detecting information for detecting whether an error occurs in the header, and each of said mobile terminals may comprise means for detecting whether said first header is properly received or not using a value inserted in said error detecting information field from said first header, determining said first header as not being properly received if an error occurs in said first header, determining said first header as being properly received if no error occurs in said first header, detecting whether an error occurs in said ith assumed header using a value inserted in a portion assumed to be said error detecting information field from said ith assumed header, determining said ith assumed header as not being a normal header if an error occurs in said ith assumed header, and determining said ith assumed header as being a normal header if no error occurs in said ith assumed header.

Each of said mobile terminals may comprise means for detecting field information from the fields of said first header, extracting field information from said ith assumed header, determining said ith assumed header as not being a normal header if said field information detected from the fields of said first header and said field information extracted from said ith assumed header are inconsistent with each other, and detecting whether an error occurs in said ith assumed header using a value inserted in a portion assumed to be an error detecting information field from said ith assumed header if said field information detected from the fields of said first header and said field information extracted from said ith assumed header are not inconsistent with each other.

One of said fields may serve as a common field, and said field information comprises information inserted in the common fields of said maximum of N headers.

In order to detect whether a received packet is encapsulated or not, a portion of the received packet is assumed to be a header, and it is determined whether the portion assumed to be a header is a normal header or not.

If the portion assumed to be a header is a normal header, then the portion of the received packet which is contiguous to the portion assumed to be a header is assumed to be an encapsulating header, and it is determined whether the portion assumed to be an encapsulating header is a normal header or not.

If the portion assumed to be an encapsulating header is not a normal header, the portion up to the portion assumed to be an encapsulating header is recognized as an encapsulating header.

Whether the portion assumed to be an encapsulating header is a normal header or not may be determined as follows:

If a checksum field used to detect whether an error occurs in a header is added, then a value inserted in this field may be employed. It is determined whether an error occurs in a portion assumed to be a header using a value inserted in a field which is assumed to be a checksum field in the portion which is assumed to be a header of the received packet.

If the portion assumed to be a header is a normal header, then no error is detected using the value in the checksum field.

If the portion assumed to be a header is not a normal header, then since that portion is transmission data, a value other than a checksum value is considered to be inserted in the portion which is assumed to be a checksum field. Therefore, using a value inserted in the portion which is assumed to be a checksum field, an error is detected as occurring in the portion which is assumed to be a header.

In this manner, it is determined whether the portion which is assumed to be a header is a normal header or not.

An error detecting device which employs such a checksum value is subject to an increased burden. In order to remove the burden imposed on the error detecting device, information obtained from a field of a header may be used. For example, when transmission data is encapsulated, fields indicative of a higher protocol in headers are used as common fields in all encapsulating headers. By comparing a value contained in a common field of a first header and a value contained in a portion assumed to be a common field of a portion which is assumed to be an encapsulating field, it is possible to determine whether a portion assumed to be a header is a normal header or not.

If the value contained in the common field of the first header and the value contained in the portion assumed to be the common field of the portion which is assumed to be an encapsulating field, then the portion assumed to be a header is detected as not being a normal header without an error detecting process. Thus, it is possible to detect whether the portion assumed to be a header is a normal header using not only a value assumed to be a checksum value, but also a value inserted in a portion assumed to be a field in a portion assumed to be a header.

Even if a field indicating that data is encapsulated is not present in a header, since it is known that transmission data has been encapsulated by a maximum of N headers, packets can efficiently be received even when it is not known how many headers are used to encapsulate the transmission data.

In the mobile packet communication system, each of said routers may comprise:

a) packet receiving means for receiving a packet;
b) means for maintaining information relative to locations of said mobile terminals;
c) a memory for storing a movable-compatible auxiliary network table which indicates whether each of said auxiliary networks is a movable-compatible auxiliary network or not;
d) header processing means for analyzing a header of a packet received by said packet receiving means and reconfigurating said header using said information relative to locations of said mobile terminals and said movable-compatible auxiliary network table, and updating said movable-compatible auxiliary network table; and
e) packet transmitting means for transmitting a packet outputted from said header processing means.

Each of said mobile terminals, respectively, may have a positional address depending on the auxiliary network to which the mobile terminal is currently connected and an inherent address independent of the auxiliary network to which the mobile terminal is currently connected and depending on the auxiliary network which manages the mobile terminal, and the header processing means may comprise:

a) packet detecting means for detecting whether a received packet is a packet having both an inherent address header based on said inherent address and a positional address header based on said positional address or a packet having only said inherent address header;
b) means for inputting the packet having said inherent address header and said positional address header, reconfigurating said inherent address header and said positional address header, information relative to the location of the mobile terminal, and the received packet based on said movable-compatible auxiliary network table, and updating said movable-compatible auxiliary network table; and
c) means for inputting the packet having only the inherent address header, reconfigurating said inherent address header, information relative to the location of the mobile terminal, and the received packet based on said movable-compatible auxiliary network table, and updating said movable-compatible auxiliary network table.

Each of the routers has a table indicating not only address association information with respect to a mobile terminal having as its home network the auxiliary network to which the router is directly connected, and a mobile terminal which is currently connected to the auxiliary network to which the router is directly connected, but also whether the destination of a packet is a mobile-compatible auxiliary network or not. Therefore, none of the mobile terminals is required to check whether the destination of a packet to be transmitted is a mobile-compatible auxiliary network or not, but mobile-compatible routers convert a packet format, making it possible to effect communications between mobile terminals, between mobile and fixed terminals, and between fixed terminals.

Since each of the routers has means for automatically updating the table which indicates whether the destination of a packet is a mobile-compatible auxiliary network or not, it is possible to prevent overhead from increasing due to format conversion for improper packets.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 11a and 11b are a flowchart of an algorithm for realizing a header analyzer/reconfigurator of a router;

FIGS. 12a and 12b are a flowchart of another algorithm for realizing a header analyzer/reconfigurator of a router;

FIG. 13 is a flowchart of a process effected when a packet is received by each of mobile terminals shown in FIG. 5;

FIG. 22 is a diagram showing a table of mobile-compatible auxiliary networks;

FIG. 23 is a diagram showing a table of associated inherent and positional addresses;

FIG. 26 is a block diagram of the header processor shown in FIG. 21;

FIGS. 27, 28a and 28b are a flowchart of an operation process of a packet reconfigurator shown in FIG. 26 for reconfigurating a packet having both positional and inherent addresses;

FIGS. 29 and 30 are a flowchart of an operation process of a packet reconfigurator shown in FIG. 26 for reconfigurating a packet having only an inherent address;

FIG. 31 is a sequence diagram of a sequence of indicating a mobile-compatible auxiliary network;

FIG. 32 is a sequence diagram of another sequence of indicating a mobile-compatible auxiliary network;

DETAILED DESCRIPTION OF THE PREFERRED EMBODIMENTS

Figure 5:
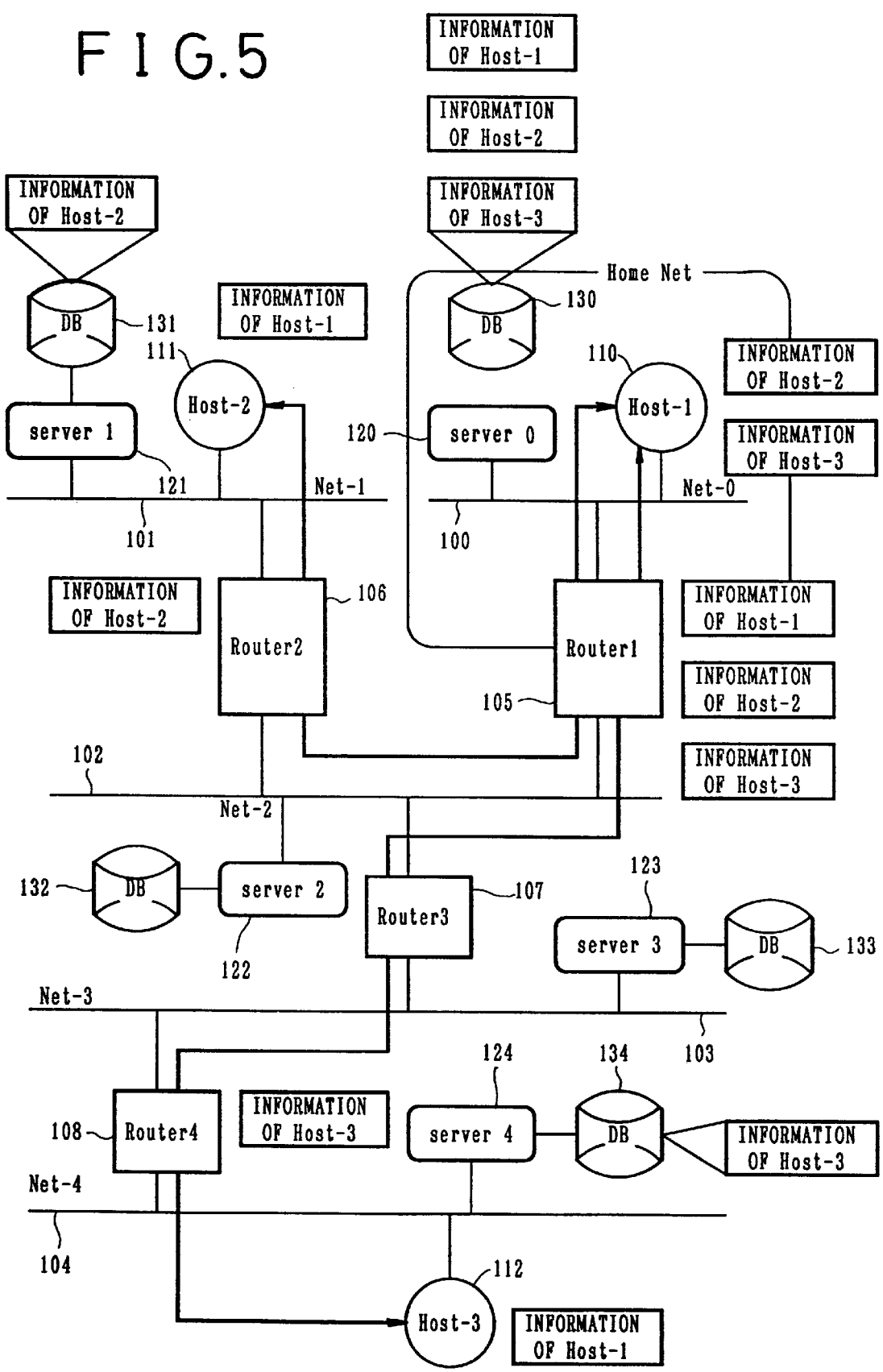
FIG. 5 is a block diagram of a network model which incorporates a mobile packet communication system according to the present invention.

FIG. 5 shows in block form a network model which incorporates a mobile packet communication system according to the present invention.

In FIG. 5, the reference numerals 100–104 represent auxiliary networks Net-0–Net-4, the reference numerals 105–108 represent routers Router1–Router4, the reference numerals 110–112 represent mobile terminals Host-1–Host-3, the reference numerals 120–124 represent database management servers server0–server4, and the reference numerals 130–134 represent databases DB.

In the embodiment shown in FIG. 5, the mobile terminal Host-1 (110) is communicating with the mobile terminals Host-2 (111), Host-3 (112), and a home network for the mobile terminals Host-1 (110), Host-2 (111), Host-3 (112) is the auxiliary network Net-0 (100). Therefore, the mobile terminals Host-1 (110), Host-2 (111), Host-3 (112) have respective inherent addresses depending on the auxiliary network Net-0 (100). Since the mobile terminals Host-1 (110), Host-2 (111), Host-3 (112) are connected respectively to the auxiliary networks Net-0 (100), Net-1 (101), Net-4 (104), the mobile terminals Host-1 (110), Host-2 (111), Host-3 (112) have respective positional addresses depending on the respective auxiliary networks Net-0 (100), Net-1 (101), Net-4 (104). At this time, data indicative of an association between the inherent and positional addresses of the mobile terminals Host-1 (110), Host-2 (111), Host-3 (112) is maintained as follows:

Host-1: the database DB (130) of Net-0, the router Router1 (105), and the mobile terminals Host-2 (111), Host-3 (112);

Host-2: the database DB (130) of Net-0, the router Router1 (105), and the mobile terminal Host-1 (110);

Host-3: the database DB (130) of Net-0, the router Router1 (105), the database DB (134) of Net-4, the router Router4 (108), and the mobile terminals Host-1 (110).

The data is therefore maintained in a database for managing a home network for a mobile terminal, a router connected to the home network, a database for managing an auxiliary network in which the mobile terminal is positioned, a router connected to the auxiliary network, and a terminal which the mobile terminal is communicating with.

Figure 6:
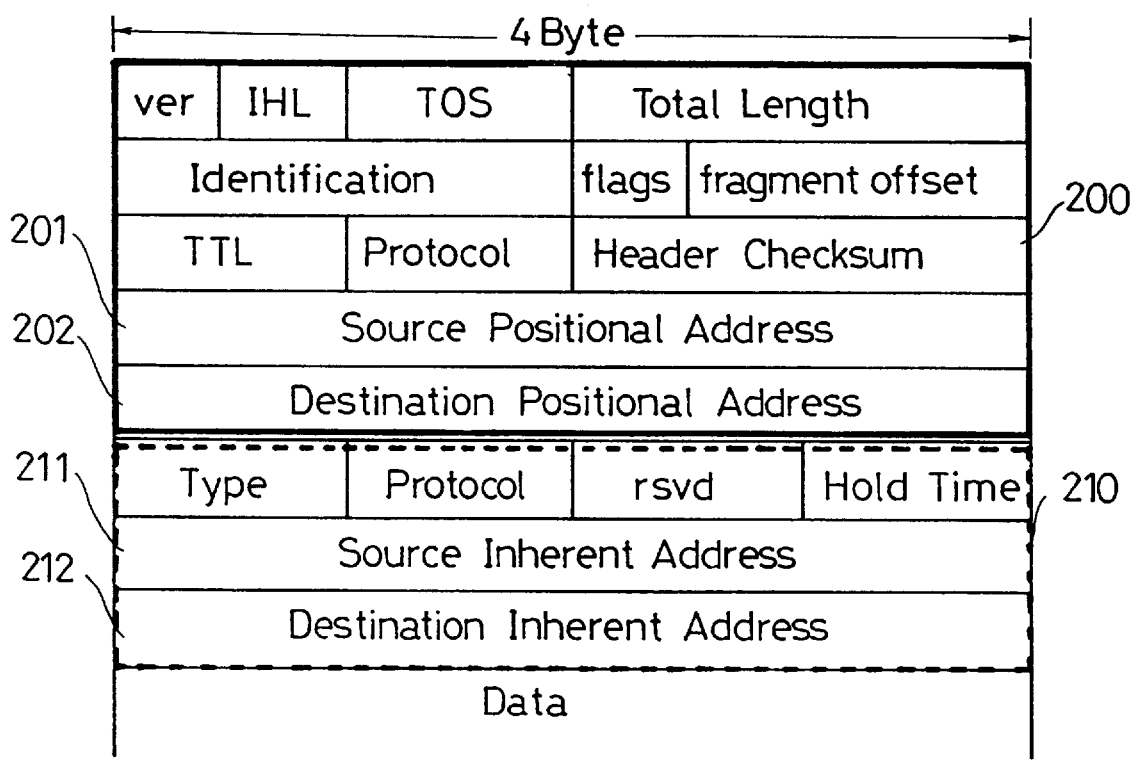
FIG. 6 is a diagram showing a packet format used in the mobile packet communication system shown in FIG. 5.

FIG. 6 shows a format of data packets used in the above network model, with Internet Protocol IP is applied to an inherent address processing layer and a positional address processing layer. In FIG. 6, the reference numeral 200 pointing to a solid-line frame represents a packet header based on positional addresses, and the reference numerals 201, 202 represent positional addresses of a source and a destination in the packet header 200 based on positional addresses. The reference numeral 210 pointing to a broken-line frame represents a packet header based on inherent addresses, and the reference numerals 211, 212 represent inherent addresses of a source and a destination.

Figure 7:
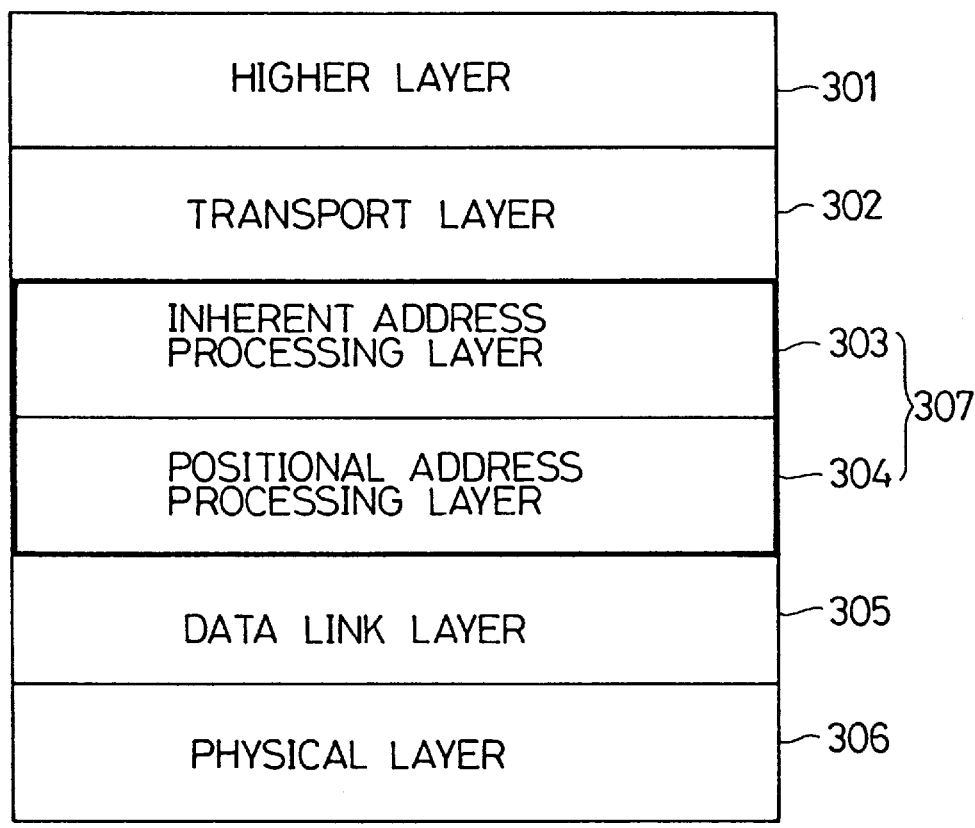
FIG. 7 is a diagram of a protocol stack in a mobile terminal.

FIG. 7 shows a protocol stack in mobile terminals for communications using the packet format shown in FIG. 6. As shown in FIG. 7, the protocol stack comprises a higher layer 301 such as an application layer or the like, a transport layer 302, an inherent address processing layer 303 for processing inherent addresses, a positional address processing layer 304 for processing positional addresses, a data link layer 305, and a physical layer 306. The inherent address processing layer 303 and the positional address processing layer 304 jointly make up a network layer 307.

Those layers above the inherent address processing layer 303 are not required to take the positions of mobile terminals into account because they are capable of identifying mobile terminals with their inherent addresses. The positional address processing layer 304 effects header processing based on a positional address depending on the actual position of a mobile terminal which is identified by the inherent address thereof. For example, in order to transmit a packet, the association between inherent and positional addresses of a mobile terminal as a destination is determined, and a header based on the positional address is added to the packet, which is then transferred to the data link layer 305. Those layers below the positional address processing layer 304 effect header processing based on a packet header based on the positional address depending on the present position of the mobile terminal. Therefore, the packet is properly transmitted no matter where the mobile terminal may exists, insofar as the association between inherent and positional addresses of the mobile terminal is correct.

Figure 8:
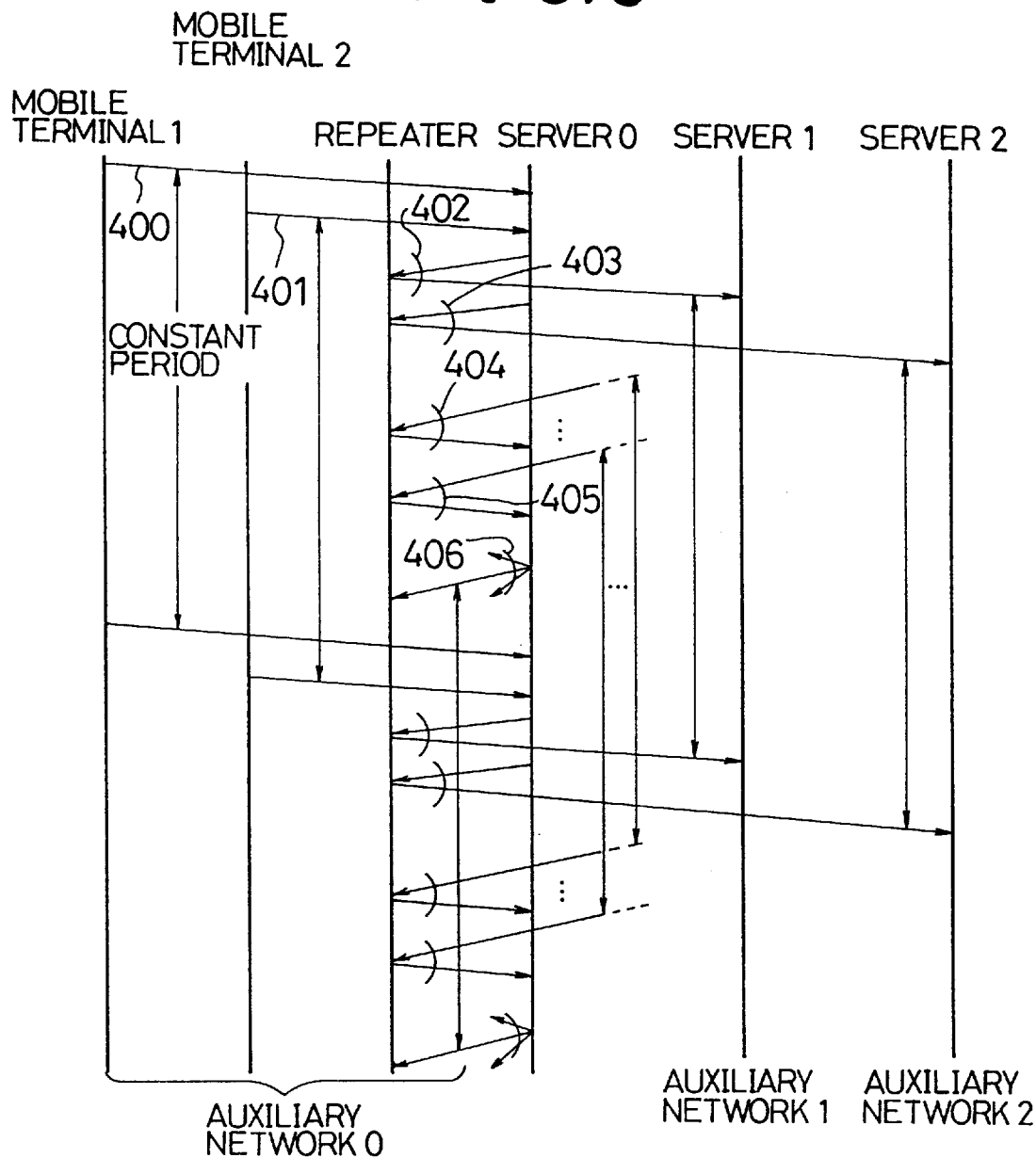
FIG. 8 is a sequence diagram showing a procedure for maintaining an association between inherent and positional addresses of mobile terminals.

Proper transmission of a packet requires that the association between inherent and positional addresses of each mobile terminal be correctly maintained. A process of maintaining such an association between addresses will be described below with reference to FIG. 8. In FIG. 8, the reference numerals 400, 401 represent periodic messages supplied from mobile terminals to a database server, the reference numerals 402–405 represent periodic messages supplied from database servers to database servers of other auxiliary networks, and the reference numeral 406 represents a multiaddress message supplied from a database server to an auxiliary network.

It is assumed that two mobile terminals, i.e., a mobile terminal 1 and a mobile terminal 2, are present in an auxiliary network 0, and the mobile terminal 1 has an inherent address depending on an auxiliary network 1 and the mobile terminal 2 has an inherent address depending on an auxiliary network 2. The mobile terminals 1, 2 have respective home networks which are the auxiliary networks 1, 2. Since the mobile terminals 1, 2 are present in the auxiliary network 0, they have respective positional addresses depending on the auxiliary network 0. The mobile terminals 1, 2 periodically supply a server 0 which manages databases of the auxiliary network 0, with periodic messages 400, 401 which include:

inherent addresses thereof;

positional addresses thereof; and addresses of servers which manage the data bases of the home networks. These messages are generated at different times by the mobile terminals. The period of the messages is selected to be shorter than the time before a database entry is deleted without being updated. According to the this embodiment, the periodic messages 400, 401 supplied from the mobile terminals to the database server and the periodic messages 402–405 supplied from database serves to database servers of other auxiliary networks have the same period as the period at which the multiaddress message 406 is generated, and the period is selected to be shorter than the time before a database entry is deleted without being updated.

A server of a database receives the periodic messages 400, 401 from mobile terminals connected to the auxiliary network which is managed by the server, and also receives the periodic messages 404, 405 from servers of databases which manage other auxiliary networks. These messages indicate the association between inherent and positional addresses of mobile terminals whose home networks are auxiliary networks managed by the server, among those mobile terminals that are present in other than the auxiliary networks managed by the server. Specifically, the server 0 of the auxiliary network 0 is a mobile terminal whose home network is the auxiliary network 0, and is supplied with the association between inherent and positional addresses of mobile terminals that have moved to auxiliary networks other than the auxiliary network 0, from the servers of the auxiliary networks in which the respective mobile terminals are present. Upon reception of the periodic messages 400, 401 from the mobile terminals and the periodic messages 404, 405 from servers of databases which manage other auxiliary networks, the server 0 of the auxiliary network 0 updates the data, stored in the database, which represents the association between inherent and positional addresses of mobile terminals.

The server 0 transmits the periodic messages 402, 403 to servers of databases of other auxiliary networks. These messages indicate the association between inherent and positional addresses of mobile terminals whose home networks are networks other than auxiliary networks managed by the home networks, among the data managed by the server, to servers of databases which manage the home networks of the mobile terminals. For example, the server 0 periodically indicates the association between inherent and positional addresses of the mobile terminal 1, which is obtained by the periodic message 400 from the mobile terminal 1, as the periodic message 402 to the server 1 of the auxiliary network 1 which is the home network of the mobile terminal 1. Similarly, the information obtained by the periodic message 401 from the mobile terminal 2 is indicated as the periodic message 403 to the server 2.

Through the above procedure, the database of an auxiliary network properly maintains the association between inherent and positional addresses relative to:

a mobile terminal whose home network is the auxiliary network; and a mobile terminal which is present in the auxiliary network. The server of the database periodically supplies a multiaddress message 406 to an auxiliary network. When the router connected to the auxiliary network receives the multiaddress message 406, the router updates the association which it has between inherent and positional addresses of a mobile terminal. Thus, the router can maintain the same data as the database of the auxiliary network to which the router is connected. The multiaddress message 406 can also be received by the mobile terminal connected to the auxiliary network for updating the association which the mobile terminal has between inherent and positional addresses.

Figure 9:
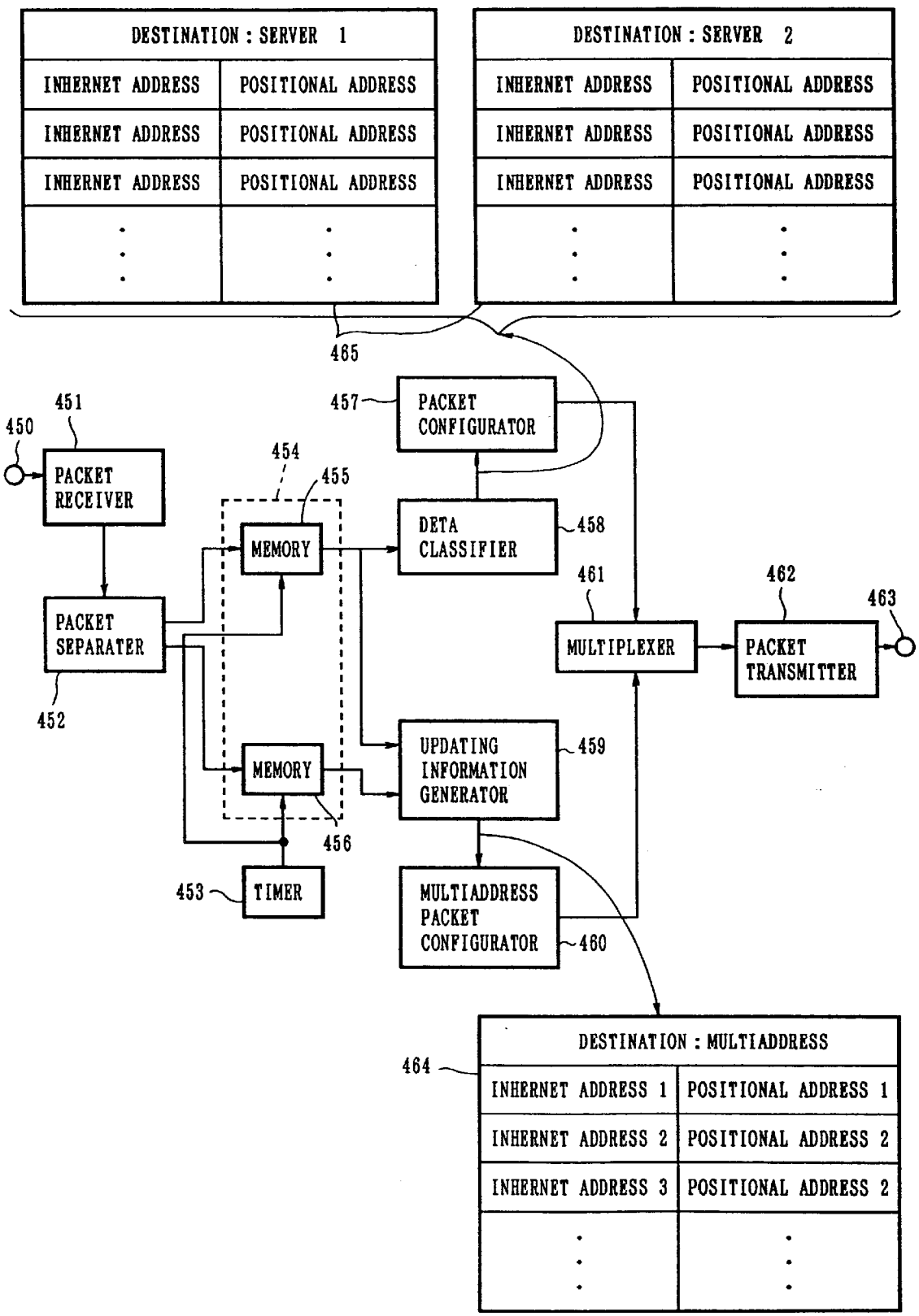
FIG. 9 is a block diagram of a server for managing a database.

Details of a server which effects the above procedure is shown in FIG. 9. As shown in FIG. 9, the server has an input terminal 450, a packet receiver 451, a packet separator 452, a timer 453, a packet configurator 457, a data classifier 458, an updating information generator 459, a multiaddress packet configurator 460, a multiplexer 461, a packet transmitter 462, and an output terminal 463. The updating information generator 459 generates database updating information 464, and the data classifier 458 produces address association information 465 for other auxiliary networks. The server also has a memory assembly 454 composed of a memory 455 for storing address association information from a mobile terminal connected to the auxiliary network managed by the server, and a memory 456 for storing address association information in another auxiliary network from a server which manages the other auxiliary network.

The packet receiver 451 receives a packet supplied from the input terminal 450 and outputs the received packet to the packet separator 452. If the supplied packet is representative of address association information from a mobile terminal connected to the auxiliary network managed by the server, then the packet separator 452 separates and outputs the address association information to the memory 455. If the supplied packet is representative of address association information in another auxiliary network from a server which manages the other auxiliary network, then the packet separator 452 separates and outputs the address association information to the memory 456. The timer 453 transmits an output pulse to the memories 455, 456 at each of the constant periods of time. In response to an output pulse from the timer 453, the memory 455 outputs the stored data to the data classifier 458 and the updating information generator 459, and the memory 456 outputs the stored data to the updating information generator 459. The data classifier 458 classifies the supplied data by servers which manage home networks, generating address association information 465 for other auxiliary networks. The updating information generator 459 generates database updating information 464 representing an association between all inherent and positional addresses based on the data stored in and supplied from the memories 455, 456. The multiplexer 461 multiplexes the address association information 465 for other auxiliary networks and the database updating information 464 in a packet, and outputs the packet to the packet transmitter 462. The packet transmitter 462 transmits the supplied packet through the output terminal 463.

Figure 10:
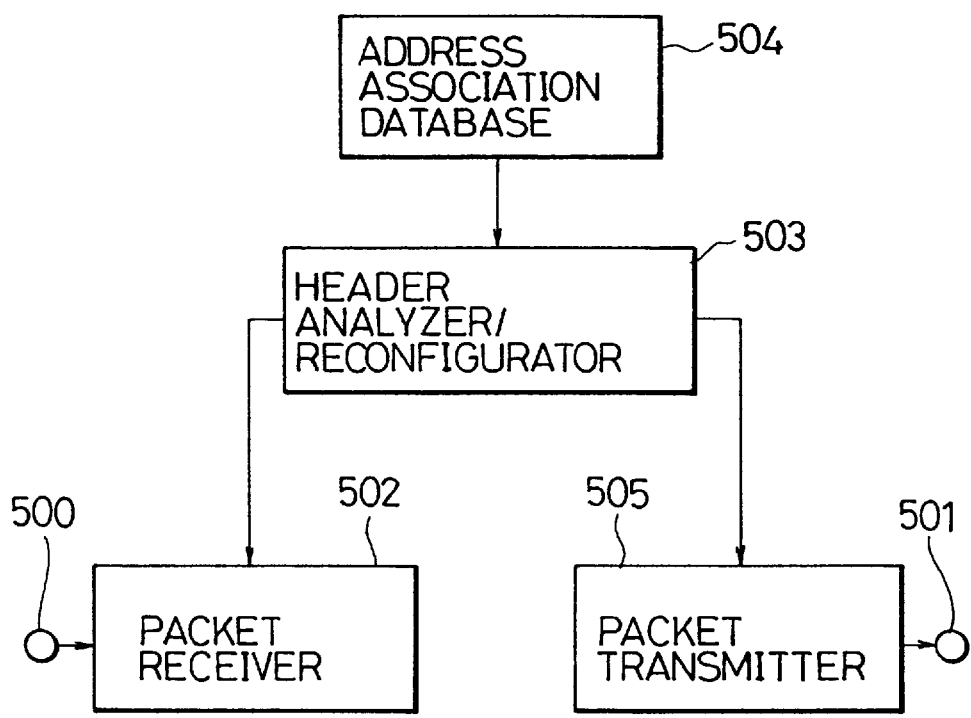
FIG. 10 is a block diagram showing structure of each of the routers shown in FIG. 5.

Operation of a router and a mobile terminal using data that represents an association between inherent and positional addresses, which is maintained as described above, will be described below. FIG. 10 shows in block form a structure of each of the routers 105 108 shown in FIG. 5. As shown in FIG. 10, the router comprises an input terminal 500, an output terminal 501, a packet receiver 502, a header analyzer/reconfigurator 503, an address association database 504 which contains data representing an association between inherent and positional addresses of the mobile terminal of the router, and a packet transmitter 505. A packet supplied from the input terminal 500 is received by the packet receiver 502. The received packet is supplied to the header analyzer/reconfigurator 503, which analyzes and reconfigures the header of the received packet based on the data contained in the address association database 504, and then supplies the packet with the reconfigured header to the packet transmitter 505. The packet transmitter 505 transmits the supplied packet through the output terminal 501.

The header analyzer/reconfigurator 503 can be realized by an operation which is effected as follows: The router Router1 (105) shown in FIG. 5 is used as an example, and the operation of the header analyzer/reconfigurator 503 in the router Router1 (105) will be described below with reference to FIGS. 5 and 10. The header analyzer/reconfigurator 503 in the router Router1 (105) detects the inherent address of a destination from a header based on an inherent address in a packet which is received, and determines whether or not the packet is destined for a mobile terminal connected to the auxiliary network Net-0 (100) or Net-2 (102) to which the router Router1 (105) is directly connected. The header analyzer/reconfigurator 503 also detects the positional address of the destination from a header based on a positional address in the received packet, and determines whether or not the packet is destined for a mobile terminal connected to the auxiliary network Net-0 (100) or Net-2 (102) to which the router Router1 (105) is directly connected. Based on the determined results and the data contained in the address association database 504, the header analyzer/reconfigurator 503 reconfigures the received packet according to the following algorithm:

1: If the inherent address of the destination indicates a packet destined for a mobile terminal in the auxiliary networks Net-1 (101), Net-3 (103), Net-4 (104) to which the router Router1 (105) is not directly connected, and also if the positional address of the destination indicates a packet destined for a mobile terminal in the auxiliary networks Net-1 (101), Net-3 (103), Net-4 (104) to which the router Router1 (105) is not directly connected, then the router Router1 (105) transfers the packet based on the positional address of the destination of the received packet;

2: If the inherent address of the destination indicates a packet destined for a mobile terminal in the auxiliary networks Net-1 (101), Net-3 (103), Net-4 (104) to which the router Router1 (105) is not directly connected, and if the positional address of the destination indicates a packet destined for a mobile terminal in the auxiliary networks Net-0 (100), Net-2(102) to which the router Router1 (105) is directly connected, and also if the association between the inherent and positional addresses of the destination of the received packet is inconsistent with the address association data of the mobile terminal which the router Router1 (105) has, then the router Router1 (105) converts the positional address of the destination of the received packet into the inherent address of the destination, and transfers the packet to the home network of the destination of the packet;

3: If the inherent address of the destination indicates a packet destined for a mobile terminal in the auxiliary networks Net-1 (101), Net-3 (103), Net-4 (104) to which the router Router1 (105) is not directly connected, and if the positional address of the destination indicates a packet destined for a mobile terminal in the auxiliary networks Net-0 (100), Net-2(102) to which the router Router1 (105) is directly connected, and also if the association between the inherent and positional addresses of the destination of the received packet is consistent with the address association data of the mobile terminal which the router Router1 (105) has, then the router Router1 (105) transfers the received packet as it is;

4: If the inherent address of the destination indicates a packet destined for a mobile terminal in the auxiliary networks Net-1 (101), Net-3 (103), Net-4 (104) to which the router Router1 (105) is not directly connected, and if the positional address of the destination indicates a packet destined for a mobile terminal in the auxiliary networks Net-0 (100), Net-2(102) to which the router Router1 (105) is directly connected, and also if the data of the positional address relative to the inherent address of the destination of the received packet is not present in the address association data of the mobile terminal which the router Router1 (105) has, then the router Router1 (105) converts the positional address of the destination of the received packet into the inherent address of the destination, and transfers the packet to the home network of the destination of the packet;

5: If the inherent address of the destination indicates a packet destined for a mobile terminal in the auxiliary networks Net-0 (100), Net-2(102) to which the router Router1 (105) is directly connected, and if the positional address of the destination indicates a packet destined for a mobile terminal in the auxiliary networks Net-1 (101), Net-3 (103), Net-4 (104) to which the router Router1 (105) is not directly connected, and also if the association between the inherent and positional addresses of the destination of the received packet is inconsistent with the address association data of the mobile terminal which the router Router1 (105) has, then the router Router1 (105) converts the positional address of the destination of the received packet into the positional address of the destination which corresponds to the inherent address of the destination of the packet in the address association data of the mobile terminal which the router Router1 (105) has, and transfers the packet;

6: If the inherent address of the destination indicates a packet destined for a mobile terminal in the auxiliary networks Net-0 (100), Net-2(102) to which the router Router1 (105) is directly connected, and if the positional address of the destination indicates a packet destined for a mobile terminal in the auxiliary networks Net-1 (101), Net-3 (103), Net-4 (104) to which the router Router1 (105) is not directly connected, and also if the association between the inherent and positional addresses of the destination of the received packet is consistent with the address association data of the mobile terminal which the router Router1 (105) has, then the router Router1 (105) transfers the received packet as it is;

7: If the inherent address of the destination indicates a packet destined for a mobile terminal in the auxiliary networks Net-0 (100), Net-2(102) to which the router Router1 (105) is directly connected, and if the positional address of the destination indicates a packet destined for a mobile terminal in the auxiliary networks Net-1 (101), Net-3 (103), Net-4 (104) to which the router Router1 (105) is not directly connected, and also if the data of the positional address relative to the inherent address of the destination of the received packet is not present in the address association data of the mobile terminal which the router Router1 (105) has, then the router Router1 (105) discards the received packet;

8: If the inherent address of the destination indicates a packet destined for a mobile terminal in the auxiliary networks Net-0 (100), Net-2(102) to which the router Router1 (105) is directly connected, and if the positional address of the destination indicates a packet destined for a mobile terminal in the auxiliary networks Net-0 (100), Net-2(102) to which the router Router1 (105) is directly connected, and also if the association between the inherent and positional addresses of the destination of the received packet is inconsistent with the address association data of the mobile terminal which the router Router1 (105) has, packet destined for a mobile terminal in the auxiliary networks Net-0 (100), Net-2(102) to which the router Router1 (105) is directly connected, and also if the data of the positional address relative to the inherent address of the destination of the received packet is not present in the address association data of the mobile terminal which the router Router1 (105) has, then the router Router1 (105) discards the received packet.

A flowchart of the above algorithm are illustrated in FIGS. 11a and 11b. In FIG. 11a and 11b, a step 551 is carried out to determine an inherent address, steps 552, 553 to determine a positional address, steps 554–556 to compare the inherent address with router address association data, steps 557–559 to compare address association data with database data, a step 560 to reconfigure and transfer a packet based on the inherent address, a step 561 to transfer a packet, a step 562 to reconfigure and transfer a packet based on the router address association data, and a step 563 to discard a packet.

When the processing of the flowchart is started, it is determined in the step 551 whether the inherent address of the destination indicates a mobile terminal in an auxiliary network to which the router is directly connected. If the inherent address of the destination does not indicate a mobile terminal in an auxiliary network to which the router is directly connected, then it is determined in the step 552 whether the positional address of the destination indicates a mobile terminal in an auxiliary network to which the router is directly connected. If the positional address of the destination does not indicate a mobile terminal in an auxiliary network to which the router is directly connected, then the packet is transferred as it is in the step 561, after which the processing ends.

If the positional address of the destination indicates a mobile terminal in an auxiliary network to which the router is directly connected in the step 552, then it is determined in the step 554 whether the positional address corresponding to the inherent address of the destination is present in the database. If the positional address corresponding to the inherent address of the destination is not present in the database, then the positional address of the destination of the packet is converted into the inherent address of the destination, and the packet is transferred in the step 560, after which the processing ends.

If the positional address corresponding to the inherent address of the destination is present in the database in the step 554, then it is determined in a step 557 whether the association between the inherent then the router Router1 (105) converts the positional address of the destination of the received packet into the positional address of the destination which corresponds to the inherent address of the destination of the packet in the address association data of the mobile terminal which the router Router1 (105) has, and transfers the packet;

9: If the inherent address of the destination indicates a packet destined for a mobile terminal in the auxiliary networks Net-0 (100), Net-2(102) to which the router Router1 (105) is directly connected, and if the positional address of the destination indicates a packet destined for a mobile terminal in the auxiliary networks Net-0 (100), Net-2(102) to which the router Router1 (105) is directly connected, and also if the association between the inherent and positional addresses of the destination of the received packet is consistent with the address association data of the mobile terminal which the router Router1 (105) has, then the router Router1 (105) transfers the received packet as it is; and 10: If the inherent address of the destination indicates a packet destined for a mobile terminal in the auxiliary networks Net-0 (100), Net-2(102) to which the router Router1 (105) is directly connected, and if the positional address of the destination indicates a and positional addresses of the destination is consistent with the data in the database. If the association between the inherent and positional addresses of the destination is inconsistent with the data in the database, then the positional address of the destination of the packet is converted into the inherent address of the destination, and the packet is transferred in the step 560, after which the processing ends.

If the association between the inherent and positional addresses of the destination is consistent with the data in the database in the step 557, then the packet is transferred as it is in the step 561, after which the processing ends.

If the inherent address of the destination indicates a mobile terminal in an auxiliary network to which the router is directly connected in the step 551, then it is determined in the step 553 whether the positional address of the destination indicates a mobile terminal in an auxiliary network to which the router is directly connected. If the positional address of the destination does not indicate a mobile terminal in an auxiliary network to which the router is directly connected, then it is determined in the step 555 whether the positional address corresponding to the inherent address of the destination is present in the database. If the positional address corresponding to the inherent address of the destination is not present in the database, then the packet is discarded in the step 563, after which the processing ends.

If the positional address corresponding to the inherent address of the destination is present in the database in the step 555, then it is determined in the step 558 whether the association between the inherent and positional addresses of the destination is consistent with the data in the database. If the association between the inherent and positional addresses of the destination is inconsistent with the data in the database, then the positional address of the destination of the packet is converted into the positional address indicated by the data destined for the router, and the packet is transferred in the step 562, after which the processing ends.

If the association between the inherent and positional addresses of the destination is consistent with the data in the database in the step 558, then the packet is transferred as it is in the step 561, after which the processing ends.

If the positional address of the destination indicates a mobile terminal in an auxiliary network to which the router is directly connected in the step 553, then it is determined in the step 556 whether the positional address corresponding to the inherent address of the destination is present in the database. If the positional address corresponding to the inherent address of the destination is not present in the database, then the packet is discarded in the step 563, after which the processing ends.

If the positional address corresponding to the inherent address of the destination is present in the database in the step 556, then it is determined in the step 559 whether the association between the inherent and positional addresses of the destination is consistent with the data in the database. If the association between the inherent and positional addresses of the destination is inconsistent with the data in the database, then the positional address of the destination of the packet is converted into the positional address indicated by the data destined for the router, and the packet is transferred in the step 562, after which the processing ends.

If the association between the inherent and positional addresses of the destination is consistent with the data in the database in the step 559, then the packet is transferred as it is in the step 561, after which the processing ends.

Another algorithm shown in FIGS. 12a and 12b may be employed for realizing the header analyzer/reconfigurator 503 of the router. The algorithm shown in FIGS. 12a and 12b differs from the algorithm shown in FIGS. 11a and 11b in that if the association between the inherent and positional addresses of the destination is inconsistent with the data in the database in the step 557, then the processing goes from the step 557 to the step 562, or more specifically, if the inherent address of the destination indicates a packet destined for a mobile terminal in the auxiliary networks Net-1 (101), Net-3 (103), Net-4 (104) to which the router Router1 (105) is not directly connected, and if the positional address of the destination indicates a packet destined for a mobile terminal in the auxiliary networks Net-0 (100), Net-2(102) to which the router Router1 (105) is not directly connected, and also if the association between the inherent and positional addresses of the destination of the received packet is inconsistent with the address association data of the mobile terminal which the router Router1 (105) has, then the router Router1 (105) converts the positional address of the destination of the received packet into the positional address of the destination which corresponds to the inherent address of the destination of the packet in the address association data of the mobile terminal which the router Router1 (105) has, and transfers the packet.

Figure 14:
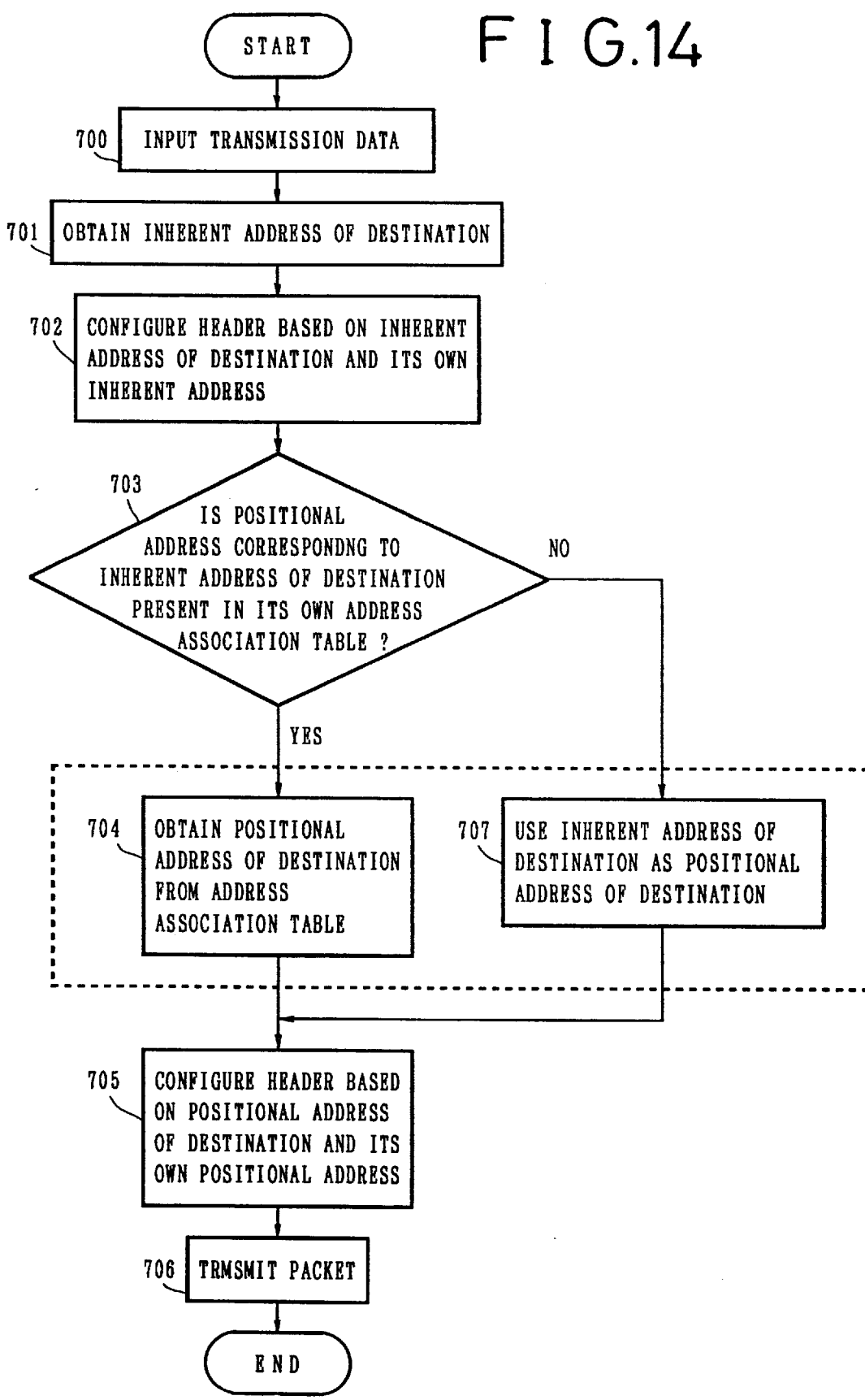
FIG. 14 is a flowchart of a process effected when a packet is transmitted by each of mobile terminals shown in FIG. 5.

FIG. 13 shows a process effected when a packet is received by each of the mobile terminals 110–112 shown in FIG. 5, and FIG. 14 shows a process effected when a packet is transmitted by each of the mobile terminals 110–112 shown in FIG. 5.

In FIG. 13, a step 600 is carried out to receive a packet, a step 601 to search for the positional address of the received packet in address association data, a step 602 to compare an address association of the packet with the address association data, a step 603 to update the address association data, and a step 604 to add address association data.

When a packet is received by a mobile terminal in the step 600, it is determined in the step 601 whether a source address in the header based on an inherent address is present in its own address association table, i.e., the address association table of the mobile terminal. If the source address in the header based on the inherent address is not present in its own address association table, then data relative to association between the source address in the header based on the inherent address and the source address in the header based on the positional address is added to its own address association table in the step 604, after which the processing comes to an end. If the source address in the header based on the inherent address is present in its own address association table, then it is determined in the step 602 whether the data relative to an association between the source address in the header based on the inherent address and the source address in the header based on the positional address is the same as the association data in its own address association table. If these association data are the same as each other, i.e., are consistent with each other, then the processing comes to an end. However, if these association data are not the same as each other, i.e., are inconsistent with each other, then its own address association table is updated in the step 603 based on the association between the source address in the header based on the inherent address of the received packet and the source address in the header based on the positional address of the received packet, after which the processing comes to an end.

In FIG. 14, a step 700 is carried out to input transmission data, a step 701 to obtain the inherent address of a destination, a step 702 to configure a packet header based on the inherent address, a step 703 to search for the positional address of the destination, steps 704, 707 to establish a positional address of the destination, a step 705 to configure a packet header based on the positional address, and a step 706 to transmit a packet.

When transmission data from a higher layer is inputted in the step 700, the inherent address of a destination is obtained in the step 701. Thereafter, a packet header is configurated in the step 702 based on the inherent address obtained in the step 701 and the inherent address of a mobile terminal which serves as the source. It is determined in the step 703 whether the positional address corresponding to the inherent address of the destination is present in address association data. If the positional address corresponding to the inherent address of the destination is present in the address association data, then the positional address is used as the positional address of the destination in the step 704. If the positional address corresponding to the inherent address of the destination is not present in the address association data in the step 703, then the inherent address of the destination is used as the positional address of the destination in the step 707. Based on the positional address of the destination which has been obtained in the step 704 or 705 and its own positional address, i.e., the positional address of the mobile terminal, a packet header is configured in the step 705. Then, a packet is transmitted in the step 706, and the processing ends.

According to the above embodiment, the mobile packet communication system which supports mobile terminals using two addresses, i.e., an address which does not depend on positions and an address which depends on positions, and which is required to properly maintain data relative to an association between those addresses, facilitates a control process for maintaining the data relative to the association between those addresses and also reduces an amount of communications required by the control process.

Figure 15:
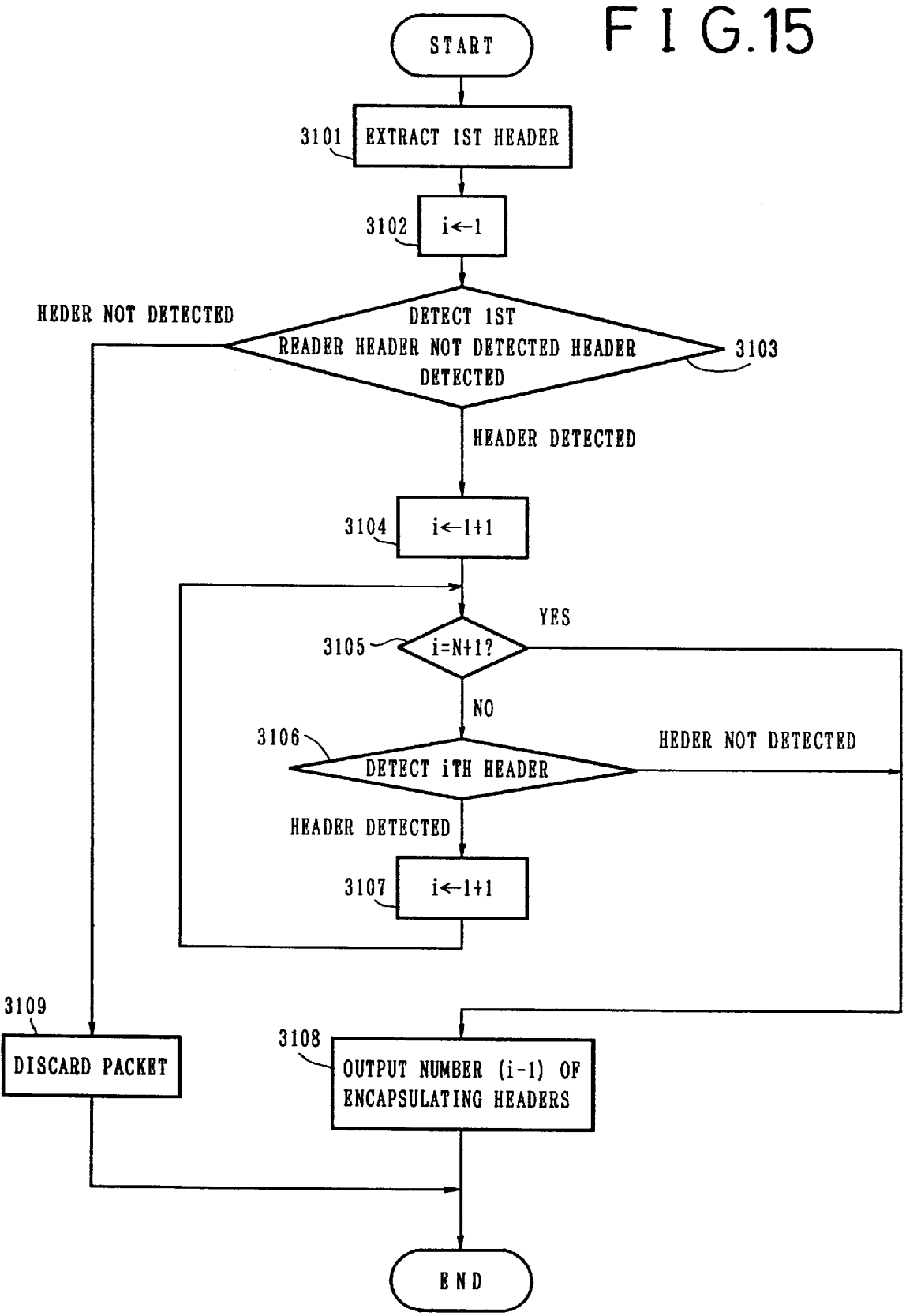
FIG. 15 is a flowchart of an operation process according to another embodiment of the present invention.

Another embodiment of the present invention will be described below with reference to FIGS. 15 through 17. This embodiment is directed to the detection of a packet header in each of mobile terminals. FIG. 15 shows an operation process according to the embodiment. In the operation process shown in FIG. 15, a packet shown in FIG. 17 which is encapsulated by three internet protocol headers each shown in FIG. 16.

In packet communications, it is frequent for at least one header to be added to the start of a packet. When a packet shown in FIG. 17 is received, a first header 3300 is extracted from the packet and the header length (header length 1) is detected from a header length field 3315-1 in a step 3101 shown in FIG. 15. Then, an indicator i representing the number of encapsulating headers is set to 1 in a step 3102. Since internet protocol headers employ 4 octets as a unit for the length of headers, the actual header length is (4 header length 1) octets. It is detected in a step 3103 whether an error occurs in the first header 3300 using a value (header checksum 1) inserted as error detecting information in a checksum field which is contained in the header 3300 as an error detecting information field for detecting any error in the header. If an error is detected, then the received packet is discarded in a step 3109. If no error is detected, then 1 is added to the indicator i, thereby setting the indicator i to 2 in a step 3104.

In order to count headers which are encapsulated, it is determined in a step 3105 whether the indicator i is equal to (N+1) where N is the maximum number of headers which are encapsulated. If the indicator i is equal to (N+1), then since the number of detected headers is equal to N, the number of encapsulating headers is outputted in a step 3108. If the indicator i is not equal to (N+1), then since the received packet may possibly be encapsulated by more headers, an ith header is detected in a step 3106 in order to determine whether the packet is encapsulated by more headers. It is assumed that the maximum number N of headers is 5 in this example. Since the indicator i is 2 at present and different from N+1=6, the ith=2nd header is detected in the step S3106.

It is assumed in the step 3106 that the ith header extends from the ((i−1) (header length 1 (4+1) octet data to the (i (header length 1 (4) octet data, as counted from the start of the received packet. The ith header is detected by detecting whether a portion assumed to be the ith header is a normal header or not. If a portion assumed to be the ith header is a normal header, then 1 is added to the indicator i in a step 3107 in preparation for detecting whether the packet is encapsulated by a next header. If a portion assumed to be the ith header is not a normal header, then since it is known that the received packet is encapsulated by (i −1) headers, the number of encapsulating headers is outputted as (i−1) in the step 3108.

Since i=2 at present, it is assumed that a portion corresponding to a header 3301 is the second header for the detection of a second header in the step 3106. A second header is detected by detecting whether an error occurs in the header 3301, assumed to be a second header, using a value (checksum 2) inserted in a checksum field 3308 contained in the header 3301. Because the header 3301 is a normal header, the header 3301 is detected as a normal header unless it suffers a transmission error.

Figure 1:
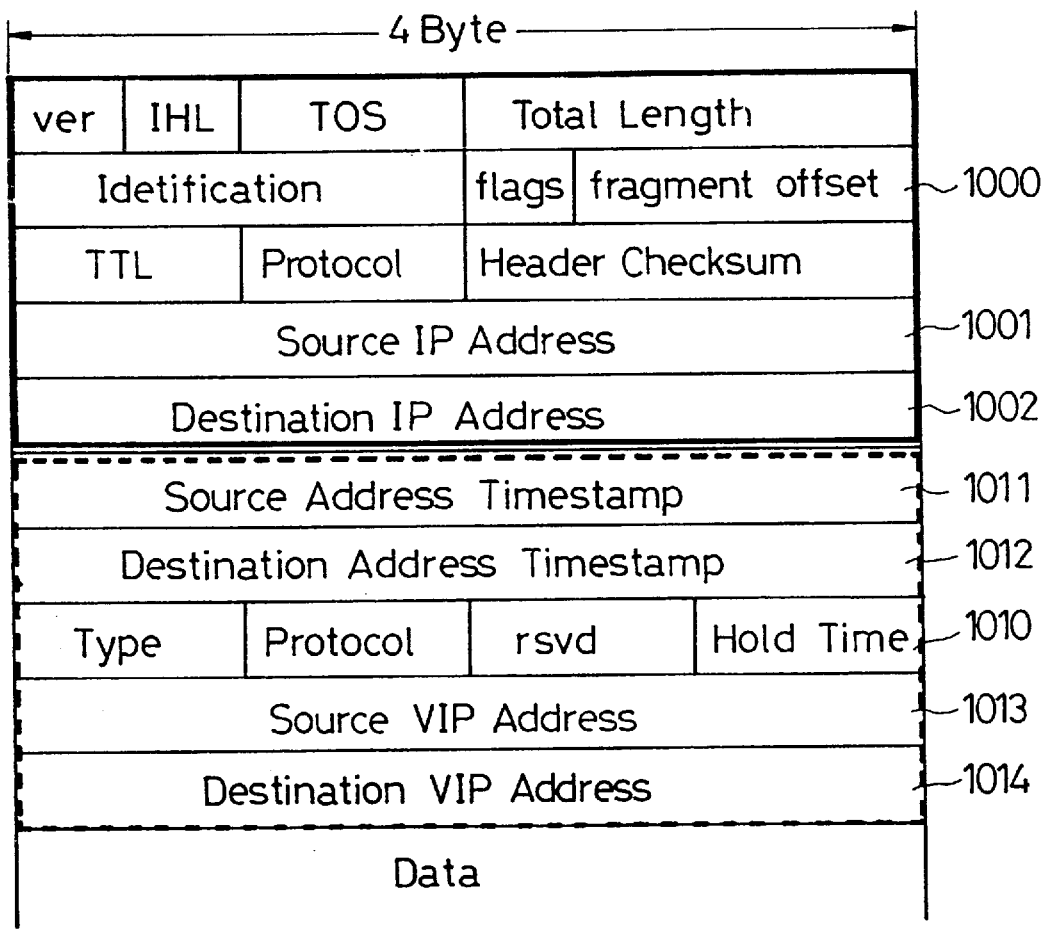
FIG. 1 is a diagram showing a conventional packet format.
Figure 2:
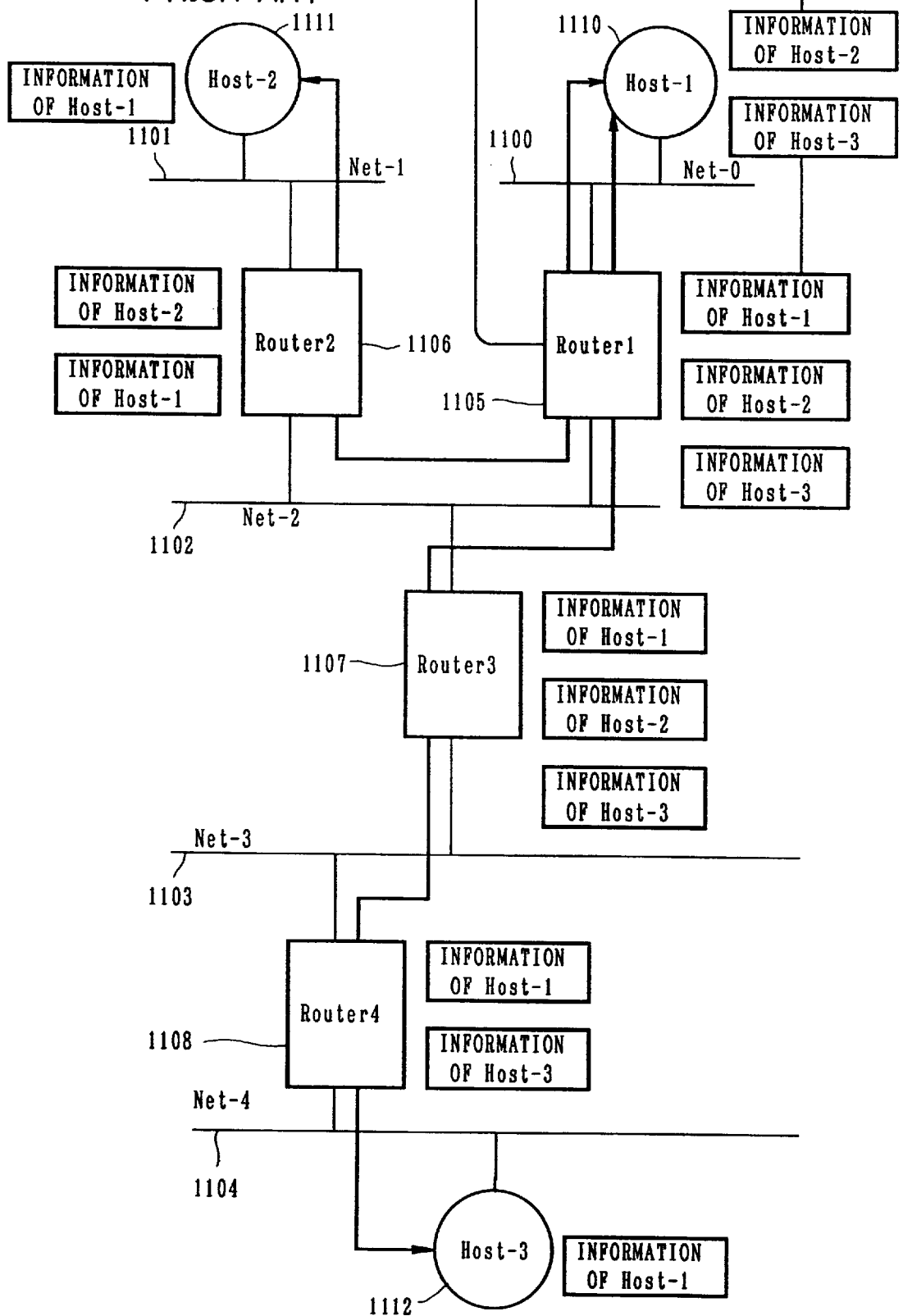
FIG. 2 is a block diagram of a mobile packet communication system which employs the packet format shown in FIG. 1.
Figure 3:
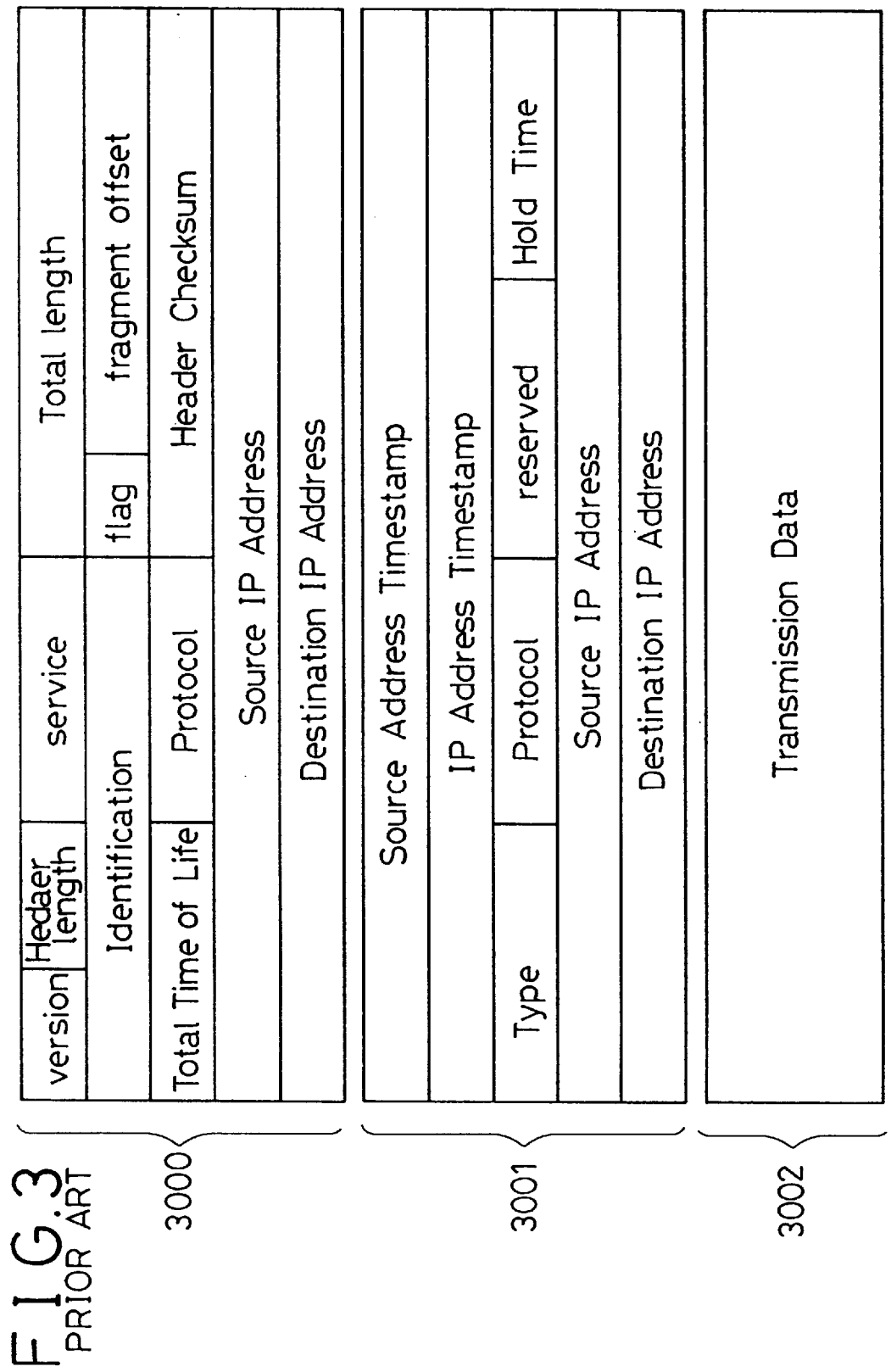
FIG. 3 is a diagram of a header configuration used by a mobile terminal shown in Document 1.
Figure 4:
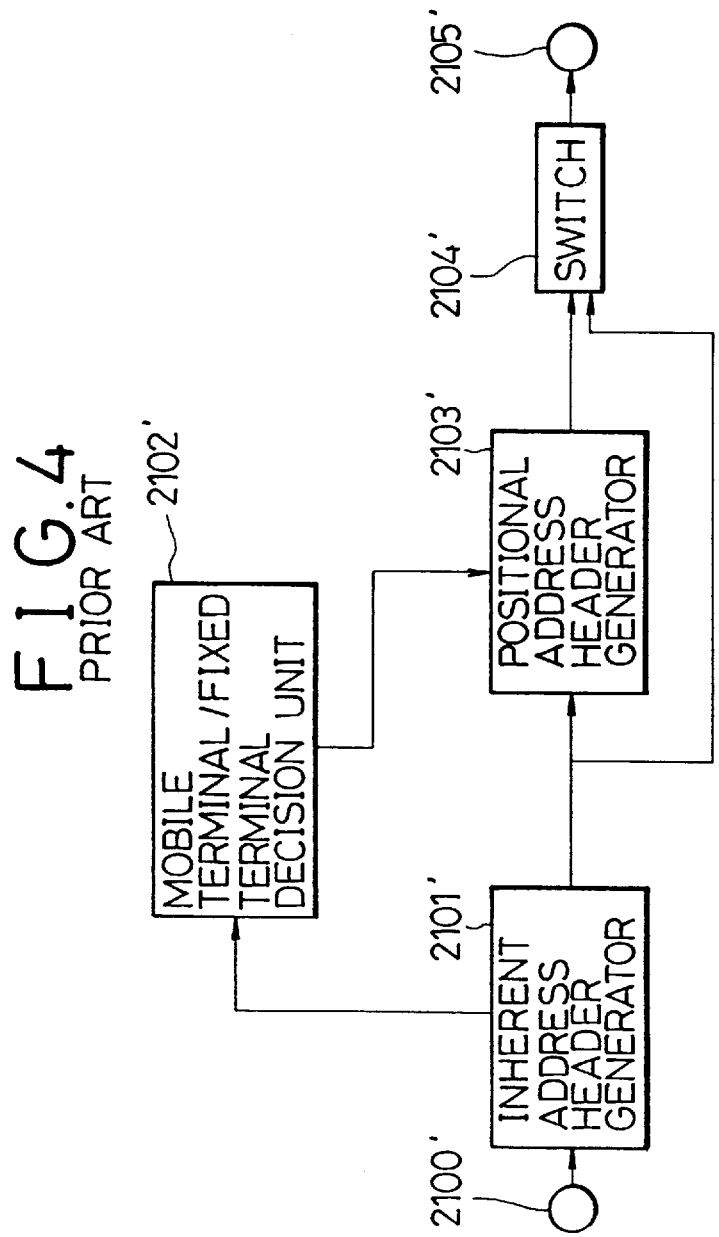
FIG. 4 is a block diagram of a conventional mobile terminal transmission system.

Then, 1 is added to the indicator i in preparation for detecting whether the packet is encapsulated by a third header. The packet shown in FIG. 3 is encapsulated by three headers, and the third header with i=3 is detected in the same manner as when i=2. A header 3302 is therefore detected as a normal header.

When the detection of the third header is over, the indicator i is set to i=4. For detection of a fourth header, a portion 3310 of transmission data 3320 is assumed to be a fourth header. A fourth header is detected by detecting whether an error occurs in the portion 3302, assumed to be a fourth header, using a value (checksum 4) inserted in a portion 3311, assumed to be a checksum field, contained in the portion 3310. Since the portion 3310 is part of the transmission data 3320, the value inserted in the portion 3311, assumed to be a checksum field, is not a proper checksum value. The portion 3310 which is assumed to be a fourth header is detected as containing an error. Consequently, the portion assumed to be a fourth header is not determined as a header, and the number of encapsulating headers is outputted as (i−1=3). It is therefore possible to extract the number of headers which encapsulate the received packet even if a header does not contain a field indicating whether the header encapsulates the packet.

Figure 18:
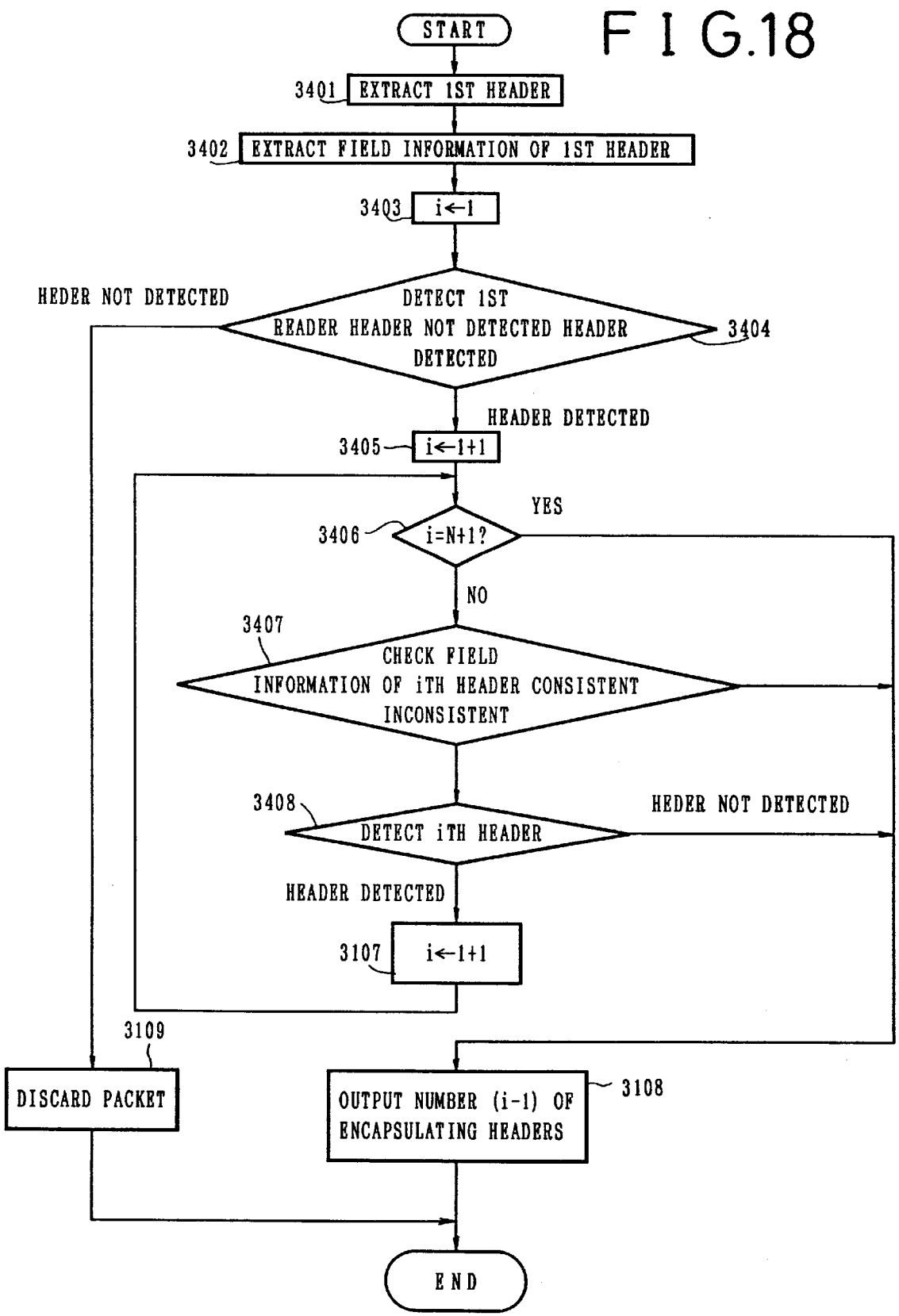
FIG. 18 is a flowchart of an operation process according to still another embodiment of the present invention, for lessening a burden imposed in the detection of an error in a header.

An operation process shown in FIG. 18 according to still another embodiment of the present invention may be employed to lessen the burden imposed by the process of detecting whether a portion assumed to be a header is a normal header or not using a checksum value.

The operation process shown in FIG. 18 differs from the operation process shown in FIG. 15 in that it additionally has a step 3402 for detecting field information in a first header and a step 3407 for inspecting field information of an ith header. Only those portions of the operation process shown in FIG. 18 which differ from the operation process shown in FIG. 15 will be described below.

A first header of a received packet is extracted in a step 3401. In the step 3402, field information of the first header is detected thereby to detect information based on fields that make up the first header. In the step 3407, field information is extracted from a portion which is assumed to be an ith header, and compared with the field information of the first header which has been detected in the step 3402. If the extracted field information is inconsistent with the field information of the first header, then the portion which is assumed to be an ith header is not determined as a normal header. The number of encapsulating headers is outputted as (i-1)) in a step 3410. If the extracted field information is consistent with the field information of the first header, then it is determined in a step 3408 whether an error occurs in the ith header using a checksum value, thereby determining whether the ith header is a normal header or not. Since it is determined whether a header is a normal header or not before any error is detected in the header, it is possible to lessen the burden imposed by the detection of an error in a header.

Figure 16:
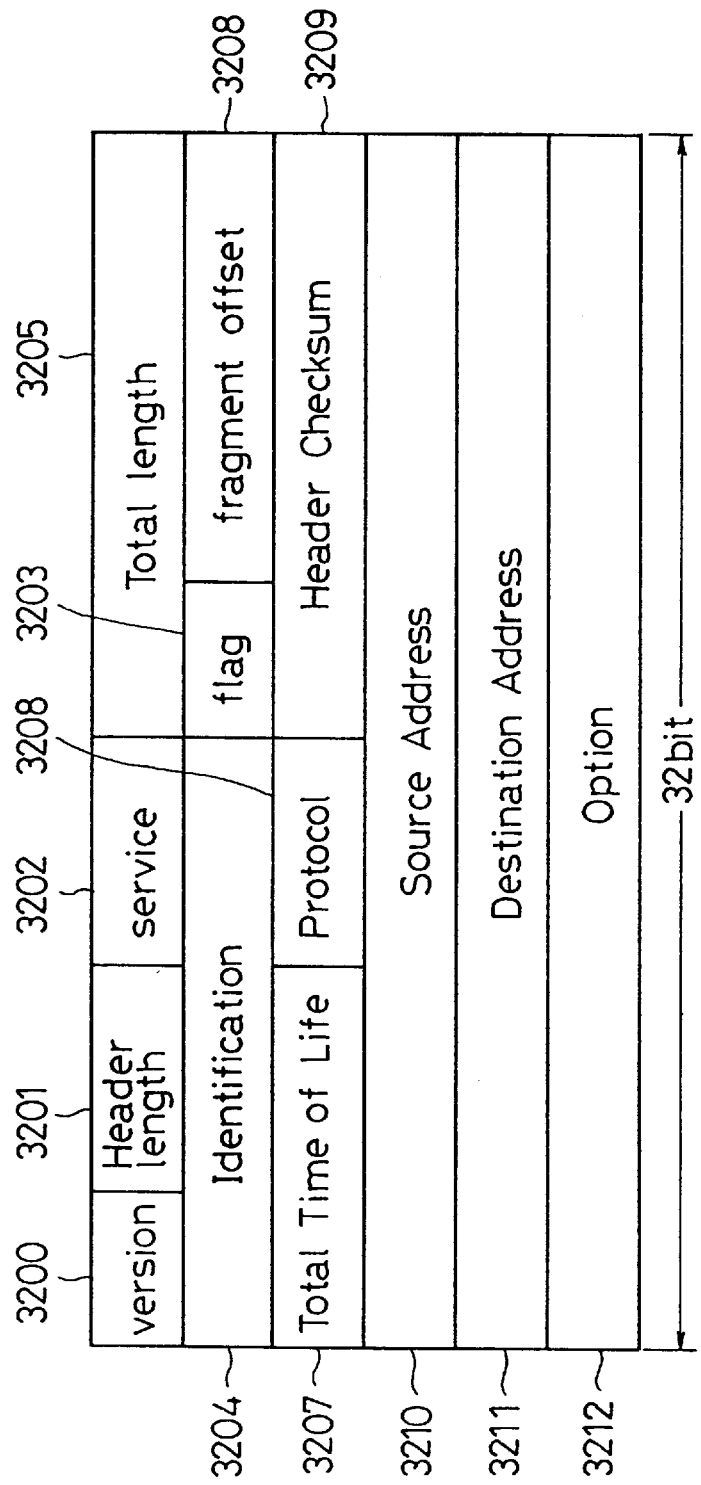
FIG. 16 is a diagram of an internet protocol header used in the operation process shown in FIG. 15.
Figure 17:
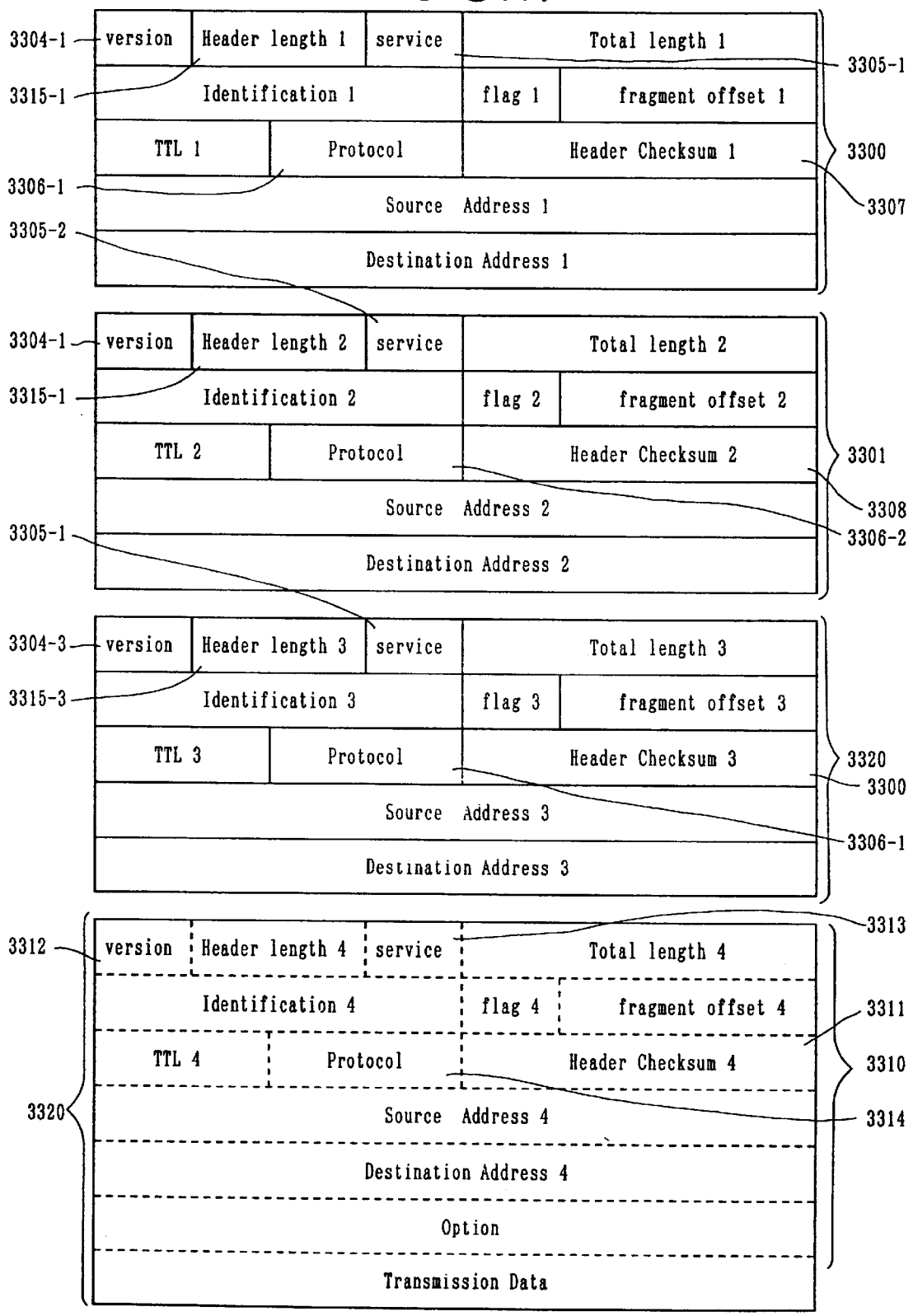
FIG. 17 is a diagram of a packet encapsulated by three internet protocol headers each shown in FIG. 16.

If th header shown in FIG. 16 is used, then a total length field 3205 may be used as representing field information. The total length field 3205 contains a value indicative of the total length of the header and the transmission data. A value contained in the total length field of a portion assumed to be a second header or a subsequent header is not greater than a value contained in the total length field of the first header. If a value contained in a portion assumed to be the total length field of a portion assumed to be an ith header is greater than a value contained in a portion assumed to be the total length field of the first header, then the field information of the portion assumed to be the ith header is inconsistent with the field information of the first header, and hence the portion assumed to be the ith header is not detected as a normal header.

Since one item of transmission data is encapsulated in a received packet, there are fields common to all the headers which encapsulate the packet. For example, the same values are inserted in version fields 3304-1–3304-3, service fields 3305-1–3305-3, and protocol fields 3306-1–3306-3 of the respective headers. When field information of the first header is detected, a common value inserted in the fields of all the headers is detected as the field information. For checking field information of an ith header in the step 3407, a portion assumed to be a field which contains a common value is extracted from a portion assumed to be the ith header, and its field information is compared with the field information extracted from the first header in the step 3402. If the compared items of field information are not the same as each other, then they are inconsistent with each other, and the portion assumed to be the ith header is not detected as a normal header. As described above, a burden imposed by the detection of an error in a header can be reduced by effectively using field information of the header.

Figure 19:
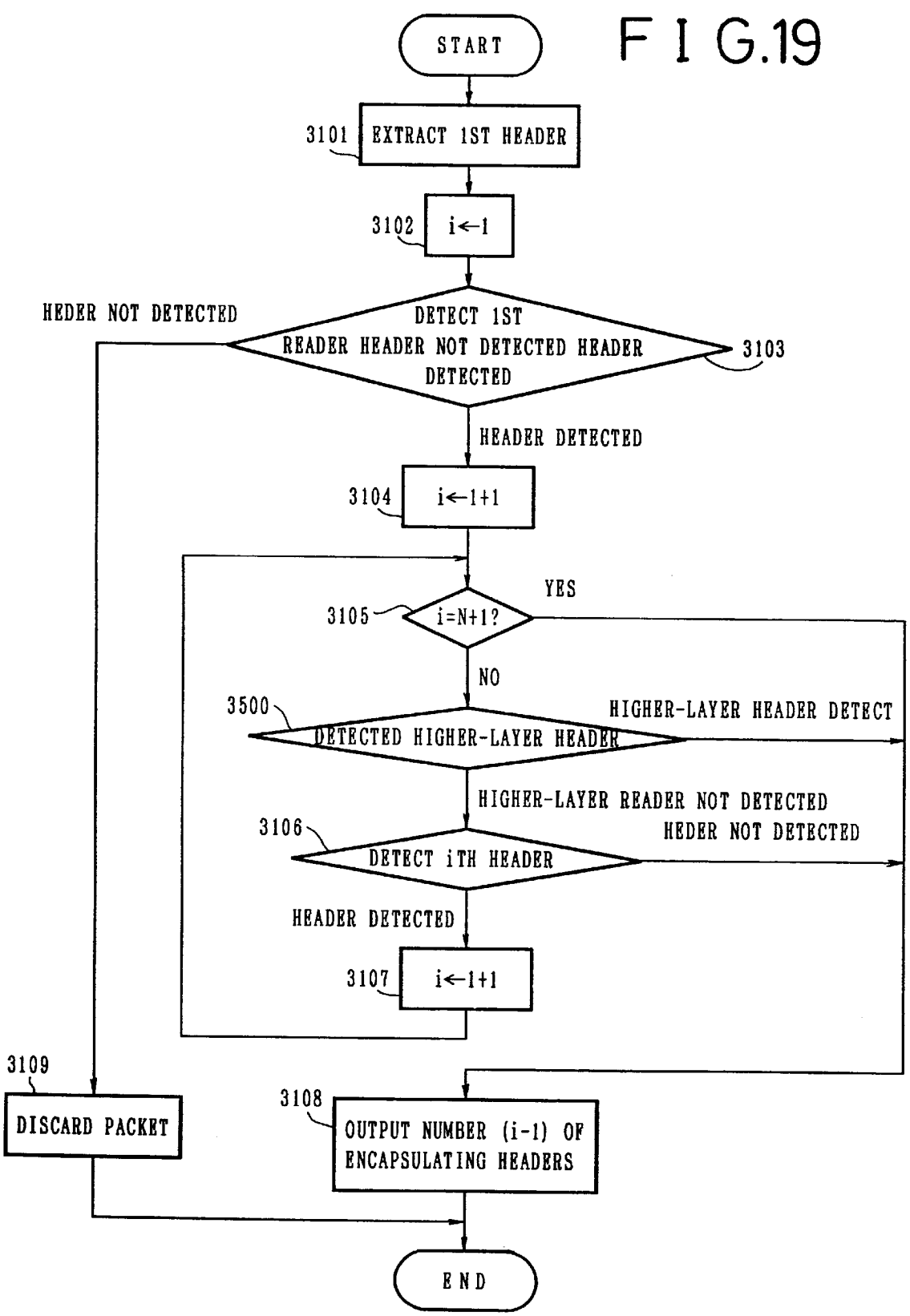
FIG. 19 is a flowchart of an operation process according to yet still another embodiment of the present invention.

FIG. 19 shows an operation process according to yet still another embodiment of the present invention. The operation sequence shown in FIG. 19 differs from the operation sequence shown in FIG. 15 in that a step 3500 for detecting a higher-layer header is inserted between the steps 3105, 3106.

Generally, the communication protocol is hierarchical, and headers are added respectively to the layers for packet communications.

Figure 20:
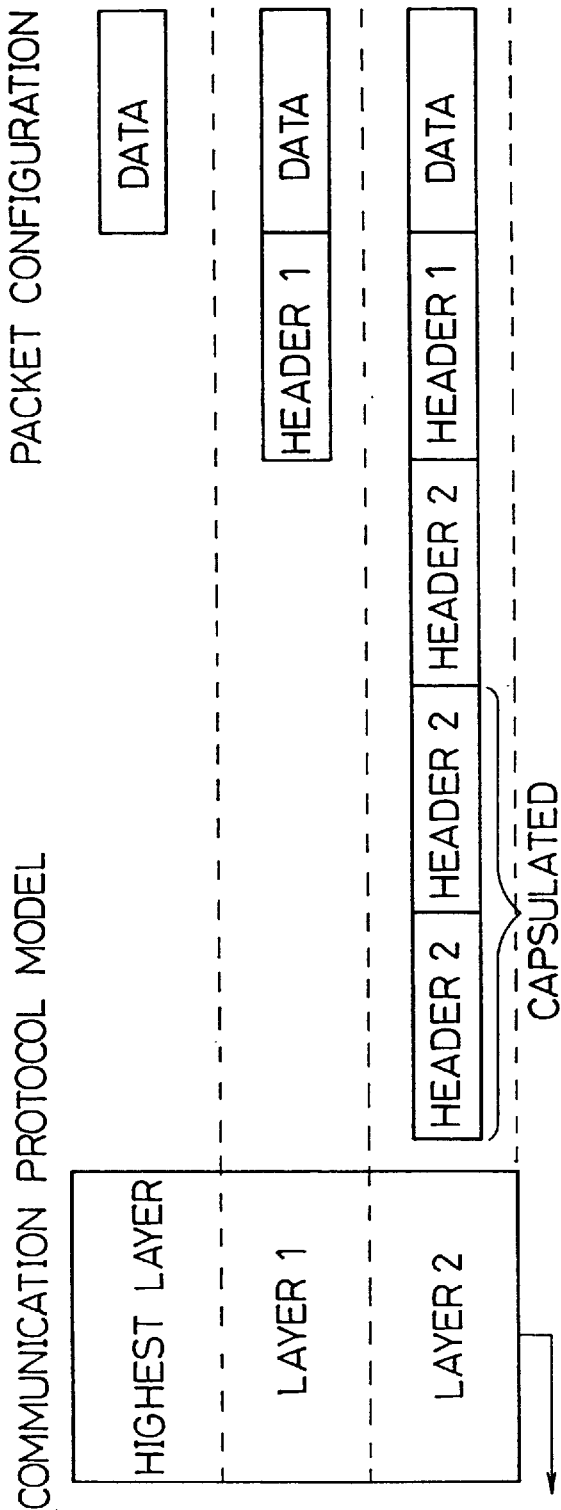
FIG. 20 is a diagram of a communication protocol model and packet configurations, used to illustrate the operation process shown in FIG. 19.

FIG. 20 shows a hierarchical communication protocol model having three layers including a highest layer, a layer 1, and a layer 2. Transmission data is generated in the highest layer, and headers 1, 2 are added to the transmission data in the layers 1, 2, respectively. Encapsulation according to the present invention adds a number of headers in the same layer. In the example shown in FIG. 20, the data is encapsulated twice by the header 2.

The step 3500 shown in FIG. 19, which is added to the operation process shown in FIG. 15, detects whether a portion contiguous to a header already detected of a received packet is a higher-layer header or not. If the portion is a higher-layer header, then it is recognized that the encapsulation has been finished at portions which have already been detected. If the portion is not a higher-layer header, then it is recognized that encapsulation is still in progress, and the processing goes to the step 3106. The steps following the step 3500 are the same as those of the operation process shown in FIG. 15.

Through the process described above, the received packet can be processed more quickly.

With the above arrangement of the present invention, even if a header does not contain a field indicating whether the header encapsulates the packet, it is possible highly efficiently to detect headers of a packet which is encapsulated by up to a maximum number N of headers.

A mobile packet communication system according to another embodiment of the present invention will be described below. In this embodiment, routers which interconnect a plurality of auxiliary networks have tables indicative of packet destinations for lessening a burden on packet processing.

Figure 25:
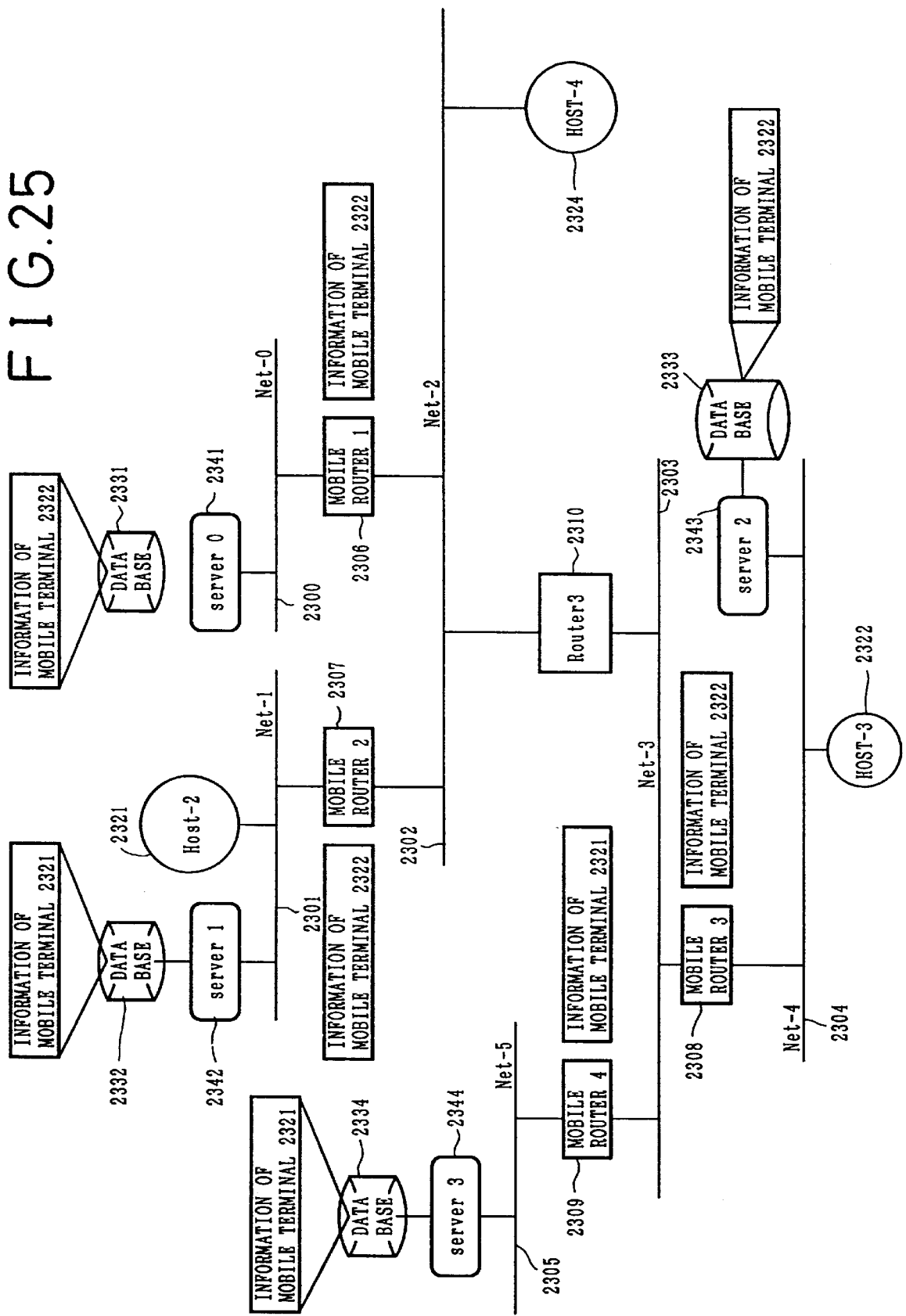
FIG. 25 is a block diagram of a network model incorporating a mobile packet communication system according to another embodiment of the present invention.

FIG. 25 is a block diagram of a network model incorporating such a mobile packet communication system according to another embodiment of the present invention.

As shown in FIG. 25, the network model includes mobile-compatible auxiliary networks 2300, 2301, 2304, 2305, mobile-incompatible auxiliary networks 2302, 2303, mobile-compatible routers 2306–2309, a mobile-incompatible router 2310, mobile terminals 2321, 2322, a fixed terminal 2324, address association data databases 2331, 2332, 2333, 2334 of the mobile-compatible auxiliary networks 2300, 2301, 2304, 2305, respectively, and address association data management servers 2341–2344 which manage the address association data databases 2331, 2332, 2333, 2334, respectively.

Figure 21:
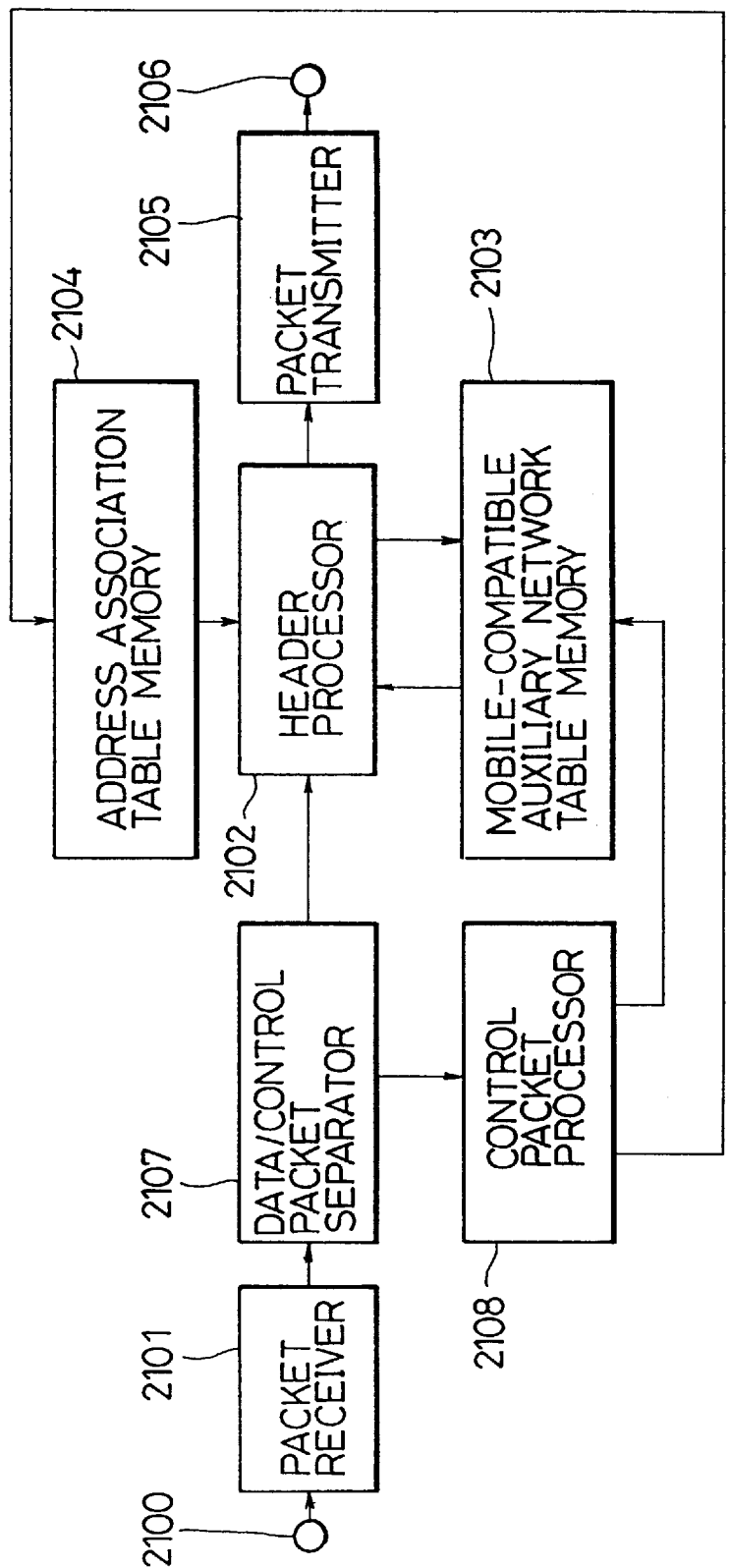
FIG. 21 is a diagram of a mobile-compatible router.

Each of the mobile-compatible routers 2306–2309 is of a structure shown in FIG. 21. As shown in FIG. 21, each of the mobile-compatible routers 2306–2309 comprises an input terminal 2100, a packet receiver 2101, a header processor 2102, a mobile-compatible auxiliary network table memory 2103 which stores a table of mobile-compatible auxiliary networks, an address association table memory 2104 which stores an address association table representing information relative to locations of mobile terminals, a packet transmitter 2105, an output terminal 2106, a data/control packet separator 2107, and a control packet processor 2108.

Operation of a mobile-compatible router will be described below with reference to FIG. 21. When a data packet is inputted from the input terminal 2100, it is received by the packet receiver 2101. The data packet received by the packet receiver 2101 is recognized as a data packet by the data/control packet separator 2107, and supplied to the header processor 2102. The header processor 2102 processes the data packet with the data stored in the address association table memory 2104 and the data stored in the mobile-compatible auxiliary network table memory 2103.

The table of mobile-compatible auxiliary networks stored in the mobile-compatible auxiliary network table memory 2103 is composed of auxiliary network identifiers and flags indicating whether the respective auxiliary networks are mobile-compatible or mobile-incompatible. The table of mobile-compatible auxiliary networks is initially established based on whether an auxiliary network to which a mobile-compatible router is directly connected is a mobile-compatible auxiliary network or not. For example, the mobile-compatible router 2306 is directly connected to the mobile-compatible auxiliary network 2300 and the mobile-incompatible auxiliary network 2302, and hence the auxiliary network 2300 is established as a mobile-compatible auxiliary network, and the auxiliary network 2302 as a mobile-incompatible auxiliary network. The address association table stored in the address association table memory 2104 is composed of data representing an association between inherent and positional addresses of mobile terminals, as shown in FIG. 23.

The packet processed by the header processor 2102 is transmitted from the packet transmitter 2105 through the output terminal 2106. The address association table stored in the address association table memory 2104 and the table of mobile-compatible auxiliary networks stored in the mobile-compatible auxiliary network table memory 2103 can also be updated by a control packet. When a control packet is received, it is recognized as a control packet by the data/control packet separator 2107, and supplied to the control packet processor 2108. The control packet processor 2108 updates the address association table and the table of mobile-compatible auxiliary networks based on the supplied control packet.

The header processor 2102 has a structure as shown in FIG. 26. As shown in FIG. 26, the header processor 2102 comprises input terminals 2400, 2407, 2408, output terminals 2406, 2409, a packet detector 2401, switches 2402, 2405 (switches 1, 2), a packet reconfigurator 2404 for reconfigurating packets having only an inherent address header, and a packet reconfigurator 2403 for reconfigurating packets having both inherent and positional addresses. The input terminal 2400 is connected to the data/control packet separator 2107. The input terminal 2407 is connected to the address association table memory 2104. The input terminal 2408 is connected to the mobile-compatible auxiliary network table memory 2103. The output terminal 2406 is connected to the packet transmitter 2105. The output terminal 2409 is connected to the mobile-compatible auxiliary network table memory 2103.

In the header processor 2102, the packet detector 2401 detects whether a received packet from the input terminal 2400 is a packet having both a positional address header and an inherent address header. If the received packet is a packet having both a positional address header and an inherent address header, then the packet detector 2401 controls the switches 1, 2 (2402, 2405) to supply the received packet from the input terminal 2400 to the packet reconfigurator 2403 and output the reconfigurated packet through the output terminal 2406. If the received packet is a packet having only an inherent address header, then the packet detector 2401 controls the switches 1, 2 (2402, 2405) to supply the received packet from the input terminal 2400 to the packet reconfigurator 2404 and output the reconfigurated packet through the output terminal 2406.

The packet reconfigurator 2403 for reconfigurating packets having both inherent and positional address headers first checks if the destination address of the * positional address header indicates a terminal in an auxiliary network to which the mobile-compatible router is directly connected. An auxiliary network to which the mobile-compatible router 2306, for example, is directly connected is either the auxiliary network 2302 or 2300. The packet reconfigurator 2403 processes packet headers according to a process, described below, shown in FIGS. 27, 28*a* and 28*b*.

The packet header transmission in this embodiment is carried out based on the results of decision or confirmation steps 2800 through 2811, described below, shown in FIGS. 27, 28*a* and 28*b*.

Step 2800: This step confirms whether the destination of the positional address header indicates a terminal in an auxiliary network to which the mobile-compatible router is directly connected.

Steps 2801, 2802: These steps confirm whether the destination of the inherent address header indicates a terminal in an auxiliary network to which the mobile-compatible router is directly connected.

Steps 2803–2805: These steps confirm whether an entry corresponding to the destination of the inherent address header is present in the address association table.

Step 2806: This step confirms whether the destination of the positional address header and the destination of the inherent address header are equal to each other.

Steps 2807–2809: These steps confirm whether the association between the inherent and positional addresses of the destination is equal to the data in the address association table.

Step 2810: This step confirms whether the source of the positional address header indicates a terminal in a network to which the mobile-compatible router is directly connected.

Step 2811: This step confirms whether a network determined by the inherent address is mobile-compatible.

Based on the results of the above decision or confirmation steps 2800 through 2811, the following transmission process is carried out:

1. If the destination positional address indicates a terminal in an auxiliary network to which the mobile-compatible router is directly connected (YES in the step 2800), if the destination inherent address indicates a terminal in an auxiliary network to which the mobile-compatible router is directly connected (YES in the step 2801), if an entry of the destination inherent address is present in the address association table (YES in the step 2803), and if the association between the destination inherent and positional addresses of the packet is present in the address association table (YES in the step 2807), then the packet is transmitted as it is in a step 2812.

2. If the destination positional address indicates a terminal in an auxiliary network to which the mobile-compatible router is directly connected (YES in the step 2800), if the destination inherent address indicates a terminal in an auxiliary network to which the mobile-compatible router is directly connected (YES in the step 2801), if an entry of the destination inherent address is present in the address association table (YES in the step 2803), and if the association between the destination inherent and positional addresses of the packet is not present in the address association table (NO in the step 2807), then the destination positional address header of the packet is replaced with a positional address indicated by the address association table, and the packet is transmitted in a step 2813.

3. If the destination positional address indicates a terminal in an auxiliary network to which the mobile-compatible router is directly connected (YES in the step 2800), if the destination inherent address indicates a terminal in an auxiliary network to which the mobile-compatible router is directly connected (YES in the step 2801), if an entry of the destination inherent address is not present in the address association table (NO in the step 2803), then the positional address header of the packet is deleted, and the packet is transmitted in a step 2814.

4. If the destination positional address indicates a terminal in an auxiliary network to which the mobile-compatible router is directly connected (YES in the step 2800), if the destination inherent address does not indicate a terminal in an auxiliary network to which the mobile-compatible router is directly connected (NO in the step 2801), if an entry of the destination inherent address is present in the address association table (YES in the step 2804), and if the association between the destination inherent and positional addresses of the packet is present in the address association table (YES in the step 2808), then the packet is transmitted as it is in the step 2812.

5. If the destination positional address indicates a terminal in an auxiliary network to which the mobile-compatible router is directly connected (YES in the step 2800), if the destination inherent address does not indicate a terminal in an auxiliary network to which the mobile-compatible router is directly connected (NO in the step 2801), if an entry of the destination inherent address is present in the address association table (YES in the step 2804), and if the association between the destination inherent and positional addresses of the packet is not present in the address association table (NO in the step 2808), then the destination positional address header of the packet is replaced with a positional address indicated by the address association table, and the packet is transmitted in the step 2813.

6. If the destination positional address indicates a terminal in an auxiliary network to which the mobile-compatible router is directly connected (YES in the step 2800), if the destination inherent address does not indicate a terminal in an auxiliary network to which the mobile-compatible router is directly connected (NO in the step 2801), and if an entry of the destination inherent address is not present in the address association table (NO in the step 2804), then the destination positional address is replaced with the destination inherent address of the packet, and the packet is transmitted in a step 2815.

7. If the destination positional address does not indicate a terminal in an auxiliary network to which the mobile-compatible router is directly connected (NO in the step 2800), if the destination inherent address indicates a terminal in an auxiliary network to which the mobile-compatible router is directly connected (YES in the step 2802), if an entry of the destination inherent address is present in the address association table (YES in the step 2805), and if the association between the destination inherent and positional addresses of the packet is present in the address association table (YES in the step 2809), then the packet is transmitted as it is in the step 2812.

8. If the destination positional address does not indicate a terminal in an auxiliary network to which the mobile-compatible router is directly connected (NO in the step 2800), if the destination inherent address indicates a terminal in an auxiliary network to which the mobile-compatible router is directly connected (YES in the step 2802), if an entry of the destination inherent address is present in the address association table (YES in the step 2805), and if the association between the destination inherent and positional addresses of the packet is not present in the address association table (NO in the step 2809), then the destination positional address header of the packet is replaced with a positional address indicated by the address association table, and the packet is transmitted in the step 2813.

9. If the destination positional address does not indicate a terminal in an auxiliary network to which the mobile-compatible router is directly connected (NO in the step 2800), if the destination inherent address indicates a terminal in an auxiliary network to which the mobile-compatible router is directly connected (YES in the step 2802), and if an entry of the destination inherent address is not present in the address association table (NO in the step 2805), the packet is discarded in a step 2816.

10. If the destination positional address does not indicate a terminal in an auxiliary network to which the mobile-compatible router is directly connected (NO in the step 2800), if the destination inherent address does not indicate a terminal in an auxiliary network to which the mobile-compatible router is directly connected (NO in the step 2802), if the destination inherent and positional addresses of the packet are equal to each other (YES in the step 2806), if the source positional address indicates a terminal in an auxiliary network to which the mobile-compatible router is directly connected (YES in the step 2810), and if an auxiliary network determined by the destination inherent address by referring to the table of mobile-compatible auxiliary networks is mobile-compatible (YES in the step 2811), then the packet is transmitted as it is in the step 2812.

11. If the destination positional address does not indicate a terminal in an auxiliary network to which the mobile-compatible router is directly connected (NO in the step 2800), if the destination inherent address does not indicate a terminal in an auxiliary network to which the mobile-compatible router is directly connected (NO in the step 2802), if the destination inherent and positional addresses of the packet are equal to each other (YES in the step 2806), if the source positional address indicates a terminal in an auxiliary network to which the mobile-compatible router is directly connected (YES in the step 2810), and if an auxiliary network determined by the destination inherent address by referring to the table of mobile-compatible auxiliary networks is not mobile-compatible (NO in the step 2811), then the positional address header of the packet is deleted, and the packet is transmitted in the step 2814.

12. If the destination positional address does not indicate a terminal in an auxiliary network to which the mobile-compatible router is directly connected (NO in the step 2800), if the destination inherent address does not indicate a terminal in an auxiliary network to which the mobile-compatible router is directly connected (NO in the step 2802), if the destination inherent and positional addresses of the packet are equal to each other (YES in the step 2806), and if the source positional address does not indicate a terminal in an auxiliary network to which the mobile-compatible router is directly connected (NO in the step 2810), then the packet is transmitted as it is in the step 2812.

13. If the destination positional address does not indicate a terminal in an auxiliary network to which the mobile-compatible router is directly connected (NO in the step 2800), if the destination inherent address does not indicate a terminal in an auxiliary network to which the mobile-compatible router is directly connected (NO in the step 2802), and if the destination inherent and positional addresses of the packet are different from each other (NO in the step 2806), then the packet is transmitted as it is in the step 2812.

The packet reconfigurator 2404 for reconfigurating packets having only an inherent address header processes packet headers according to a process, described below, is shown in FIGS. 29 and 30.

The packet header transmission in this embodiment is carried out based on the results of decision or confirmation steps 2850 through 2855, 2858, described below, shown in FIGS. 29 and 30.

Step 2850: This step confirms whether the destination address indicates a terminal in an auxiliary network to which the mobile-compatible router is directly connected.

Steps 2851, 2852: These steps confirm whether the source address indicates a terminal in an auxiliary network to which the mobile-compatible router is directly connected.

Steps 2853–2855: These steps confirm whether a positional address corresponding to the destination address as a destination inherent address is present in the address association table.

Step 2858: This step confirms whether the destination address is in a mobile-compatible network.

Based on the results of the above decision or confirmation steps 2850 through 2855, 2858, the following transmission process is carried out:

1. If the destination address indicates a terminal in an auxiliary network to which the mobile-compatible router is directly connected (YES in the step 2850), if the source address indicates a terminal in an auxiliary network to which the mobile-compatible router is directly connected (YES in the step 2851), and if the destination address as an inherent address is present in the address association table (YES in the step 2853), then the address association table is referred to for the positional address of the destination, a positional address header is configured using the positional address of the source as the original source address of the packet and added to the packet, and the packet is transmitted in a step 2860.

2. If the destination address indicates a terminal in an auxiliary network to which the mobile-compatible router is directly connected (YES in the step 2850), if the source address indicates a terminal in an auxiliary network to which the mobile-compatible router is directly connected (YES in the step 2851), and if the destination address as an inherent address is not present in the address association table (NO in the step 2853), then the packet is transmitted as it is in a step 2859.

3. If the destination address indicates a terminal in an auxiliary network to which the mobile-compatible router is directly connected (YES in the step 2850), if the source address does not indicate a terminal in an auxiliary network to which the mobile-compatible router is directly connected (NO in the step 2851), and if the destination address as an inherent address is present in the address association table (YES in the step 2854), then a mobile-compatible auxiliary network indication process, described later on, is carried out in a step 2857, the address association table is referred to for the positional address of the destination, a positional address header is configured using the positional address of the source as the original source address of the packet and added to the packet, and the packet is transmitted in the step 2860.

4. If the destination address indicates a terminal in an auxiliary network to which the mobile-compatible router is directly connected (YES in the step 2850), if the source address does not indicate a terminal in an auxiliary network to which the mobile-compatible router is directly connected (NO in the step 2851), and if the destination address as an inherent address is not present in the address association table (NO in the step 2854), then a mobile-compatible auxiliary network indication process, described later on, is carried out in a step 2856, and the packet is transmitted as it is in the step 2859.

5. If the destination address does not indicate a terminal in an auxiliary network to which the mobile-compatible router is directly connected (NO in the step 2850), if the source address indicates a terminal in an auxiliary network to which the mobile-compatible router is directly connected (YES in the step 2852), and if the destination address as an inherent address is present in the address association table (YES in the step 2855), then the address association table is referred to for the positional address of the destination, a positional address header is configured using the positional address of the source as the original source address of the packet and added to the packet, and the packet is transmitted in the step 2860.

6. If the destination address does not indicate a terminal in an auxiliary network to which the mobile-compatible router is directly connected (NO in the step 2850), if the source address indicates a terminal in an auxiliary network to which the mobile-compatible router is directly connected (YES in the step 2852), if the destination address as an inherent address is not present in the address association table (NO in the step 2855), and if the destination address of the packet indicates a terminal in a mobile-compatible auxiliary network (YES in the step 2858), then a positional address header is configured based on the destination and source addresses of the packet and added to the packet, and the packet is transmitted in a step 2861.

7. If the destination address does not indicate a terminal in an auxiliary network to which the mobile-compatible router is directly connected (NO in the step 2850), if the source address indicates a terminal in an auxiliary network to which the mobile-compatible router is directly connected (YES in the step 2852), if the destination address as an inherent address is not present in the address association table (NO in the step 2855), and if the destination address of the packet does not indicate a terminal in a mobile-compatible auxiliary network (NO in the step 2858), then the packet is transmitted as it is in the step 2859.

8. If the destination address does not indicate a terminal in an auxiliary network to which the mobile-compatible router is directly connected (NO in the step 2850), and if the source address does not indicate a terminal in an auxiliary network to which the mobile-compatible router is directly connected (NO in the step 2852), then the packet is transmitted as it is in the step 2859.

As described above, the mobile-compatible router effects a mobile-compatible auxiliary network indication process if a received packet does not have both positional and inherent address headers, if the destination of the packet is a terminal in an auxiliary network to which the mobile-compatible router is directly connected, and if a data packet (packet 1) whose source is not an auxiliary network to which the mobile-compatible router is directly connected is received.

When the packet 1 is received, either the source of the data packet 1 is a mobile-compatible auxiliary network, but it cannot be ascertained whether the destination thereof is a mobile-compatible auxiliary network or not, or the source of the data packet 1 is not a mobile-compatible auxiliary network.

If the source of the data packet 1 is a mobile-compatible auxiliary network, then after it has been indicated that the destination of the data packet 1 is a mobile-compatible auxiliary network, the mobile-compatible router transmits packets having both positional and inherent address headers.

If the source of the data packet 1 is not a mobile-compatible auxiliary network, then since it is impossible to assign both positional and inherent address headers to packets irrespective of whether the destination is a mobile-compatible auxiliary network or not, the mobile-compatible router is required to convert packet headers.

Figure 33:
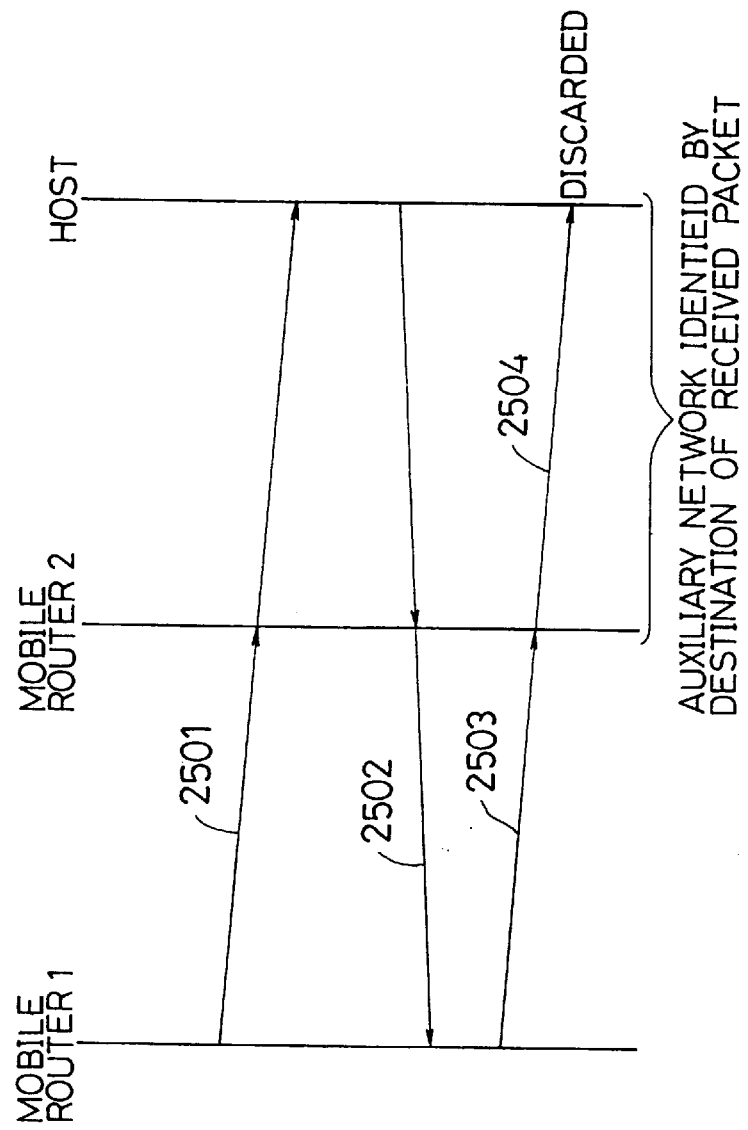
FIG. 33 is a sequence diagram of still another sequence of indicating a mobile-compatible auxiliary network.

Sequences of the above process of indicating a mobile-compatible auxiliary network are shown in FIGS. 31 through 33. FIGS. 31 and 32 show sequences where the source of the packet 1 is in a mobile-compatible auxiliary network. In FIG. 31, the terminal which has transmitted the packet is present in a home network. In FIG. 32, the terminal which has transmitted the packet is present in an auxiliary network other than the home network. FIG. 33 shows a sequence where the terminal which has transmitted the packet is a fixed terminal other than a mobile-compatible auxiliary network.

The sequence of the process of indicating a mobile-compatible auxiliary network will be described below with reference to FIG. 31.

1. A mobile-compatible router (mobile router1) which has received a packet 1 transmits a control packet 2501 for requesting an auxiliary network identifier to the source (host) of the packet 1. The control packet 2501 may employ an address mask request (see, for example, Radia Perlman, "Interconnections, Bridges and Routers", Addison-Wesley Publishing Company, Inc. 1992) according to the Internet Control Message Protocol (ICMP).
2. The source (host) of the packet 1 which has received the control packet 2501 returns a control packet 2502 as a reply to the control packet 2501 to the mobile-compatible router (mobile router1) which has transmitted the control packet 2501. The control panel 2502 may employ an address mask reply (see, for example, Radia Perlman, "Interconnections, Bridges and Routers", Addison-Wesley Publishing Company, Inc. 1992) according to the Internet Control Message Protocol (ICMP).
3. The mobile-compatible router (mobile router1) which has received the control packet 2502 registers an auxiliary network identifier indicated by the control packet 2502 as a mobile-incompatible auxiliary network in its own table of mobile-compatible auxiliary networks. The mobile-compatible router (mobile router1) then transmits, toward the source (host) of the packet 1, a control packet 2503 (indication packet) containing as information:
    a source address of the packet 1;
    an auxiliary network identifier (NET-A) identified by the destination address of the packet 1; and
    a flag indicating that NET-A is an auxiliary network identifier.
4. The control packet 2503 transmitted toward the source (host) of the packet 1 is first received by a mobile-compatible router (mobile router2) that is directly connected to an auxiliary network to which the source (host) of the packet 1 is connected. Since the mobile-compatible router (mobile router2) can recognize that the received packet is a control packet, it changes the destination of the control packet 2503 to a database server of positional and inherent addresses relative to the auxiliary network determined by the address of the source (host) of the packet 1, and transmits the control packet 2503 as a control packet 2504 (an indication packet destined for the database server) to the database server.
5. The database server which has received the control packet 2504 confirms the location of a terminal (host) identified by the source address of the packet 1 which is contained in the control packet 2504. In this example, the terminal is present in the same auxiliary network as the database server. The database server transmits a multiaddress packet 2505 indicating that NET-A is a mobile-compatible auxiliary network within its auxiliary network, and records data indicating that NET-A is mobile-compatible in a table of mobile-compatible auxiliary networks in the database.
6. The mobile-compatible router (mobile router2) which has received the multiaddress packet 2505 from the database server records data indicating that NET-A is mobile-compatible in a table of mobile-compatible auxiliary networks which the router has.

Through the above process, the mobile-compatible router (mobile router2) of the auxiliary network in which the terminal that has transmitted the packet 1 is present recognizes that NET-A is mobile-compatible. Subsequently, packets having both positional and inherent address headers are transmitted to NET-A.

If the terminal that has transmitted the packet 1 is present in other than the home network, the mobile-compatible router (mobile router1) which has received the packet 1 recognizes only the inherent address of the terminal (host) which has transmitted the packet 1. Therefore, the mobile-compatible router (mobile router1) transmits the same control packet as shown in FIG. 31.

The sequence of the process of indicating a mobile-compatible auxiliary network which is shown in FIG. 32 differs from the sequence of the process shown in FIG. 31 as follows:

1. The mobile-compatible router (mobile router2) in the home network of the terminal (host) which has transmitted the packet 1 recognizes the positional address of the terminal (host) which has transmitted the packet 1. Therefore, the mobile-compatible router (mobile router2) transfers the control packet 2501 to that positional address.
2. The database server which has received the control packet 2504 sends a control packet 2506 indicating that NET-A is a mobile-compatible auxiliary network, to the database server of the auxiliary network in which the terminal (host) which has transmitted the packet 1 is present. The database server which has received the control packet 2506 transmits a multiaddress packet within its auxiliary network, as with the multiaddress packet 2505, indicating that NET-A is mobile-compatible to the mobile-compatible router (mobile router2) connected to the auxiliary network in which the terminal (host) which has transmitted the packet 1 is present.

Through the above process, if the terminal (host) which has transmitted the packet 1 is present in a mobile-compatible auxiliary network, then the information that NET-A is mobile-compatible is indicated to the mobile-compatible router (mobile router2) connected to the auxiliary network in which the terminal (host) which has transmitted the packet 1 is present. A packet having both positional and inherent address headers is transmitted to NET-A. Thereafter, the above process of indicating a mobile-compatible auxiliary network is finished.

When a terminal in NET-A which has received the packet 1 transmits a packet to the terminal (host) which has transmitted the packet 1, the mobile-compatible router (mobile router2) of the auxiliary network to which the terminal (host) which has transmitted the packet 1 is connected starts the above process. Therefore, the terminals can recognize that they are in mobile-compatible networks.

If the terminal that has transmitted the packet 1 is present in a mobile-incompatible auxiliary network, then since the router2 of the auxiliary network to which the terminal (host) which has transmitted the packet 1 is connected is not mobile-compatible as shown in FIG. 33, the control packet 2503 is discarded. Thus, the information that NET-A is a mobile-compatible auxiliary network is not indicated to the auxiliary network in which the terminal (host) which has transmitted the packet 1 is present. Even when a terminal in NET-A which has received the packet 1 transmits a packet to the terminal (host) which has transmitted the packet 1, the above process is not started. Consequently, the mobile-compatible router of the auxiliary network to which the terminal which has received the packet 1 is connected maintains the information representing that the auxiliary network to which the terminal (host) which has transmitted the packet 1 is connected. Therefore, the mobile-compatible router connected to NET-A converts a packet destined for the auxiliary network connected to the packet 1 into a packet having only an inherent address header.

According to the above process, it is possible to communicate with a terminal in a mobile-incompatible auxiliary network.

Figure 34:
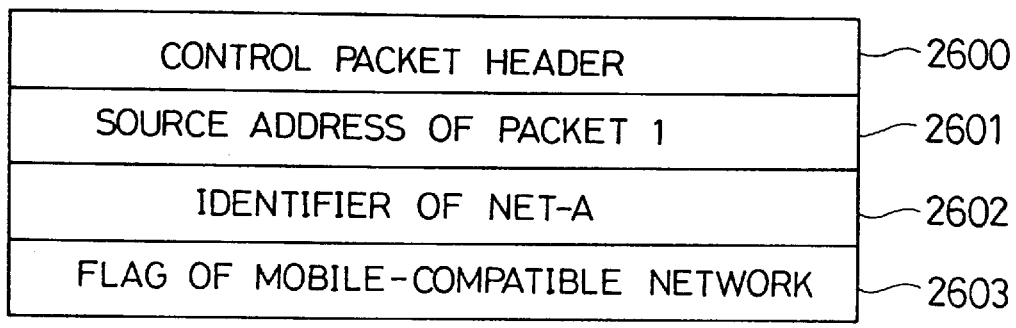
FIG. 34 is a diagram showing a configuration of a control packet.
Figure 35:
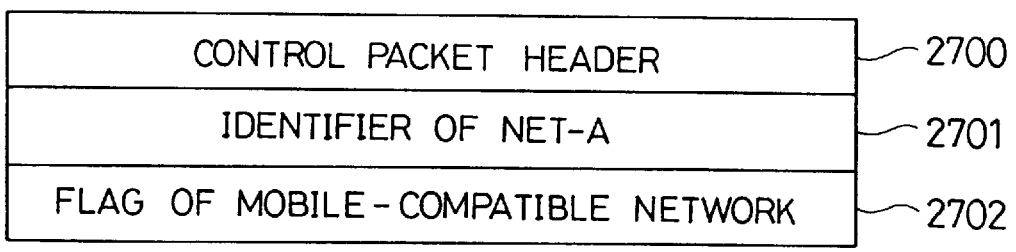
FIG. 35 is a diagram showing another configuration of a control packet.

Packet configurations of the control packets 2503, 2506 are shown in FIGS. 34 and 35.

In FIG. 34, the control packet 2503 has a control packet header 2600 containing information representing that the control packet 2503 is a control packet, a source address 2601 of the packet 1, an identifier 2602 of NET-A, and a flag 2603 indicating that NET-A is a mobile-compatible auxiliary network.

In FIG. 34, the control packet 2506 has a control packet header 2700 containing information representing that the control packet 2506 is a control packet, an identifier 2701 of NET-A, and a flag 2702 indicating that NET-A is a mobile-compatible auxiliary network.

The mobile terminals 2321, 2322 shown in FIG. 25 are capable of handling both packets having positional and inherent address headers configured based on the positional and inherent addresses of source and destination, and packets having only inherent address headers. The fixed terminal 2324 (host4) is capable of handling packets having only inherent address headers.

It is assumed that the mobile-compatible auxiliary networks 2300, 2301, 2304, 2305 have respective identifiers Net-0, Net-1, Net-4, Net-5, and the mobile-incompatible auxiliary networks 2302, 2303 have respective identifiers Net-2, Net-3. Each of the mobile terminals has inherent and positional addresses, and it is assumed that the mobile terminal 2321 has an inherent address of Net-5.1 and a positional address of Net-1.1 and the mobile terminal 2322 has an inherent address of Net-0.1 and a positional address of Net-4.1. An auxiliary network identified by the inherent address of each mobile terminal is defined as a home network. The inherent and positional addresses of each mobile terminal are kept in at least an address association database which manages the auxiliary network to which the mobile terminal is currently connected, a mobile-compatible router connected to the auxiliary network, an address association database which manages each home network, and a mobile-compatible router connected to the home network.

When a companion terminal with which a mobile terminal is to communicate has inherent and positional addresses, the mobile terminal keeps an association between the inherent and positional addresses of the companion terminal. The fixed terminal 2324 has only an inherent address of Net-2.1, and is not registered in address association databases because it does not have a positional address.

Figure 24:
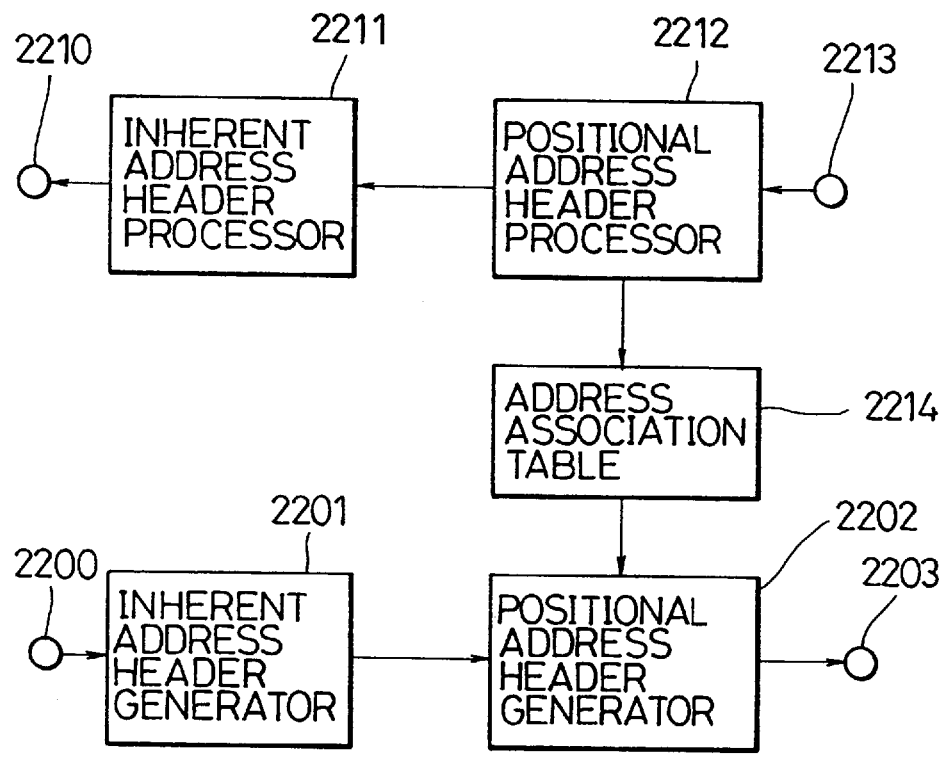
FIG. 24 is a block diagram of a mobile terminal.

Each of the mobile terminals may be constructed as shown in FIG. 24. In FIG. 24, the mobile terminal has input terminals 2200, 2213, output terminals 2210, 2203, an inherent address header generator 2201, a positional address header generator 2202, an inherent address header processor 2211, a positional address header processor 2212, and an address association table 2214.

The output terminal 2210, the inherent address header processor 2211, the positional address header processor 2212, and the input terminal 2213 jointly make up a system for receiving a packet.

The input terminal 2200, the inherent address header generator 2201, the positional address header generator 2202, and the output terminal 2203 jointly make up a system for transmitting a packet.

The address association table 2214 of mobile terminals and mobile-compatible routers can also be updated by control packets that are periodically transmitted from address association database servers of connected auxiliary networks.

Communications between mobile terminals, between fixed terminals, and between mobile and fixed terminals are effected in the following modes:

a Communications between mobile terminals: Communications are effected with a packet having an inherent address header based on an inherent address and a positional address header based on a positional address.

Communications between mobile terminals: Communications are effected with a packet having only an inherent address header.

Communications from a mobile terminal to a fixed terminal: The mobile terminal transmits a packet having positional and inherent address headers, and a mobile-compatible router converts the packet into a packet having only an inherent address header and transmits the packet to the fixed terminal.

Communications from a fixed terminal to a mobile terminal: The fixed terminal can communicate only a packet having an inherent address header. A packet destined for the mobile terminal is transmitted through a mobile-compatible router, which converts the packet into a packet having positional and inherent address headers and transmits the packet to the mobile terminal. If the mobile terminal can process a packet having only an inherent address header and a packet having both positional and inherent address headers, then communications may be effected without a mobile-compatible router.

The above various modes of communications will be described below with reference to the network model shown in FIG. 25. It is assumed that, as an initial state of the table of mobile-compatible auxiliary networks in each of the mobile-compatible routers, the mobile-compatible router 2308 knows that the networks 2300, 2305 are mobile-compatible auxiliary networks, and the mobile-compatible router 2306 knows that the network 2304 is a mobile-compatible auxiliary network.

1. Communications between mobile terminals:

Communications between the mobile terminals 2322, 2321 will be described by way of example. First, a process of starting communications from the mobile terminal 2322, which does not know the positional address of the mobile terminal 2321, to the mobile terminal 2321 will be described below.

Step 1-1: The mobile terminal 2322 detects the inherent address (Net-5.1) of the mobile terminal 2321 using a domain name service (see Mockapet ris, P., "Domain names—Implementation and Specification", RFC 1035, USC/Information Sciences Institute, November 1987), for example.

Step 1-2: The mobile terminal 2322 configurates an inherent address header of a transmission packet based on the inherent address of the mobile terminal 2321 and its own inherent address, and adds the inherent address header to transmission data.

Step 1-3: The mobile terminal 2322 searches the address association table 2214 of its own for a positional address corresponding to the inherent address of the mobile terminal 2321 which has been detected in the step 1-1. Since it is assumed that the mobile terminal 2322 does not know the position of the mobile terminal 2321, the positional address of the mobile terminal 2321 is not found. Therefore, the mobile terminal 2322 regards the inherent address of the mobile terminal 2321 as the positional address of the mobile terminal 2321. The mobile terminal 2322 configurates a positional address header using its own positional address and the positional address of the mobile terminal 2321 (which is the same as the inherent address thereof), and adds the positional address header to the packet that has been produced in the step 1-2.

Step 1-4: The mobile terminal 2322 transmits the packet based on the positional address of the packet which has been produced in the step 1-3. In this case, the destination of the positional address header is the inherent address (Net-5.1) of the mobile terminal 2321, and the mobile terminal 2322 transmits the packet to the mobile-compatible router 2308.

Step 1-5: When the mobile-compatible router 2308 receives the packet transmitted from the mobile terminal 2322 in the step 1-4, the mobile-compatible router 2308 determines the received packet as being a packet having both positional and inherent address headers.

Step 1-6: The mobile-compatible router 2308 determines that the auxiliary network Net-5 specified by the destination (Net-5.1) of the positional address header is a mobile-compatible network using the table of mobile-compatible auxiliary networks. The mobile-compatible router 2308 transfers the packet, having both positional and inherent address headers, received from the mobile terminal 2322 to the mobile-compatible router 2309 connected to the auxiliary network Net-5.

Step 1-7: When the mobile-compatible router 2309 receives the packet transferred from the mobile-compatible router 2308 in the step 1-6, the mobile-compatible router 2309 checks if an association between the destination addresses of the positional and inherent addresses of the packet is present in the address association table of the mobile-compatible router 2309.

Step 1-8: As a result of the check carried out by the mobile-compatible router 2309 in the step 1-7, the destination addresses of the positional and inherent addresses of the packet received in the step 1-6 are Net-5.1, and the positional address corresponding to the inherent address Net-5.1 is Net-1.1 according to the address association table of the mobile-compatible router 2309. The mobile-compatible router 2309 changes the destination of the positional address to Net-1.1, reconfigurates the positional address header, and transfers the packet to the auxiliary network Net-1 to which the mobile terminal 2321 is currently connected.

Step 1-9: When the mobile terminal 2321 receives the packet transferred in the step 1-8, it registers source addresses (positional and inherent addresses of the mobile terminal 2322) corresponding to the positional and inherent address headers in the address association table 2214 of the mobile terminal 2321.

Through the above procedure, the packet is transferred from the mobile terminal 2322, which does not know the positional address of the mobile terminal 2321, to the mobile terminal 2321. Since the mobile terminal 2321 has an association between the inherent and positional addresses of the mobile terminal 2322, the mobile terminal 2321 can transmit a reply to the packet thus transferred, directly to the mobile-compatible router 2328 of the auxiliary network 2304 to which the mobile terminal 2322 is connected.

When the mobile terminal 2322 receives the reply, the mobile terminal 2322 can recognize the inherent and positional addresses of the mobile terminal 2321. If a source knows both positional and inherent addresses of a companion terminal or destination with which the source is to communicate, then the source transmits a packet to which positional and inherent address headers have been added based on the positional and inherent addresses of the source and the positional and inherent addresses of the destination.

A process of starting communications from the mobile terminal 2321, which does not know the positional address of the mobile terminal 2322, to the mobile terminal 2322 will be described below. Steps in which the mobile terminal 2321 transmits a packet are the same as the steps 1-1–1-4 described above. This process differs from the above process in that the mobile-compatible router which relays the packet does not know that the auxiliary network to which the mobile terminal of the destination is connected is a mobile-compatible auxiliary network. Steps of this process following the steps 1-1–1-4 will be described below.

Step 2-5: When the mobile-compatible router 2307 receives the packet configurated in the same step as the step 1-4, directed from the mobile terminal 2321 to the mobile terminal 2322, the mobile-compatible router 2307 determines the received packet as being a packet having both positional and inherent address headers.

Step 2-6: The mobile-compatible router 2307 checks if the auxiliary network Net-0 specified by the destination (Net-0.1) of the positional address header is a mobile-compatible network or not. As described above, the mobile-compatible router 2307 does not know if the auxiliary network Net-0 is a mobile-compatible auxiliary network. Therefore, the mobile-compatible router 2307 removes the positional address header of the packet from the mobile terminal 2321, and transmits the packet as a packet having only an inherent address header. Based on the destination of the inherent address header, the packet is transferred to the router 2306 connected to the auxiliary network 2300 which is specified by the inherent address of the mobile terminal 2322. Because the packet is transferred as a packet having only an inherent address header, the packet is properly transferred even if the destination is not a mobile-compatible auxiliary network.

Step 2-7: When the mobile-compatible router 2306 receives the packet from the mobile-compatible router 2307, the mobile-compatible router 2306 searches the address association table for a positional address (Net-4.1) corresponding to the destination (Net-0.1) of the header of the packet. Then, the mobile-compatible router 2306 uses the source address (Net-5.1) of the received address as a source address, uses the address (Net-4.1) obtained from the address association table as a destination positional address, adds a positional address header, and transmits the packet to the auxiliary network 2304 to which the mobile terminal 2322 is currently connected. The mobile-compatible router 2306 also starts a process of indicating that the auxiliary network Net-0 is mobile-compatible. The mobile-compatible router 2306 registers, in the table of mobile-compatible auxiliary networks, the information representing that the auxiliary network to which the source of the received packet is not mobile-compatible, so that the process of indicating that the auxiliary network is mobile-compatible will not be carried out again.

Step 2-8: The mobile terminal 2322 receives the packet which have both positional and inherent address headers added by the mobile-compatible router 2306. Based on the source of the positional and inherent address headers of the received packet, the mobile terminal 2322 stores the association of the inherent and positional addresses of the mobile terminal 2321 into the address association table 2214 thereof.

The packet is transferred in the manner described above in communications from the mobile terminal 2321 to the mobile terminal 2322.

2. Communications between mobile and fixed terminals.

Communications between the mobile terminal 2321 and the fixed terminal 2322 will be described by way of example. First, a process of starting communications from the mobile terminal 2321 to the fixed terminal 2322 will be described below.

Step 3-1: The mobile terminal 2321 detects the inherent address (Net-2.1) of the fixed terminal 2324 using a domain name service (see Mockapet ris, P., "Domain names—Implementation and Specification", RFC 1035, USC/Information Sciences Institute, November 1987), for example.

Step 3-2: The mobile terminal 2321 configurates an inherent address header of a transmission packet based on the inherent address of the fixed terminal 2324 and its own inherent address, and adds the inherent address header to transmission data.

Step 3-3: The mobile terminal 2321 searches the address association table 2214 of its own for a positional address corresponding to the inherent address of the fixed terminal 2324 which has been detected in the step 3-1. Since the fixed terminal 2324 does not have a positional address, any positional address corresponding to the fixed terminal 2324 is not present in the address association table. Therefore, the mobile terminal 2321 regards the inherent address of the fixed terminal 2324 as the positional address of the fixed terminal 2324. The mobile terminal 2321 configurates a positional address header using its own positional address and the positional address of the fixed terminal 2324 (which is the same as the inherent address thereof), and adds the positional address header to the packet that has been produced in the step 3-2.

Step 3-4: The mobile terminal 2321 transmits the packet based on the positional address of the packet which has been produced in the step 3-3. In this case, the destination of the positional address header is the inherent address (Net-2.1) of the fixed terminal 2324, and the mobile terminal 2321 transmits the packet to the mobile-compatible router 2307.

Step 3-5: When the mobile-compatible router 2307 receives the packet transmitted from the mobile terminal 2321 in the step 3-4, the mobile-compatible router 2307 determines the received packet as being a packet having both positional and inherent address headers.

Step 3-6: The mobile-compatible router 2307 checks the destination of the positional address of the packet received in the step 3-5, and recognizes that the destination is a terminal connected to the auxiliary network (Net-2) to which the mobile-compatible router 2307 is directly connected.

Step 3-7: When the mobile-compatible router 2307 receives the packet in the step 3-5, it determines whether an association between the destination addresses of the positional and inherent addresses of the packet is present in the address association table of the mobile-compatible router 2307. Since the destination is a fixed terminal in this case, no corresponding positional address is present in the address association table, and hence the mobile-compatible router 2307 determines the destination as being a fixed terminal.

The mobile-compatible router 2307 refers to the table of mobile-compatible auxiliary networks, and recognizes that the auxiliary network to which the destination (the fixed terminal 2324) is connected is not a mobile-compatible auxiliary network. Therefore, the mobile-compatible router 2307 can determine the fixed terminal 2324 as being not a mobile terminal. The mobile-compatible router 2307 removes the positional address header of the packet received in the step 3-5, and transfers a packet to which only an inherent address header has been added and which can be received by a fixed terminal.

Step 3-8: The fixed terminal 2324 receives the packet which has been converted by the mobile-compatible router 2307 in the step 3-7, and processes the received packet.

Next, a process of starting communications from the fixed terminal 2324 to the mobile terminal 2321 will be described below.

Step 4-1: The fixed terminal 2324 detects the inherent address (Net-5.1) of the mobile terminal 2321 using a domain name service (see Mockapet ris, P., "Domain names—Implementation and Specification", RFC 1035, USC/Information Sciences Institute, November 1987), for example.

Step 4-2: The fixed terminal 2324 configurates an inherent address header of a transmission packet based on the inherent address (Net-5.1) of the mobile terminal 2321 and its own inherent address (Net-2.1), and adds the inherent address header to transmission data.

Step 4-3: The fixed terminal 2324 transmits the packet produced in the step 4-2 toward the inherent address (Net-5.1) of the mobile terminal 2321. The packet is transferred to the mobile-compatible router 2309 connected to the home network of the mobile terminal 2321.

Step 4-4: The mobile-compatible router 2309 recognizes that the positional address of the mobile terminal 2321 is Net-1.1 from the destination (Net-5.1) of the received packet and the address association table of the mobile-compatible router 2309. The mobile-compatible router 2309 configurates inherent and positional address headers by setting the inherent and positional addresses of the source to the source address (Net-2.1) of the received packet, the inherent address of the destination to Net-5.1, and the positional address of the destination to Net-1.1. Then, the mobile-compatible router 2309 replaces the headers of the received packet with the positional and inherent address headers thus configurated, and transfers the packet.

Since the received packet has only an inherent address header, the mobile-compatible router 2309 determines that the router of the source network (Net-2) either does not know that the network Net-5 is mobile-compatible or recognizes that the network Net-5 is not mobile-compatible. The mobile-compatible router 2309 records the information that the network Net-5 is not mobile-compatible in its own table of mobile-compatible auxiliary networks, and indicates that the network Net-5 is mobile-compatible to the network Net-2. Since the network Net-2 is not mobile-compatible, the indication that the network Net-5 is mobile-compatible is ignored. The table of mobile-compatible auxiliary networks, which the mobile-compatible router 2309 has, maintains the information that the network Net-2 is not mobile-compatible.

Step 4-5: The mobile-compatible router 2309 transmits the packet, to which the positional and inherent address headers have been added in the step 4-4, to the mobile terminal 2321, and the mobile terminal 2321 receives the transmitted packet.

Packets are transmitted and received in the manner described above in communications started between mobile terminals and also between mobile and fixed terminals.

With the above arrangement of the present invention, in a network composed of mobile terminals, fixed terminals, mobile-compatible auxiliary networks to which mobile terminals can be connected, and mobile-incompatible auxiliary networks to which mobile terminals cannot be connected, it is possible to reduce the amount of packet processing in mobile terminals, and effect communications between mobile and fixed terminals without causing inconsistencies in a protocol hierarchy used by the mobile terminals.

Although certain preferred embodiments of the present invention have been shown and described in detail, it should be understood that various changes and modifications may be made therein without departing from the scope of the appended claims.

What is claimed is:

1. A mobile packet communication system comprising:
   a plurality of auxiliary networks;
   a plurality of mobile terminals connected to said auxiliary networks, each of said mobile terminals having an inherent address independent of the auxiliary network to which the mobile terminal is connected and a positional address depending on the auxiliary network to which the mobile terminal is connected;
   a router interconnecting said auxiliary networks;
   each of said auxiliary networks having a database that stores data defining the association between the inherent and positional addresses of the mobile terminals connected thereto, and a server for managing said database;
   each of said mobile terminals having a home network as one of said auxiliary networks which is determined by the inherent address of the mobile terminal, each of said mobile terminals being movable between said auxiliary networks;
   each of said mobile terminals having:
   a) an inherent address processing layer for adding a packet header based on said inherent address thereof to transmission data from a higher layer; and
   b) a positional address processing layer for adding a packet header based on said positional address thereof to the transmission data to which the packet header based on said inherent address has been added by said inherent address processing layer;
   c) the packet headers containing no header information representing an association between said inherent address and said positional address.

2. A mobile packet communication system according to claim 1, wherein each of said mobile terminals comprises:
   a) means for periodically indicating address association information indicative of the association between the inherent address and the positional address of the mobile terminal, to the server which manages said database of the auxiliary network to which the mobile terminal is currently connected.

3. A mobile packet communication system according to claim 2, wherein said address association information includes:
   a) an identifier of the server which manages said database of the auxiliary network which is determined as the home network by the inherent address of the mobile terminal.

4. A mobile packet communication system according to claim 2, wherein said server comprises:
   a) means for receiving said address association information from said mobile terminal connected to the auxiliary network managed by said server and address association information in other auxiliary networks from servers which manage the other auxiliary networks;
   b) means for storing, as address association data in the servers, said address association information from said mobile terminal and the address association information in the other auxiliary networks from the servers which manage the other auxiliary networks;
   c) means for classifying said address association information from said mobile terminal, among the address association data in the servers, according to the servers which manage the databases with respect to the home networks, thereby generating address association information in the other auxiliary networks for the respective servers;
   d) means for periodically transmitting the address association information in the other auxiliary networks for the respective servers to said servers; and
   e) means for periodically transmitting an association between all said inherent and positional addresses contained in the address association information in the servers as multiaddress database updating information to the auxiliary networks managed by said servers.

5. A mobile packet communication system according to claim 3, wherein said server comprises:
   a) means for receiving said address association information from said mobile terminal connected to the auxiliary network managed by said server and address association information in other auxiliary networks from servers which manage the other auxiliary networks;
   b) means for storing, as address association data in the servers, said address association information from said mobile terminal and the address association information in the other auxiliary networks from the servers which manage the other auxiliary networks;
   c) means for classifying said address association information from said mobile terminal, among the address association data in the servers, according to the servers which manage the databases with respect to the home networks, thereby generating address association information in the other auxiliary networks for the respective servers;
   d) means for periodically transmitting the address association information in the other auxiliary networks for the respective servers to said servers; and e) means for periodically transmitting an association between all said inherent and positional addresses contained in the address association information in the servers as multiaddress database updating information to the auxiliary networks managed by said servers.

6. A mobile packet communication system according to claim 1, wherein said router comprises:

a) means for receiving the database updating information and storing said database updating information, as router address association data; and b) analyzing and reconfiguring means for analyzing a packet header based on the inherent address of a received packet and a packet header based on the positional address of the received packet, and reconfiguring the packet headers based on said router address association data.

7. A mobile packet communication system according to claim 2, wherein said router comprises:

a) means for receiving the database updating information and holding the same data as said databases as router address association data; and b) analyzing and reconfiguring means for analyzing a packet header based on the inherent address of a received packet and a packet header based on the positional address of the received packet, and reconfiguring the packet headers based on said router address association data.

8. A mobile packet communication system according to claim 3, wherein said router comprises:

a) means for receiving the database updating information and holding the same data as said databases as router address association data; and b) analyzing and reconfiguring means for analyzing a packet header based on the inherent address of a received packet and a packet header based on the positional address of the received packet, and reconfiguring the packet headers based on said router address association data.

9. A mobile packet communication system according to claim 4, wherein said router comprises:

a) means for receiving the database updating information and holding the same data as said databases as router address association data; and b) analyzing and reconfiguring means for analyzing a packet header based on the inherent address of a received packet and a packet header based on the positional address of the received packet, and reconfiguring the packet headers based on said router address association data.

10. A mobile packet communication system according to claim 5, wherein said router comprises:

a) means for receiving the database updating information and holding the same data as said databases as router address association data; and b) analyzing and reconfiguring means for analyzing a packet header based on the inherent address of a received packet and a packet header based on the positional address of the received packet, and reconfiguring the packet headers based on said router address association data.

11. A mobile packet communication system according to claim 6, wherein said analyzing and reconfiguring means comprises:

a) inherent address determining means for determining whether a destination address of the packet header based on said inherent address is an address indicating a mobile terminal connected to the auxiliary network to which said router is directly connected, outputting a true value if the destination address of the packet header based on said inherent address is the address indicating the mobile terminal connected to the auxiliary network to which said router is directly connected, and outputting a false value if the destination address of the packet header based on said inherent address is not the address indicating the mobile terminal connected to the auxiliary network to which said router is directly connected;

b) positional address determining means for determining whether a destination address of the packet header based on said positional address is an address indicating a mobile terminal connected to the auxiliary network to which said router is directly connected, outputting a true value if the destination address of the packet header based on said positional address is the address indicating the mobile terminal connected to the auxiliary network to which said router is directly connected, and outputting a false value if the destination address of the packet header based on said positional address is not the address indicating the mobile terminal connected to the auxiliary network to which said router is directly connected;

c) inherent address and router address association data comparing means for determining whether the destination address of the packet header based on said inherent address is present in the router address association data of said router, outputting a true value if the destination address of the packet header based on said inherent address is present in the router address association data of said router, and outputting a false value if the destination address of the packet header based on said inherent address is not present in the router address association data of said router;

d) address association comparing means for determining whether an association between the destination address of the packet header based on said inherent address and the destination address of the packet header based on said positional address is consistent with data in said router address association data, outputting a true value if the association between the destination address of the packet header based on said inherent address and the destination address of the packet header based on said positional address is consistent with data in said router address association data, and outputting a false value if the association between the destination address of the packet header based on said inherent address and the destination address of the packet header based on said positional address is not consistent with data in said router address association data;

e) means for transferring the received packet as it is if said inherent address determining means outputs a true value, said positional address determining means outputs a true value, said inherent address and router address association data comparing means outputs a true value, and said address association comparing means outputs a true value;

f) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a true value, said inherent address and router address association data comparing means outputs a true value, and said address association comparing means outputs a false value;

g) means for discarding said received packet if said inherent address determining means outputs a true value, said positional address determining means outputs a true value, and said inherent address and router address association data comparing means outputs a false value;

h) means for transferring the received packet as it is if said inherent address determining means outputs a true value, said positional address determining means outputs a false value, said inherent address and router address association data comparing means outputs a true value, and said address association comparing means outputs a true value;

i) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a false value, said inherent address and router address association data comparing means outputs a true value, and said address association comparing means outputs a false value;

j) means for discarding said received packet if said inherent address determining means outputs a true value, said positional address determining means outputs a false value, and said inherent address and router address association data comparing means outputs a false value;

k) means for transferring the received packet as it is if said inherent address determining means outputs a false value, said positional address determining means outputs a true value, said inherent address and router address association data comparing means outputs a true value, and said address association comparing means outputs a true value;

l) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, said inherent address and router address association data comparing means outputs a true value, and said address association comparing means outputs a false value;

m) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, and said inherent address and router address association data comparing means outputs a false value; and n) means for transferring the received packet as it is if said inherent address determining means outputs a false value, and said positional address determining means outputs a false value.

12. A mobile packet communication system according to claim 7, wherein said analyzing and reconfiguring means comprises:

a) inherent address determining means for determining whether a destination address of the packet header based on said inherent address is an address indicating a mobile terminal connected to the auxiliary network to which said router is directly connected, outputting a true value if the destination address of the packet header based on said inherent address is the address indicating the mobile terminal connected to the auxiliary network to which said router is directly connected, and outputting a false value if the destination address of the packet header based on said inherent address is not the address indicating the mobile terminal connected to the auxiliary network to which said router is directly connected;

b) positional address determining means for determining whether a destination address of the packet header based on said positional address is an address indicating a mobile terminal connected to the auxiliary network to which said router is directly connected, outputting a true value if the destination address of the packet header based on said positional address is the address indicating the mobile terminal connected to the auxiliary network to which said router is directly connected, and outputting a false value if the destination address of the packet header based on said positional address is not the address indicating the mobile terminal connected to the auxiliary network to which said router is directly connected;

c) inherent address and router address association data comparing means for determining whether the destination address of the packet header based on said inherent address is present in the router address association data of said router, outputting a true value if the destination address of the packet header based on said inherent address is present in the router address association data of said router, and outputting a false value if the destination address of the packet header based on said inherent address is not present in the router address association data of said router;

d) address association comparing means for determining whether an association between the destination address of the packet header based on said inherent address and the destination address of the packet header based on said positional address is consistent with data in said router address association data, outputting a true value if the association between the destination address of the packet header based on said inherent address and the destination address of the packet header based on said positional address is consistent with data in said router address association data, and outputting a false value if the association between the destination address of the packet header based on said inherent address and the destination address of the packet header based on said positional address is not consistent with data in said router address association data;

e) means for transferring the received packet as it is if said inherent address determining means outputs a true value, said positional address determining means outputs a true value, said inherent address and router address association data comparing means outputs a true value, and said address association comparing means outputs a true value;

f) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a true value, said inherent address and router address association data comparing means outputs a true value, and said address association comparing means outputs a false value;

g) means for discarding said received packet if said inherent address determining means outputs a true value, said positional address determining means outputs a true value, and said inherent address and router address association data comparing means outputs a false value;

h) means for transferring the received packet as it is if said inherent address determining means outputs a true value, said positional address determining means outputs a false value, said inherent address and router address association data comparing means outputs a true value, and said address association comparing means outputs a true value;

i) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a false value, said inherent address and router address association data comparing means outputs a true value, and said address association comparing means outputs a false value;

j) means for discarding said received packet if said inherent address determining means outputs a true value, said positional address determining means outputs a false value, and said inherent address and router address association data comparing means outputs a false value;

k) means for transferring the received packet as it is if said inherent address determining means outputs a false value, said positional address determining means outputs a true value, said inherent address and router address association data comparing means outputs a true value, and said address association comparing means outputs a true value;

l) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, said inherent address and router address association data comparing means outputs a true value, and said address association comparing means outputs a false value;

m) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, and said inherent address and router address association data comparing means outputs a false value; and n) means for transferring the received packet as it is if said inherent address determining means outputs a false value, and said positional address determining means outputs a false value.

13. A mobile packet communication system according to claim 8, wherein said analyzing and reconfiguring means comprises:

a) inherent address determining means for determining whether a destination address of the packet header based on said inherent address is an address indicating a mobile terminal connected to the auxiliary network to which said router is directly connected, outputting a true value if the destination address of the packet header based on said inherent address is the address indicating the mobile terminal connected to the auxiliary network to which said router is directly connected, and outputting a false value if the destination address of the packet header based on said inherent address is not the address indicating the mobile terminal connected to the auxiliary network to which said router is directly connected;

b) positional address determining means for determining whether a destination address of the packet header based on said positional address is an address indicating a mobile terminal connected to the auxiliary network to which said router is directly connected, outputting a true value if the destination address of the packet header based on said positional address is the address indicating the mobile terminal connected to the auxiliary network to which said router is directly connected, and outputting a false value if the destination address of the packet header based on said positional address is not the address indicating the mobile terminal connected to the auxiliary network to which said router is directly connected;

c) inherent address and router address association data comparing means for determining whether the destination address of the packet header based on said inherent address is present in the router address association data of said router, outputting a true value if the destination address of the packet header based on said inherent address is present in the router address association data of said router, and outputting a false value if the destination address of the packet header based on said inherent address is not present in the router address association data of said router;

d) address association comparing means for determining whether an association between the destination address of the packet header based on said inherent address and the destination address of the packet header based on said positional address is consistent with data in said router address association data, outputting a true value if the association between the destination address of the packet header based on said inherent address and the destination address of the packet header based on said positional address is consistent with data in said router address association data, and outputting a false value if the association between the destination address of the packet header based on said inherent address and the destination address of the packet header based on said positional address is not consistent with data in said router address association data;

e) means for transferring the received packet as it is if said inherent address determining means outputs a true value, said positional address determining means outputs a true value, said inherent address and router address association data comparing means outputs a true value, and said address association comparing means outputs a true value;

f) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a true value, said inherent address and router address association data comparing means outputs a true value, and said address association comparing means outputs a false value;

g) means for discarding said received packet if said inherent address determining means outputs a true value, said positional address determining means outputs a true value, and said inherent address and router address association data comparing means outputs a false value;

h) means for transferring the received packet as it is if said inherent address determining means outputs a true value, said positional address determining means outputs a false value, said inherent address and router address association data comparing means outputs a true value, and said address association comparing means outputs a true value;

i) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a false value, said inherent address and router address association data comparing means outputs a true value, and said address association comparing means outputs a false value;

j) means for discarding said received packet if said inherent address determining means outputs a true value, said positional address determining means outputs a false value, and said inherent address and router address association data comparing means outputs a false value;

k) means for transferring the received packet as it is if said inherent address determining means outputs a false value, said positional address determining means outputs a true value, said inherent address and router address association data comparing means outputs a true value, and said address association comparing means outputs a true value;

l) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, said inherent address and router address association data comparing means outputs a true value, and said address association comparing means outputs a false value;

m) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, and said inherent address and router address association data comparing means outputs a false value; and n) means for transferring the received packet as it is if said inherent address determining means outputs a false value, and said positional address determining means outputs a false value.

14. A mobile packet communication system according to claim 9, wherein said analyzing and reconfiguring means comprises:

a) inherent address determining means for determining whether a destination address of the packet header based on said inherent address is an address indicating a mobile terminal connected to the auxiliary network to which said router is directly connected, outputting a true value if the destination address of the packet header based on said inherent address is the address indicating the mobile terminal connected to the auxiliary network to which said router is directly connected, and outputting a false value if the destination address of the packet header based on said inherent address is not the address indicating the mobile terminal connected to the auxiliary network to which said router is directly connected;

b) positional address determining means for determining whether a destination address of the packet header based on said positional address is an address indicating a mobile terminal connected to the auxiliary network to which said router is directly connected, outputting a true value if the destination address of the packet header based on said positional address is the address indicating the mobile terminal connected to the auxiliary network to which said router is directly connected, and outputting a false value if the destination address of the packet header based on said positional address is not the address indicating the mobile terminal connected to the auxiliary network to which said router is directly connected;

c) inherent address and router address association data comparing means for determining whether the destination address of the packet header based on said inherent address is present in the router address association data of said router, outputting a true value if the destination address of the packet header based on said inherent address is present in the router address association data of said router, and outputting a false value if the destination address of the packet header based on said inherent address is not present in the router address association data of said router;

d) address association comparing means for determining whether an association between the destination address of the packet header based on said inherent address and the destination address of the packet header based on said positional address is consistent with data in said router address association data, outputting a true value if the association between the destination address of the packet header based on said inherent address and the destination address of the packet header based on said positional address is consistent with data in said router address association data, and outputting a false value if the association between the destination address of the packet header based on said inherent address and the destination address of the packet header based on said positional address is not consistent with data in said router address association data;

e) means for transferring the received packet as it is if said inherent address determining means outputs a true value, said positional address determining means outputs a true value, said inherent address and router address association data comparing means outputs a true value, and said address association comparing means outputs a true value;

f) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a true value, said inherent address and router address association data comparing means outputs a true value, and said address association comparing means outputs a false value;

g) means for discarding said received packet if said inherent address determining means outputs a true value, said positional address determining means outputs a true value, and said inherent address and router address association data comparing means outputs a false value;

h) means for transferring the received packet as it is if said inherent address determining means outputs a true value, said positional address determining means outputs a false value, said inherent address and router address association data comparing means outputs a true value, and said address association comparing means outputs a true value;

i) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a false value, said inherent address and router address association data comparing means outputs a true value, and said address association comparing means outputs a false value;

j) means for discarding said received packet if said inherent address determining means outputs a true value, said positional address determining means outputs a false value, and said inherent address and router address association data comparing means outputs a false value;

k) means for transferring the received packet as it is if said inherent address determining means outputs a false value, said positional address determining means outputs a true value, said inherent address and router address association data comparing means outputs a true value, and said address association comparing means outputs a true value;

l) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, said inherent address and router address association data comparing means outputs a true value, and said address association comparing means outputs a false value;

m) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, and said inherent address and router address association data comparing means outputs a false value; and n) means for transferring the received packet as it is if said inherent address determining means outputs a false value, and said positional address determining means outputs a false value.

15. A mobile packet communication system according to claim 10, wherein said analyzing and reconfiguring means comprises:

a) inherent address determining means for determining whether a destination address of the packet header based on said inherent address is an address indicating a mobile terminal connected to the auxiliary network to which said router is directly connected, outputting a true value if the destination address of the packet header based on said inherent address is the address indicating the mobile terminal connected to the auxiliary network to which said router is directly connected, and outputting a false value if the destination address of the packet header based on said inherent address is not the address indicating the mobile terminal connected to the auxiliary network to which said router is directly connected;

b) positional address determining means for determining whether a destination address of the packet header based on said positional address is an address indicating a mobile terminal connected to the auxiliary network to which said router is directly connected, outputting a true value if the destination address of the packet header based on said positional address is the address indicating the mobile terminal connected to the auxiliary network to which said router is directly connected, and outputting a false value if the destination address of the packet header based on said positional address is not the address indicating the mobile terminal connected to the auxiliary network to which said router is directly connected;

c) inherent address and router address association data comparing means for determining whether the destination address of the packet header based on said inherent address is present in the router address association data of said router, outputting a true value if the destination address of the packet header based on said inherent address is present in the router address association data of said router, and outputting a false value if the destination address of the packet header based on said inherent address is not present in the router address association data of said router;

d) address association comparing means for determining whether an association between the destination address of the packet header based on said inherent address and the destination address of the packet header based on said positional address is consistent with data in said router address association data, outputting a true value if the association between the destination address of the packet header based on said inherent address and the destination address of the packet header based on said positional address is consistent with data in said router address association data, and outputting a false value if the association between the destination address of the packet header based on said inherent address and the destination address of the packet header based on said positional address is not consistent with data in said router address association data;

e) means for transferring the received packet as it is if said inherent address determining means outputs a true value, said positional address determining means outputs a true value, said inherent address and router address association data comparing means outputs a true value, and said address association comparing means outputs a true value;

f) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a true value, said inherent address and router address association data comparing means outputs a true value, and said address association comparing means outputs a false value;

g) means for discarding said received packet if said inherent address determining means outputs a true value, said positional address determining means outputs a true value, and said inherent address and router address association data comparing means outputs a false value;

h) means for transferring the received packet as it is if said inherent address determining means outputs a true value, said positional address determining means outputs a false value, said inherent address and router address association data comparing means outputs a true value, and said address association comparing means outputs a true value;

i) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a false value, said inherent address and router address association data comparing means outputs a true value, and said address association comparing means outputs a false value;

j) means for discarding said received packet if said inherent address determining means outputs a true value, said positional address determining means outputs a false value, and said inherent address and router address association data comparing means outputs a false value;

k) means for transferring the received packet as it is if said inherent address determining means outputs a false value, said positional address determining means outputs a true value, said inherent address and router address association data comparing means outputs a true value, and said address association comparing means outputs a true value;

l) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, said inherent address and router address association data comparing means outputs a true value, and said address association comparing means outputs a false value;

m) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, and said inherent address and router address association data comparing means outputs a false value; and n) means for transferring the received packet as it is if said inherent address determining means outputs a false value, and said positional address determining means outputs a false value.

16. A mobile packet communication system according to claim 6, wherein said analyzing and reconfiguring means comprises:

a) inherent address determining means for determining whether a destination address of the packet header based on said inherent address is an address indicating a mobile terminal connected to the auxiliary network to which said router is directly connected, outputting a true value if the destination address of the packet header based on said inherent address is the address indicating the mobile terminal connected to the auxiliary network to which said router is directly connected, and outputting a false value if the destination address of the packet header based on said inherent address is not the address indicating the mobile terminal connected to the auxiliary network to which said router is directly connected;

b) positional address determining means for determining whether a destination address of the packet header based on said positional address is an address indicating a mobile terminal connected to the auxiliary network to which said router is directly connected, outputting a true value if the destination address of the packet header based on said positional address is the address indicating the mobile terminal connected to the auxiliary network to which said router is directly connected, and outputting a false value if the destination address of the packet header based on said positional address is not the address indicating the mobile terminal connected to the auxiliary network to which said router is directly connected;

c) inherent address and router address association data comparing means for determining whether the destination address of the packet header based on said inherent address is present in the router address association data of said router, outputting a true value if the destination address of the packet header based on said inherent address is present in the router address association data of said router, and outputting a false value if the destination address of the packet header based on said inherent address is not present in the router address association data of said router;

d) address association comparing means for determining whether an association between the destination address of the packet header based on said inherent address and the destination address of the packet header based on said positional address is consistent with data in said router address association data, outputting a true value if the association between the destination address of the packet header based on said inherent address and the destination address of the packet header based on said positional address is consistent with data in said router address association data, and outputting a false value if the association between the destination address of the packet header based on said inherent address and the destination address of the packet header based on said positional address is not consistent with data in said router address association data;

e) means for transferring the received packet as it is if said inherent address determining means outputs a true value, said positional address determining means outputs a true value, said inherent address and router address association data comparing means outputs a true value, and said address association comparing means outputs a true value;

f) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a true value, said inherent address and router address association data comparing means outputs a true value, and said address association comparing means outputs a false value;

g) means for discarding said received packet if said inherent address determining means outputs a true value, said positional address determining means outputs a true value, and said inherent address and router address association data comparing means outputs a false value;

h) means for transferring the received packet as it is if said inherent address determining means outputs a true value, said positional address determining means outputs a false value, said inherent address and router address association data comparing means outputs a true value, and said address association comparing means outputs a true value;

i) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a false value, said inherent address and router address association data comparing means outputs a true value, and said address association comparing means outputs a false value;

j) means for discarding said received packet if said inherent address determining means outputs a true value, said positional address determining means outputs a false value, and said inherent address and router address association data comparing means outputs a false value;

k) means for transferring the received packet as it is if said inherent address determining means outputs a false value, said positional address determining means outputs a true value, said inherent address and router address association data comparing means outputs a true value, and said address association comparing means outputs a true value;

l) means for replacing the destination address of the packet header based on said positional address of said received packet with a positional address indicated by the router address association data, thereby reconfiguring the header based on said positional address of said received packet, and transferring the packet, if said inherent address determining means outputs a false value, said positional address determining means outputs a true value, said inherent address and router address association data comparing means outputs a true value, and said address association comparing means outputs a false value;

m) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, and said inherent address and router address association data comparing means outputs a false value; and n) means for transferring the received packet as it is if said inherent address determining means outputs a false value, and said positional address determining means outputs a false value.

17. A mobile packet communication system according to claim 7, wherein said analyzing and reconfiguring means comprises:

a) inherent address determining means for determining whether a destination address of the packet header based on said inherent address is an address indicating a mobile terminal connected to the auxiliary network to which said router is directly connected, outputting a true value if the destination address of the packet header based on said inherent address is the address indicating the mobile terminal connected to the auxiliary network to which said router is directly connected, and outputting a false value if the destination address of the packet header based on said inherent address is not the address indicating the mobile terminal connected to the auxiliary network to which said router is directly connected;

b) positional address determining means for determining whether a destination address of the packet header based on said positional address is an address indicating a mobile terminal connected to the auxiliary network to which said router is directly connected, outputting a true value if the destination address of the packet header based on said positional address is the address indicating the mobile terminal connected to the auxiliary network to which said router is directly connected, and outputting a false value if the destination address of the packet header based on said positional address is not the address indicating the mobile terminal connected to the auxiliary network to which said router is directly connected;

c) inherent address and router address association data comparing means for determining whether the destination address of the packet header based on said inherent address is present in the router address association data of said router, outputting a true value if the destination address of the packet header based on said inherent address is present in the router address association data of said router, and outputting a false value if the destination address of the packet header based on said inherent address is not present in the router address association data of said router;

d) address association comparing means for determining whether an association between the destination address of the packet header based on said inherent address and the destination address of the packet header based on said positional address is consistent with data in said router address association data, outputting a true value if the association between the destination address of the packet header based on said inherent address and the destination address of the packet header based on said positional address is consistent with data in said router address association data, and outputting a false value if the association between the destination address of the packet header based on said inherent address and the destination address of the packet header based on said positional address is not consistent with data in said router address association data;

e) means for transferring the received packet as it is if said inherent address determining means outputs a true value, said positional address determining means outputs a true value, said inherent address and router address association data comparing means outputs a true value, and said address association comparing means outputs a true value;

f) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a true value, said inherent address and router address association data comparing means outputs a true value, and said address association comparing means outputs a false value;

g) means for discarding said received packet if said inherent address determining means outputs a true value, said positional address determining means outputs a true value, and said inherent address and router address association data comparing means outputs a false value;

h) means for transferring the received packet as it is if said inherent address determining means outputs a true value, said positional address determining means outputs a false value, said inherent address and router address association data comparing means outputs a true value, and said address association comparing means outputs a true value;

i) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a false value, said inherent address and router address association data comparing means outputs a true value, and said address association comparing means outputs a false value;

j) means for discarding said received packet if said inherent address determining means outputs a true value, said positional address determining means outputs a false value, and said inherent address and router address association data comparing means outputs a false value;

k) means for transferring the received packet as it is if said inherent address determining means outputs a false value, said positional address determining means outputs a true value, said inherent address and router address association data comparing means outputs a true value, and said address association comparing means outputs a true value;

l) means for replacing the destination address of the packet header based on said positional address of said received packet with a positional address indicated by the router address association data, thereby reconfiguring the header based on said positional address of said received packet, and transferring the packet, if said inherent address determining means outputs a false value, said positional address determining means outputs a true value, said inherent address and router address association data comparing means outputs a true value, and said address association comparing means outputs a false value;

m) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, and said inherent address and router address association data comparing means outputs a false value; and n) means for transferring the received packet as it is if said inherent address determining means outputs a false value, and said positional address determining means outputs a false value.

18. A mobile packet communication system according to claim 8, wherein said analyzing and reconfiguring means comprises:

a) inherent address determining means for determining whether a destination address of the packet header based on said inherent address is an address indicating a mobile terminal connected to the auxiliary network to which said router is directly connected, outputting a true value if the destination address of the packet header based on said inherent address is the address indicating the mobile terminal connected to the auxiliary network to which said router is directly connected, and outputting a false value if the destination address of the packet header based on said inherent address is not the address indicating the mobile terminal connected to the auxiliary network to which said router is directly connected;

b) positional address determining means for determining whether a destination address of the packet header based on said positional address is an address indicating a mobile terminal connected to the auxiliary network to which said router is directly connected, outputting a true value if the destination address of the packet header based on said positional address is the address indicating the mobile terminal connected to the auxiliary network to which said router is directly connected, and outputting a false value if the destination address of the packet header based on said positional address is not the address indicating the mobile terminal connected to the auxiliary network to which said router is directly connected;

c) inherent address and router address association data comparing means for determining whether the destination address of the packet header based on said inherent address is present in the router address association data of said router, outputting a true value if the destination address of the packet header based on said inherent address is present in the router address association data of said router, and outputting a false value if the destination address of the packet header based on said inherent address is not present in the router address association data of said router;

d) address association comparing means for determining whether an association between the destination address of the packet header based on said inherent address and the destination address of the packet header based on said positional address is consistent with data in said router address association data, outputting a true value if the association between the destination address of the packet header based on said inherent address and the destination address of the packet header based on said positional address is consistent with data in said router address association data, and outputting a false value if the association between the destination address of the packet header based on said inherent address and the destination address of the packet header based on said positional address is not consistent with data in said router address association data;

e) means for transferring the received packet as it is if said inherent address determining means outputs a true value, said positional address determining means outputs a true value, said inherent address and router address association data comparing means outputs a true value, and said address association comparing means outputs a true value;

f) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a true value, said inherent address and router address association data comparing means outputs a true value, and said address association comparing means outputs a false value;

g) means for discarding said received packet if said inherent address determining means outputs a true value, said positional address determining means outputs a true value, and said inherent address and router address association data comparing means outputs a false value;

h) means for transferring the received packet as it is if said inherent address determining means outputs a true value, said positional address determining means outputs a false value, said inherent address and router address association data comparing means outputs a true value, and said address association comparing means outputs a true value;

i) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a false value, said inherent address and router address association data comparing means outputs a true value, and said address association comparing means outputs a false value;

j) means for discarding said received packet if said inherent address determining means outputs a true value, said positional address determining means outputs a false value, and said inherent address and router address association data comparing means outputs a false value;

k) means for transferring the received packet as it is if said inherent address determining means outputs a false value, said positional address determining means outputs a true value, said inherent address and router address association data comparing means outputs a true value, and said address association comparing means outputs a true value;

l) means for replacing the destination address of the packet header based on said positional address of said received packet with a positional address indicated by the router address association data, thereby reconfiguring the header based on said positional address of said received packet, and transferring the packet, if said inherent address determining means outputs a false value, said positional address determining means outputs a true value, said inherent address and router address association data comparing means outputs a true value, and said address association comparing means outputs a false value;

m) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, and said inherent address and router address association data comparing means outputs a false value; and n) means for transferring the received packet as it is if said inherent address determining means outputs a false value, and said positional address determining means outputs a false value.

19. A mobile packet communication system according to claim 9, wherein said analyzing and reconfiguring means comprises:

a) inherent address determining means for determining whether a destination address of the packet header based on said inherent address is an address indicating a mobile terminal connected to the auxiliary network to which said router is directly connected, outputting a true value if the destination address of the packet header based on said inherent address is the address indicating the mobile terminal connected to the auxiliary network to which said router is directly connected, and outputting a false value if the destination address of the packet header based on said inherent address is not the address indicating the mobile terminal connected to the auxiliary network to which said router is directly connected;

b) positional address determining means for determining whether a destination address of the packet header based on said positional address is an address indicating a mobile terminal connected to the auxiliary network to which said router is directly connected, outputting a true value if the destination address of the packet header based on said positional address is the address indicating the mobile terminal connected to the auxiliary network to which said router is directly connected, and outputting a false value if the destination address of the packet header based on said positional address is not the address indicating the mobile terminal connected to the auxiliary network to which said router is directly connected;

c) inherent address and router address association data comparing means for determining whether the destination address of the packet header based on said inherent address is present in the router address association data of said router, outputting a true value if the destination address of the packet header based on said inherent address is present in the router address association data of said router, and outputting a false value if the destination address of the packet header based on said inherent address is not present in the router address association data of said router;

d) address association comparing means for determining whether an association between the destination address of the packet header based on said inherent address and the destination address of the packet header based on said positional address is consistent with data in said router address association data, outputting a true value if the association between the destination address of the packet header based on said inherent address and the destination address of the packet header based on said positional address is consistent with data in said router address association data, and outputting a false value if the association between the destination address of the packet header based on said inherent address and the destination address of the packet header based on said positional address is not consistent with data in said router address association data;

e) means for transferring the received packet as it is if said inherent address determining means outputs a true value, said positional address determining means outputs a true value, said inherent address and router address association data comparing means outputs a true value, and said address association comparing means outputs a true value;

f) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a true value, said inherent address and router address association data comparing means outputs a true value, and said address association comparing means outputs a false value;

g) means for discarding said received packet if said inherent address determining means outputs a true value, said positional address determining means outputs a true value, and said inherent address and router address association data comparing means outputs a false value;

h) means for transferring the received packet as it is if said inherent address determining means outputs a true value, said positional address determining means outputs a false value, said inherent address and router address association data comparing means outputs a true value, and said address association comparing means outputs a true value;

i) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a false value, said inherent address and router address association data comparing means outputs a true value, and said address association comparing means outputs a false value;

j) means for discarding said received packet if said inherent address determining means outputs a true value, said positional address determining means outputs a false value, and said inherent address and router address association data comparing means outputs a false value;

k) means for transferring the received packet as it is if said inherent address determining means outputs a false value, said positional address determining means outputs a true value, said inherent address and router address association data comparing means outputs a true value, and said address association comparing means outputs a true value;

l) means for replacing the destination address of the packet header based on said positional address of said received packet with a positional address indicated by the router address association data, thereby reconfiguring the header based on said positional address of said received packet, and transferring the packet, if said inherent address determining means outputs a false value, said positional address determining means outputs a true value, said inherent address and router address association data comparing means outputs a true value, and said address association comparing means outputs a false value;

m) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, and said inherent address and router address association data comparing means outputs a false value; and n) means for transferring the received packet as it is if said inherent address determining means outputs a false value, and said positional address determining means outputs a false value.

20. A mobile packet communication system according to claim 10, wherein said analyzing and reconfiguring means comprises:

a) inherent address determining means for determining whether a destination address of the packet header based on said inherent address is an address indicating a mobile terminal connected to the auxiliary network to which said router is directly connected, outputting a true value if the destination address of the packet header based on said inherent address is the address indicating the mobile terminal connected to the auxiliary network to which said router is directly connected, and outputting a false value if the destination address of the packet header based on said inherent address is not the address indicating the mobile terminal connected to the auxiliary network to which said router is directly connected;

b) positional address determining means for determining whether a destination address of the packet header based on said positional address is an address indicating a mobile terminal connected to the auxiliary network to which said router is directly connected, outputting a true value if the destination address of the packet header based on said positional address is the address indicating the mobile terminal connected to the auxiliary network to which said router is directly connected, and outputting a false value if the destination address of the packet header based on said positional address is not the address indicating the mobile terminal connected to the auxiliary network to which said router is directly connected;

c) inherent address and router address association data comparing means for determining whether the destination address of the packet header based on said inherent address is present in the router address association data of said router, outputting a true value if the destination address of the packet header based on said inherent address is present in the router address association data of said router, and outputting a false value if the destination address of the packet header based on said inherent address is not present in the router address association data of said router;

d) address association comparing means for determining whether an association between the destination address of the packet header based on said inherent address and the destination address of the packet header based on said positional address is consistent with data in said router address association data, outputting a true value if the association between the destination address of the packet header based on said inherent address and the destination address of the packet header based on said positional address is consistent with data in said router address association data, and outputting a false value if the association between the destination address of the packet header based on said inherent address and the destination address of the packet header based on said positional address is not consistent with data in said router address association data;

e) means for transferring the received packet as it is if said inherent address determining means outputs a true value, said positional address determining means outputs a true value, said inherent address and router address association data comparing means outputs a true value, and said address association comparing means outputs a true value;

f) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a true value, said inherent address and router address association data comparing means outputs a true value, and said address association comparing means outputs a false value;

g) means for discarding said received packet if said inherent address determining means outputs a true value, said positional address determining means outputs a true value, and said inherent address and router address association data comparing means outputs a false value;

h) means for transferring the received packet as it is if said inherent address determining means outputs a true value, said positional address determining means outputs a false value, said inherent address and router address association data comparing means outputs a true value, and said address association comparing means outputs a true value;

i) means for replacing the destination address of the packet header based on said positional address of said received packet with a positional address indicated by said router address association data, thereby reconfiguring the header based on said positional address of said received packet, and transferring the packet, if said inherent address determining means outputs a true value, said positional address determining means outputs a false value, said inherent address and router address association data comparing means outputs a true value, and said address association comparing means outputs a false value;

j) means for discarding said received packet if said inherent address determining means outputs a true value, said positional address determining means outputs a false value, and said inherent address and router address association data comparing means outputs a false value;

k) means for transferring the received packet as it is if said inherent address determining means outputs a false value, said positional address determining means outputs a true value, said inherent address and router address association data comparing means outputs a true value, and said address association comparing means outputs a true value;

l) means for replacing the destination address of the packet header based on said positional address of said received packet with a positional address indicated by the router address association data, thereby reconfiguring the header based on said positional address of said received packet, and transferring the packet, if said inherent address determining means outputs a false value, said positional address determining means outputs a true value, said inherent address and router address association data comparing means outputs a true value, and said address association comparing means outputs a false value;

m) means for replacing the destination address of the packet header based on said positional address of said received packet with the destination address of the packet header based on said inherent address of said received packet, thereby reconfiguring the header based on said positional address of said received packet, and transferring the packet, if said inherent address determining means outputs a false value, said positional address determining means outputs a true value, and said inherent address and router address association data comparing means outputs a false value; and n) means for transferring the received packet as it is if said inherent address determining means outputs a false value, and said positional address determining means outputs a false value.

21. A mobile packet communication system according to claim 1, wherein each of said mobile terminals comprises:

a) means for receiving said database updating information and holding the same data as said database and said address association information relative to a terminal with which the mobile terminal is to communicate, as mobile terminal address association information;

b) means for detecting whether the inherent address of a source in a header based on the inherent address of a received packet is contained in said mobile terminal address association information;

c) means for adding an association between the inherent address of the source in the header based on the inherent address of the received packet and the positional address of the source in the header based on the positional address of the received packet, to said mobile terminal address association information, if the inherent address of the source is not contained in said mobile terminal address association information; and d) means for updating said mobile terminal address association information using an association between the inherent address of the source in the header based on the inherent address of the received packet and the positional address of the source in the header based on the positional address of the received packet, if the inherent address of the source is contained in said mobile terminal address association information and also if the association between the inherent address of the source in the header based on the inherent address of the received packet and the positional address of the source in the header based on the positional address of the received packet is different from an association contained in said mobile terminal address association information.

22. A mobile packet communication system according to claim 2, wherein each of said mobile terminals comprises:

a) means for receiving said database updating information and holding the same data as said database and said address association information relative to a terminal with which the mobile terminal is to communicate, as mobile terminal address association information;

b) means for detecting whether the inherent address of a source in a header based on the inherent address of a received packet is contained in said mobile terminal address association information;

c) means for adding an association between the inherent address of the source in the header based on the inherent address of the received packet and the positional address of the source in the header based on the positional address of the received packet, to said mobile terminal address association information, if the inherent address of the source is not contained in said mobile terminal address association information; and d) means for updating said mobile terminal address association information using an association between the inherent address of the source in the header based on the inherent address of the received packet and the positional address of the source in the header based on the positional address of the received packet, if the inherent address of the source is contained in said mobile terminal address association information and also if the association between the inherent address of the source in the header based on the inherent address of the received packet and the positional address of the source in the header based on the positional address of the received packet is different from an association contained in said mobile terminal address association information.

23. A mobile packet communication system according to claim 3, wherein each of said mobile terminals comprises:

a) means for receiving said database updating information and holding the same data as said database and said address association information relative to a terminal with which the mobile terminal is to communicate, as mobile terminal address association information;

b) means for detecting whether the inherent address of a source in a header based on the inherent address of a received packet is contained in said mobile terminal address association information;

c) means for adding an association between the inherent address of the source in the header based on the inherent address of the received packet and the positional address of the source in the header based on the positional address of the received packet, to said mobile terminal address association information, if the inherent address of the source is not contained in said mobile terminal address association information; and d) means for updating said mobile terminal address association information using an association between the inherent address of the source in the header based on the inherent address of the received packet and the positional address of the source in the header based on the positional address of the received packet, if the inherent address of the source is contained in said mobile terminal address association information and also if the association between the inherent address of the source in the header based on the inherent address of the received packet and the positional address of the source in the header based on the positional address of the received packet is different from an association contained in said mobile terminal address association information.

24. A mobile packet communication system according to claim 4, wherein each of said mobile terminals comprises:

a) means for receiving said database updating information and holding the same data as said database and said address association information relative to a terminal with which the mobile terminal is to communicate, as mobile terminal address association information;

b) means for detecting whether the inherent address of a source in a header based on the inherent address of a received packet is contained in said mobile terminal address association information;

c) means for adding an association between the inherent address of the source in the header based on the inherent address of the received packet and the positional address of the source in the header based on the positional address of the received packet, to said mobile terminal address association information, if the inherent address of the source is not contained in said mobile terminal address association information; and d) means for updating said mobile terminal address association information using an association between the inherent address of the source in the header based on the inherent address of the received packet and the positional address of the source in the header based on the positional address of the received packet, if the inherent address of the source is contained in said mobile terminal address association information and also if the association between the inherent address of the source in the header based on the inherent address of the received packet and the positional address of the source in the header based on the positional address of the received packet is different from an association contained in said mobile terminal address association information.

25. A mobile packet communication system according to claim 5, wherein each of said mobile terminals comprises:

a) means for receiving said database updating information and holding the same data as said database and said address association information relative to a terminal with which the mobile terminal is to communicate, as mobile terminal address association information;

b) means for detecting whether the inherent address of a source in a header based on the inherent address of a received packet is contained in said mobile terminal address association information;

c) means for adding an association between the inherent address of the source in the header based on the inherent address of the received packet and the positional address of the source in the header based on the positional address of the received packet, to said mobile terminal address association information, if the inherent address of the source is not contained in said mobile terminal address association information; and d) means for updating said mobile terminal address association information using an association between the inherent address of the source in the header based on the inherent address of the received packet and the positional address of the source in the header based on the positional address of the received packet, if the inherent address of the source is contained in said mobile terminal address association information and also if the association between the inherent address of the source in the header based on the inherent address of the received packet and the positional address of the source in the header based on the positional address of the received packet is different from an association contained in said mobile terminal address association information.

26. A mobile packet communication system according to claim 6, wherein each of said mobile terminals comprises:

a) means for receiving said database updating information and holding the same data as said database and said address association information relative to a terminal with which the mobile terminal is to communicate, as mobile terminal address association information;

b) means for detecting whether the inherent address of a source in a header based on the inherent address of a received packet is contained in said mobile terminal address association information;

c) means for adding an association between the inherent address of the source in the header based on the inherent address of the received packet and the positional address of the source in the header based on the positional address of the received packet, to said mobile terminal address association information, if the inherent address of the source is not contained in said mobile terminal address association information; and d) means for updating said mobile terminal address association information using an association between the inherent address of the source in the header based on the inherent address of the received packet and the positional address of the source in the header based on the positional address of the received packet, if the inherent address of the source is contained in said mobile terminal address association information and also if the association between the inherent address of the source in the header based on the inherent address of the received packet and the positional address of the source in the header based on the positional address of the received packet is different from an association contained in said mobile terminal address association information.

27. A mobile packet communication system according to claim 7, wherein each of said mobile terminals comprises:

a) means for receiving said database updating information and holding the same data as said database and said address association information relative to a terminal with which the mobile terminal is to communicate, as mobile terminal address association information;

b) means for detecting whether the inherent address of a source in a header based on the inherent address of a received packet is contained in said mobile terminal address association information;

c) means for adding an association between the inherent address of the source in the header based on the inherent address of the received packet and the positional address of the source in the header based on the positional address of the received packet, to said mobile terminal address association information, if the inherent address of the source is not contained in said mobile terminal address association information; and d) means for updating said mobile terminal address association information using an association between the inherent address of the source in the header based on the inherent address of the received packet and the positional address of the source in the header based on the positional address of the received packet, if the inherent address of the source is contained in said mobile terminal address association information and also if the association between the inherent address of the source in the header based on the inherent address of the received packet and the positional address of the source in the header based on the positional address of the received packet is different from an association contained in said mobile terminal address association information.

28. A mobile packet communication system according to claim 8, wherein each of said mobile terminals comprises:

a) means for receiving said database updating information and holding the same data as said database and said address association information relative to a terminal with which the mobile terminal is to communicate, as mobile terminal address association information;

b) means for detecting whether the inherent address of a source in a header based on the inherent address of a received packet is contained in said mobile terminal address association information;

c) means for adding an association between the inherent address of the source in the header based on the inherent address of the received packet and the positional address of the source in the header based on the positional address of the received packet, to said mobile terminal address association information, if the inherent address of the source is not contained in said mobile terminal address association information; and d) means for updating said mobile terminal address association information using an association between the inherent address of the source in the header based on the inherent address of the received packet and the positional address of the source in the header based on the positional address of the received packet, if the inherent address of the source is contained in said mobile terminal address association information and also if the association between the inherent address of the source in the header based on the inherent address of the received packet and the positional address of the source in the header based on the positional address of the received packet is different from an association contained in said mobile terminal address association information.

29. A mobile packet communication system according to claim 9, wherein each of said mobile terminals comprises:

a) means for receiving said database updating information and holding the same data as said database and said address association information relative to a terminal with which the mobile terminal is to communicate, as mobile terminal address association information;

b) means for detecting whether the inherent address of a source in a header based on the inherent address of a received packet is contained in said mobile terminal address association information;

c) means for adding an association between the inherent address of the source in the header based on the inherent address of the received packet and the positional address of the source in the header based on the positional address of the received packet, to said mobile terminal address association information, if the inherent address of the source is not contained in said mobile terminal address association information; and d) means for updating said mobile terminal address association information using an association between the inherent address of the source in the header based on the inherent address of the received packet and the positional address of the source in the header based on the positional address of the received packet, if the inherent address of the source is contained in said mobile terminal address association information and also if the association between the inherent address of the source in the header based on the inherent address of the received packet and the positional address of the source in the header based on the positional address of the received packet is different from an association contained in said mobile terminal address association information.

30. A mobile packet communication system according to claim 10, wherein each of said mobile terminals comprises:

a) means for receiving said database updating information and holding the same data as said database and said address association information relative to a terminal with which the mobile terminal is to communicate, as mobile terminal address association information;

b) means for detecting whether the inherent address of a source in a header based on the inherent address of a received packet is contained in said mobile terminal address association information;

c) means for adding an association between the inherent address of the source in the header based on the inherent address of the received packet and the positional address of the source in the header based on the positional address of the received packet, to said mobile terminal address association information, if the inherent address of the source is not contained in said mobile terminal address association information; and d) means for updating said mobile terminal address association information using an association between the inherent address of the source in the header based on the inherent address of the received packet and the positional address of the source in the header based on the positional address of the received packet, if the inherent address of the source is contained in said mobile terminal address association information and also if the association between the inherent address of the source in the header based on the inherent address of the received packet and the positional address of the source in the header based on the positional address of the received packet is different from an association contained in said mobile terminal address association information.

31. A mobile packet communication system according to claim 1, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

32. A mobile packet communication system according to claim 2, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

33. A mobile packet communication system according to claim 3, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

34. A mobile packet communication system according to claim 4, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

35. A mobile packet communication system according to claim 5, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

36. A mobile packet communication system according to claim 6, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

37. A mobile packet communication system according to claim 7, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

38. A mobile packet communication system according to claim 8, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

39. A mobile packet communication system according to claim 9, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

40. A mobile packet communication system according to claim 10, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

41. A mobile packet communication system according to of claim 21, wherein each of said mobile terminals comprises:

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

42. A mobile packet communication system according to claim 22, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

43. A mobile packet communication system according to claim 23, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

44. A mobile packet communication system according to claim 24, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

45. A mobile packet communication system according to claim 25, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

46. A mobile packet communication system according to claim 26, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

47. A mobile packet communication system according to claim 27, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

48. A mobile packet communication system according to claim 28, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

49. A mobile packet communication system according to claim 29, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

50. A mobile packet communication system according to claim 30, wherein each of said mobile terminals comprises:

a) means for receiving said database updating information and holding the same data as said database and said address association information relative to a terminal with which the mobile terminal is to communicate, as mobile terminal address association information;

b) means for detecting the inherent address of a destination if a packet is to be transmitted;

c) means for configuring a header based on the inherent address of the destination and the inherent address of the mobile terminal;

d) means for regarding an address present in the address association information of the mobile terminal as the positional address of the destination if a positional address corresponding to the inherent address of the destination is present in the address association information of the mobile terminal;

e) means for regarding the inherent address of the destination as the positional address of the destination if a positional address corresponding to the inherent address of the destination is not present in the address association information of the mobile terminal; and f) means for configuring a header based on the positional address of the destination and the positional address of the mobile terminal.

51. A mobile packet communication system comprising:

a plurality of auxiliary networks;

a plurality of routers interconnecting said auxiliary networks;

a plurality of mobile-compatible auxiliary networks for accommodating mobile terminals movable between said auxiliary networks for communications;

a plurality of mobile-incompatible auxiliary networks for accommodating fixed terminals immovable between said auxiliary networks for communications;

each of said routers comprising:

a) packet receiving means for receiving a packet;

b) means for maintaining information relative to locations of said mobile terminals;

c) a memory for storing a movable-compatible auxiliary network table which indicates each of said auxiliary networks is a movable-compatible auxiliary network or not;

d) header processing means for analyzing a header of a packet received by said packet receiving means and reconfigurating said header using said information relative to locations of said mobile terminals and said movable-compatible auxiliary network table, and updating said movable-compatible auxiliary network table; and e) packet transmitting means for transmitting a packet outputted from said header processing means.

52. A mobile packet communication system according to claim 51, wherein each of said mobile terminals, respectively, has:

a positional address depending on the auxiliary network to which the mobile terminal is currently connected and an inherent address independent of the auxiliary network to which the mobile terminal is currently connected and depending on the auxiliary network which manages the mobile terminal;

said header processing means comprising:
a) packet detecting means for detecting whether a received packet is a packet having both an inherent address header based on said inherent address and a positional address header based on said positional address or a packet having only said inherent address header;
b) means for inputting the packet having said inherent address header and said positional address header, reconfigurating said inherent address header and said positional address header, information relative to the location of the mobile terminal, and the received packet based on said movable-compatible auxiliary network table, and updating said movable-compatible auxiliary network table; and
c) means for inputting the packet having only the inherent address header, reconfigurating said inherent address header, information relative to the location of the mobile terminal, and the received packet based on said movable-compatible auxiliary network table, and updating said movable-compatible auxiliary network table.

* * * * *

UNITED STATES PATENT AND TRADEMARK OFFICE
CERTIFICATE OF CORRECTION

PATENT NO. : 5,841,769
DATED : November 24, 1998
INVENTOR(S) : Kazuhiro OKANOUE and Tomoki OHSAWA It is certified that error appears in the above-indentified patent and that said Letters Patent is hereby corrected as shown below:

Column 2,    line 56, change "300" to --3000--;

Column 11,   line 45, insert --)-- before "th";

Column 12,   line 12, insert --)-- before "th";

Column 12,   line 15, insert --)-- before "th";

Column 12,   line 23, insert --)-- before "th";

Column 12,   line 24, insert --)-- before "th";

Column 16,   line 62, change "with" to --where--;

Column 17,   line 32, delete "may";

Column 17,   line 62, change "data bases" to --databases--;

Column 17,   line 42, change "402-405" to --402-405--;

Column 17,   line 67, delete "the" (first occurrence);

Column 18,   line 3, change "serves" to --servers--;

Column 18,   line 19, change "is" (first occurrence) to --services--;

Column 19,   line 49, insert -- - -- before "108";

UNITED STATES PATENT AND TRADEMARK OFFICE
CERTIFICATE OF CORRECTION

PATENT NO. : 5,841,769
DATED : November 24, 1998
INVENTOR(S) : Kazuhiro OKANOUE and Tomoki OHSAWA It is certified that error appears in the above-indentified patent and that said Letters Patent is hereby corrected as shown below:

Column 22, line 2, after "has," insert --then the router Router1 (105) converts the positional address of the destination of the received packet into the ppositional address of the destination which corresponds to the inherent address of the destination of the packet in the address association data of the mobile terminal which the router Router1 (105) has, and transfers the packet;

9: If the inherent address of the destination indicates a packet destined for a mobile terminal in the auxiliary networks Net-0 (100), Net-2(102) to which the router Router1 (105) is directly connected, and if the positional address of the destination indicates a packet destined for a mobile terminal in the auxiliary networks Net-0 (100), Net-2(102) to which the router Router1 (105) is directly connected, and also if the association between the inherent and positional addresses of the destination of the received packet is consistent with the address as data of the mobile terminal which the router Router1 (105) transfers the received packet as it is; and 10: If the inherent address of the destination indicates a packet destined for a mobile terminal in the auxiliary networks Net-0 (100), Net-2(102) to which the router Router1 (105) is directly connected, and if the positional address of the destination indicates a--;

UNITED STATES PATENT AND TRADEMARK OFFICE
CERTIFICATE OF CORRECTION

PATENT NO. : 5,841,769
DATED : November 24, 1998
INVENTOR(S) : Kazuhiro OKANOUE and Tomoki OHSAWA It is certified that error appears in the above-indentified patent and that said Letters Patent is hereby corrected as shown below:

Column 22, line 48, after "inherent" insert --and positional addresses of the destination is consistent with the data in the database. If the association between the inherent and positional addresses of the destination is inconsistent with the data in the database, then the positional address of the destination of the packet is converted into the inherent address of the destination, and the packet is transferred in the step 560, after which the processing ends.--

Signed and Sealed this

Twenty-third Day of November, 1999

*Attest:*

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT NO. : 5,841,769
DATED : November 24, 1998
INVENTOR(S) : Okanoue, et al.

It is certified that error appears in the above-identified patent and that said Letters Patent is hereby corrected as shown below:

Column 22, line 48, delete "then the router Router1"

Column 22, delete lines 49-67

Column 23, delete lines 1-13

Column 26, line 9, change "S3106" to --3106--;

Column 26, line 10, delete "the" (first occurrence);

Column 26, line 11, insert --))-- before "octet";

Column 26, line 12, insert --))-- before "octet";

Signed and Sealed this

Thirtieth Day of January, 2001

Q. TODD DICKINSON

*Attest:*

*Attesting Officer*      *Director of Patents and Trademarks*

UNITED STATES PATENT AND TRADEMARK OFFICE
CERTIFICATE OF CORRECTION

PATENT NO. : 5,841,769
DATED : November 24, 1998
INVENTOR(S) : Okanoue, et al

It is certified that error appears in the above-identified patent and that said Letters Patent is hereby corrected as shown below:

Column 27, line 12, delete ")" (second occurrence);

Column 27, line 21, change "th" to --the--;

Column 29, line 62, delete "*";

Column 30, line 21, change "~" to -- - --;

Column 37, line 44, change "34" to --35--;

Column 38, line 37, change "a" to --therefor--;

Signed and Sealed this

Thirtieth Day of January, 2001

Attest:

Q. TODD DICKINSON

*Attesting Officer*    *Director of Patents and Trademarks*